United States Patent
Freishtat et al.

(10) Patent No.: US 10,797,976 B2
(45) Date of Patent: Oct. 6, 2020

(54) SYSTEM AND METHODS FOR FACILITATING OBJECT ASSIGNMENTS

(71) Applicant: LIVEPERSON, INC., New York, NY (US)

(72) Inventors: Gregg Freishtat, Atlanta, GA (US); Steve Hufford, Atlanta, GA (US); Dodge McFall, Atlanta, GA (US); Jackson Wilson, Atlanta, GA (US); Tanya Hyman, Atlanta, GA (US); Vikas Rijsinghani, Atlanta, GA (US); Paul Kaib, Dunwoody, GA (US)

(73) Assignee: LIVEPERSON, INC., New York, NY (US)

( * ) Notice: Subject to any disclaimer, the term of this patent is extended or adjusted under 35 U.S.C. 154(b) by 65 days.

(21) Appl. No.: 15/712,934

(22) Filed: Sep. 22, 2017

(65) Prior Publication Data
US 2018/0234312 A1  Aug. 16, 2018

Related U.S. Application Data

(63) Continuation of application No. 15/294,441, filed on Oct. 14, 2016, now Pat. No. 9,819,561, which is a
(Continued)

(51) Int. Cl.
*G06F 15/16* (2006.01)
*H04L 12/26* (2006.01)
(Continued)

(52) U.S. Cl.
CPC .......... *H04L 43/08* (2013.01); *G06Q 10/101* (2013.01); *G06Q 30/01* (2013.01); *G06Q 30/06* (2013.01);
(Continued)

(58) Field of Classification Search
None
See application file for complete search history.

(56) References Cited

U.S. PATENT DOCUMENTS

| 5,450,537 A | 9/1995 | Hirai et al. |
| 5,517,405 A | 5/1996 | McAndrew et al. |
| (Continued) | | |

FOREIGN PATENT DOCUMENTS

| EP | 840244 A1 | 5/1998 |
| EP | 1233361 A1 | 8/2002 |
| (Continued) | | |

OTHER PUBLICATIONS

Chartrand Sabra, "A new system seeks to ease the bottleneck in the customer-service information highway," The New York Times (Apr. 30, 2001), 2 pages.
(Continued)

*Primary Examiner* — Phuoc H Nguyen
(74) *Attorney, Agent, or Firm* — Polsinelli LLP

(57) ABSTRACT

The present invention determines which network devices are likely to have a positive result in engagements with terminal devices. A server can obtain data about network devices with respect to the communication session with a network site. Then the server can use rules to define a set of network devices that are eligible to interact or communicate with a terminal device. The server can connect to the network devices as randomly as possible. Terminal devices can initiate engagements with network devices. The server can detect characteristics in the interaction of engagements that have positive results. The server generates an evaluation protocol based on the characteristics, to assign new network devices a parameter representing how close the new network device conforms to the evaluation protocol. The parameter is
(Continued)

used by the system in real-time to inform terminal devices as to which network devices to connect to and in what order.

21 Claims, 34 Drawing Sheets

Related U.S. Application Data continuation-in-part of application No. 14/288,258, filed on May 27, 2014, now Pat. No. 9,576,292, which is a continuation of application No. 09/922,753, filed on Aug. 6, 2001, now Pat. No. 8,868,448, and a continuation-in-part of application No. 10/980,613, filed on Nov. 3, 2004, now abandoned.

(60) Provisional application No. 60/244,039, filed on Oct. 26, 2000.

(51) Int. Cl.
    H04L 29/08    (2006.01)
    H04L 29/06    (2006.01)
    G06Q 30/06    (2012.01)
    G06Q 30/00    (2012.01)
    G06Q 10/10    (2012.01)
    G06Q 50/00    (2012.01)

(52) U.S. Cl.
    CPC ..... *G06Q 30/0601* (2013.01); *G06Q 30/0613* (2013.01); *G06Q 30/0617* (2013.01); *G06Q 30/0623* (2013.01); *G06Q 30/0641* (2013.01); *G06Q 50/01* (2013.01); *H04L 65/1096* (2013.01); *H04L 65/4023* (2013.01); *H04L 67/22* (2013.01); *H04L 67/306* (2013.01)

(56) References Cited

U.S. PATENT DOCUMENTS

| | | |
|---|---|---|
| 5,563,805 A | 10/1996 | Arbuckle et al. |
| 5,572,643 A | 11/1996 | Judson |
| 5,581,702 A | 12/1996 | McArdle et al. |
| 5,583,763 A | 12/1996 | Atcheson et al. |
| 5,590,038 A | 12/1996 | Pitroda |
| 5,592,378 A | 1/1997 | Cameron et al. |
| 5,596,493 A | 1/1997 | Tone |
| 5,611,052 A | 3/1997 | Dykstra et al. |
| 5,636,346 A | 6/1997 | Saxe |
| 5,664,115 A | 9/1997 | Fraser |
| 5,668,953 A | 9/1997 | Sloo |
| 5,678,002 A | 10/1997 | Fawcett et al. |
| 5,694,163 A | 12/1997 | Harrison |
| 5,696,907 A | 12/1997 | Tom |
| 5,699,526 A | 12/1997 | Siefert |
| 5,704,029 A | 12/1997 | Wright |
| 5,710,887 A | 1/1998 | Chelliah et al. |
| 5,715,402 A | 2/1998 | Popolo |
| 5,724,155 A | 3/1998 | Saito |
| 5,724,522 A | 3/1998 | Kagami et al. |
| 5,727,048 A | 3/1998 | Hiroshima et al. |
| 5,727,163 A | 3/1998 | Bezos |
| 5,732,400 A | 3/1998 | Mandler et al. |
| 5,745,654 A | 4/1998 | Titan |
| 5,748,755 A | 5/1998 | Johnson et al. |
| 5,758,328 A | 5/1998 | Giovannoli |
| 5,760,771 A | 6/1998 | Blonder et al. |
| 5,761,640 A | 6/1998 | Kalyanswamy et al. |
| 5,761,649 A | 6/1998 | Hill |
| 5,764,916 A | 6/1998 | Busey et al. |
| 5,765,142 A | 6/1998 | Allred et al. |
| 5,774,869 A | 6/1998 | Toader |
| 5,774,870 A | 6/1998 | Storey |
| 5,774,882 A | 6/1998 | Keen et al. |
| 5,774,883 A | 6/1998 | Andersen et al. |
| 5,778,164 A | 7/1998 | Watkins et al. |
| 5,784,568 A | 7/1998 | Needham |
| 5,793,365 A | 8/1998 | Tang et al. |
| 5,794,207 A | 8/1998 | Walker et al. |
| 5,796,393 A | 8/1998 | MacNaughton et al. |
| 5,796,952 A | 8/1998 | Davis |
| 5,797,133 A | 8/1998 | Jones et al. |
| 5,799,151 A | 8/1998 | Hoffer |
| 5,805,159 A | 9/1998 | Bertram et al. |
| 5,806,043 A | 9/1998 | Toader |
| 5,812,769 A | 9/1998 | Graber et al. |
| 5,815,663 A | 9/1998 | Uomini |
| 5,818,907 A | 10/1998 | Mahoney et al. |
| 5,819,029 A | 10/1998 | Edwards et al. |
| 5,819,235 A | 10/1998 | Tamai et al. |
| 5,819,236 A | 10/1998 | Josephson |
| 5,819,291 A | 10/1998 | Haimowitz et al. |
| 5,825,869 A | 10/1998 | Brooks et al. |
| 5,826,241 A | 10/1998 | Stein et al. |
| 5,826,244 A | 10/1998 | Huberman |
| 5,828,839 A | 10/1998 | Moncreiff |
| 5,832,465 A | 11/1998 | Tom |
| 5,835,087 A | 11/1998 | Herz et al. |
| 5,838,682 A | 11/1998 | Dekelbaum et al. |
| 5,838,910 A | 11/1998 | Domenikos et al. |
| 5,839,117 A | 11/1998 | Cameron et al. |
| 5,850,517 A | 12/1998 | Verkler et al. |
| 5,852,809 A | 12/1998 | Abel et al. |
| 5,857,079 A | 1/1999 | Claus et al. |
| 5,859,974 A | 1/1999 | McArdle et al. |
| 5,862,330 A | 1/1999 | Anupam et al. |
| 5,866,889 A | 2/1999 | Weiss et al. |
| 5,870,721 A | 2/1999 | Norris |
| 5,878,403 A | 3/1999 | DeFrancesco et al. |
| 5,895,454 A | 4/1999 | Harrington |
| 5,903,641 A | 5/1999 | Tonisson |
| 5,907,677 A | 5/1999 | Glenn et al. |
| 5,911,135 A | 6/1999 | Atkins |
| 5,916,302 A | 6/1999 | Dunn et al. |
| 5,918,014 A | 6/1999 | Robinson |
| 5,924,082 A | 7/1999 | Silverman et al. |
| 5,930,776 A | 7/1999 | Dykstra et al. |
| 5,940,811 A | 8/1999 | Norris |
| 5,940,812 A | 8/1999 | Tengel et al. |
| 5,943,416 A | 8/1999 | Gisby et al. |
| 5,943,478 A | 8/1999 | Aggarwal et al. |
| 5,945,989 A | 8/1999 | Freishtat et al. |
| 5,948,061 A | 9/1999 | Merriman et al. |
| 5,950,179 A | 9/1999 | Buchanan et al. |
| 5,956,693 A | 9/1999 | Geerlings |
| 5,958,014 A | 9/1999 | Cave |
| 5,960,411 A | 9/1999 | Hartman et al. |
| 5,963,625 A | 10/1999 | Kawecki et al. |
| 5,963,635 A | 10/1999 | Szlam |
| 5,966,699 A | 10/1999 | Zandi |
| 5,970,475 A | 10/1999 | Barnes et al. |
| 5,970,478 A | 10/1999 | Walker et al. |
| 5,974,396 A | 10/1999 | Anderson |
| 5,974,446 A | 10/1999 | Sonnenrich et al. |
| 5,987,434 A | 11/1999 | Libman |
| 5,991,740 A | 11/1999 | Messer |
| 5,995,947 A | 11/1999 | Fraser et al. |
| 6,000,832 A | 12/1999 | Franklin et al. |
| 6,003,013 A | 12/1999 | Boushy |
| 6,009,410 A | 12/1999 | LeMole et al. |
| 6,014,644 A | 1/2000 | Erickson |
| 6,014,645 A | 1/2000 | Cunningham |
| 6,014,647 A | 1/2000 | Nizzari |
| 6,016,504 A | 1/2000 | Arnold et al. |
| 6,026,370 A | 2/2000 | Jermyn |
| 6,028,601 A | 2/2000 | Machiraju et al. |
| 6,029,141 A | 2/2000 | Bezos et al. |
| 6,029,149 A | 2/2000 | Dykstra et al. |
| 6,029,890 A | 2/2000 | Austin et al. |
| 6,044,146 A | 3/2000 | Gisby et al. |
| 6,044,360 A | 3/2000 | Picciallo |
| 6,049,784 A | 4/2000 | Weatherly et al. |
| 6,052,447 A | 4/2000 | Golden |
| 6,052,730 A | 4/2000 | Felciano |

(56) References Cited

U.S. PATENT DOCUMENTS

| | | | |
|---|---|---|---|
| 6,055,573 A | 4/2000 | Gardenswartz et al. |
| 6,058,375 A | 5/2000 | Park et al. |
| 6,058,428 A | 5/2000 | Wang et al. |
| 6,061,658 A | 5/2000 | Chou et al. |
| 6,064,987 A | 5/2000 | Walker et al. |
| 6,067,525 A | 5/2000 | Jonhson et al. |
| 6,070,149 A | 5/2000 | Tavor et al. |
| 6,073,112 A | 6/2000 | Geerlings |
| 6,076,100 A | 6/2000 | Cottrille et al. |
| 6,078,892 A | 6/2000 | Anderson et al. |
| 6,084,585 A | 7/2000 | Kraft et al. |
| 6,085,126 A | 7/2000 | Mellgren, III et al. |
| 6,085,195 A | 7/2000 | Hoyt et al. |
| 6,088,686 A | 7/2000 | Walker et al. |
| 6,088,731 A * | 7/2000 | Kiraly .................. G06F 16/951 709/229 |
| 6,105,007 A | 8/2000 | Norris |
| 6,112,190 A | 8/2000 | Fletcher et al. |
| 6,119,101 A | 9/2000 | Peckover |
| 6,119,103 A | 9/2000 | Basch et al. |
| 6,131,087 A | 10/2000 | Luke et al. |
| 6,131,095 A | 10/2000 | Low et al. |
| 6,134,318 A | 10/2000 | O'Neil |
| 6,134,530 A | 10/2000 | Bunting et al. |
| 6,134,532 A | 10/2000 | Lazarus et al. |
| 6,134,533 A | 10/2000 | Shell |
| 6,134,548 A | 10/2000 | Gottsman et al. |
| 6,138,139 A | 10/2000 | Beck et al. |
| 6,141,653 A | 10/2000 | Conklin et al. |
| 6,144,991 A * | 11/2000 | England ................. H04L 29/06 709/205 |
| 6,163,607 A | 12/2000 | Bogart et al. |
| 6,167,395 A | 12/2000 | Beck et al. |
| 6,170,011 B1 | 1/2001 | Macleod Beck et al. |
| 6,173,053 B1 | 1/2001 | Bogart et al. |
| 6,182,050 B1 | 1/2001 | Ballard |
| 6,182,124 B1 | 1/2001 | Lau et al. |
| 6,185,543 B1 | 2/2001 | Galperin et al. |
| 6,189,003 B1 * | 2/2001 | Leal ........................ G06Q 30/02 |
| 6,192,319 B1 | 2/2001 | Simonson |
| 6,192,380 B1 | 2/2001 | Light et al. |
| 6,199,079 B1 | 3/2001 | Gupta et al. |
| 6,202,053 B1 | 3/2001 | Christiansen et al. |
| 6,202,155 B1 | 3/2001 | Tushie et al. |
| 6,208,979 B1 | 3/2001 | Sinclair |
| 6,222,919 B1 | 4/2001 | Hollatz et al. |
| 6,236,975 B1 | 5/2001 | Boe et al. |
| 6,240,396 B1 | 5/2001 | Walker et al. |
| 6,249,795 B1 | 6/2001 | Douglis |
| 6,262,730 B1 | 7/2001 | Horvitz |
| 6,267,292 B1 | 7/2001 | Walker et al. |
| 6,272,506 B1 | 8/2001 | Bell |
| 6,282,284 B1 | 8/2001 | Dezonno et al. |
| 6,285,983 B1 | 9/2001 | Jenkins |
| 6,289,319 B1 | 9/2001 | Lockwood |
| 6,292,786 B1 | 9/2001 | Deaton |
| 6,295,061 B1 | 9/2001 | Park et al. |
| 6,298,348 B1 | 10/2001 | Eldering |
| 6,311,169 B2 | 10/2001 | Duhon |
| 6,311,178 B1 | 10/2001 | Bi et al. |
| 6,324,524 B1 | 11/2001 | Lent et al. |
| 6,327,574 B1 | 12/2001 | Kramer et al. |
| 6,330,546 B1 | 12/2001 | Gopinathan et al. |
| 6,334,110 B1 | 12/2001 | Walter |
| 6,338,066 B1 | 1/2002 | Martin |
| 6,346,952 B1 | 2/2002 | Shtivelman |
| 6,349,290 B1 | 2/2002 | Horowitz et al. |
| 6,356,909 B1 | 3/2002 | Spencer |
| 6,370,508 B2 * | 4/2002 | Beck .................. G06F 9/45512 705/7.26 |
| 6,374,230 B1 | 4/2002 | Walker et al. |
| 6,377,936 B1 | 4/2002 | Henrick et al. |
| 6,381,640 B1 * | 4/2002 | Beck .................. G06K 13/0825 709/223 |
| 6,385,594 B1 | 5/2002 | Lebda et al. |
| 6,393,479 B1 | 5/2002 | Glommen et al. |
| 6,405,181 B2 | 6/2002 | Lent et al. |
| 6,412,012 B1 * | 6/2002 | Bieganski .............. G06Q 30/02 709/232 |
| 6,438,526 B1 | 8/2002 | Dykes et al. |
| 6,449,358 B1 | 9/2002 | Anisimov |
| 6,449,646 B1 | 9/2002 | Sikora et al. |
| 6,463,149 B1 | 10/2002 | Jolissaint et al. |
| 6,466,970 B1 | 10/2002 | Lee |
| 6,477,533 B2 | 11/2002 | Schiff et al. |
| 6,507,851 B1 | 1/2003 | Fujiwara et al. |
| 6,510,418 B1 | 1/2003 | Case et al. |
| 6,510,427 B1 | 1/2003 | Bossemeyer, Jr. et al. |
| 6,516,421 B1 | 2/2003 | Peters |
| 6,519,628 B1 | 2/2003 | Locascio |
| 6,526,404 B1 | 2/2003 | Slater |
| 6,535,492 B2 | 3/2003 | Shtivelman |
| 6,542,936 B1 | 4/2003 | Mayle et al. |
| 6,546,372 B2 | 4/2003 | Lauffer |
| 6,549,919 B2 | 4/2003 | Lambert et al. |
| 6,567,791 B2 | 5/2003 | Lent et al. |
| 6,571,236 B1 | 5/2003 | Ruppelt |
| 6,597,377 B1 | 7/2003 | MacPhai |
| 6,606,744 B1 | 8/2003 | Mikurak |
| 6,618,746 B2 | 9/2003 | Desai et al. |
| 6,622,131 B1 | 9/2003 | Brown et al. |
| 6,622,138 B1 | 9/2003 | Bellamkonda |
| 6,654,815 B1 | 11/2003 | Goss |
| 6,662,215 B1 | 12/2003 | Moskowitz et al. |
| 6,665,395 B1 | 12/2003 | Busey et al. |
| 6,671,818 B1 | 12/2003 | Mikurak |
| 6,691,151 B1 | 2/2004 | Cheyer et al. |
| 6,691,159 B1 | 2/2004 | Grewal et al. |
| 6,701,441 B1 | 3/2004 | Balasubramaniam et al. |
| 6,718,313 B1 | 4/2004 | Lent et al. |
| 6,721,713 B1 | 4/2004 | Guheen et al. |
| 6,725,210 B1 | 4/2004 | Key |
| 6,741,995 B1 | 5/2004 | Chen |
| 6,760,429 B1 | 7/2004 | Hung et al. |
| 6,766,302 B2 | 7/2004 | Bach |
| 6,771,766 B1 * | 8/2004 | Shafiee .................. H04M 3/5191 379/265.09 |
| 6,778,982 B1 | 8/2004 | Knight |
| 6,795,812 B1 | 9/2004 | Lent et al. |
| 6,804,659 B1 | 10/2004 | Graham et al. |
| 6,826,594 B1 | 11/2004 | Pettersen |
| 6,829,585 B1 * | 12/2004 | Grewal .................. G06Q 10/02 705/7.14 |
| 6,836,768 B1 | 12/2004 | Hirsh |
| 6,839,680 B1 | 1/2005 | Liu |
| 6,839,682 B1 | 1/2005 | Blume |
| 6,850,896 B1 | 2/2005 | Kelman et al. |
| 6,865,267 B2 | 3/2005 | Dezono |
| 6,892,226 B1 | 5/2005 | Tso et al. |
| 6,892,347 B1 | 5/2005 | Williams |
| 6,904,408 B1 | 6/2005 | McCarthy et al. |
| 6,920,434 B1 | 7/2005 | Cossette |
| 6,922,705 B1 | 7/2005 | Northrup |
| 6,925,441 B1 | 8/2005 | Jones |
| 6,925,442 B1 | 8/2005 | Shapira et al. |
| 6,950,983 B1 | 9/2005 | Snavely |
| 6,965,868 B1 | 11/2005 | Bednarek |
| 6,981,028 B1 | 12/2005 | Rawat et al. |
| 6,993,557 B1 | 1/2006 | Yen |
| 7,003,476 B1 | 2/2006 | Samra et al. |
| 7,039,599 B2 | 5/2006 | Merriman et al. |
| 7,051,273 B1 | 5/2006 | Holt et al. |
| 7,076,443 B1 | 7/2006 | Emens et al. |
| 7,085,682 B1 | 8/2006 | Heller et al. |
| 7,092,959 B2 | 8/2006 | Chen |
| 7,106,850 B2 | 9/2006 | Campbell et al. |
| 7,123,974 B1 | 10/2006 | Hamilton |
| 7,143,063 B2 | 11/2006 | Lent et al. |
| 7,181,492 B2 | 2/2007 | Wen et al. |
| 7,200,614 B2 | 4/2007 | Reid et al. |
| 7,242,760 B2 | 7/2007 | Shires |
| 7,243,109 B2 | 7/2007 | Omega et al. |
| 7,249,344 B1 * | 7/2007 | Zeanah .................. G06Q 20/32 705/35 |

(56) References Cited

U.S. PATENT DOCUMENTS

| | | |
|---|---|---|
| 7,251,648 B2 | 7/2007 | Chaudhuri et al. |
| 7,266,510 B1 | 9/2007 | Cofino |
| 7,287,000 B2 | 10/2007 | Boyd et al. |
| 7,313,575 B2 | 12/2007 | Carr et al. |
| 7,337,127 B1 | 2/2008 | Smith et al. |
| 7,346,576 B2 | 3/2008 | Lent et al. |
| 7,346,604 B1 | 3/2008 | Bharat et al. |
| 7,346,606 B2 | 3/2008 | Bharat |
| 7,370,002 B2 | 5/2008 | Heckerman et al. |
| 7,376,603 B1 | 5/2008 | Mayr et al. |
| 7,403,973 B2 | 7/2008 | Wilsher et al. |
| 7,424,363 B2 | 9/2008 | Cheng |
| 7,523,191 B1 | 4/2009 | Thomas et al. |
| 7,526,439 B2 | 4/2009 | Freishtat et al. |
| 7,536,320 B2 | 5/2009 | McQueen et al. |
| 7,552,080 B1 | 6/2009 | Willard et al. |
| 7,552,365 B1 | 6/2009 | Marsh |
| 7,562,058 B2 | 7/2009 | Pinto |
| 7,590,550 B2 | 9/2009 | Schoenberg |
| 7,630,986 B1 | 12/2009 | Herz et al. |
| 7,650,381 B2 | 1/2010 | Peters |
| 7,657,465 B2 | 2/2010 | Freishtat et al. |
| 7,660,815 B1 | 2/2010 | Scofield |
| 7,689,924 B1 | 3/2010 | Schneider et al. |
| 7,702,635 B2 | 4/2010 | Horvitz et al. |
| 7,716,322 B2 | 5/2010 | Benedikt et al. |
| 7,730,010 B2 | 6/2010 | Kishore et al. |
| 7,734,503 B2 | 6/2010 | Agarwal et al. |
| 7,734,632 B2 | 6/2010 | Wang |
| 7,739,149 B2 | 6/2010 | Freishtat et al. |
| 7,743,044 B1 | 6/2010 | Kalogeraki |
| 7,818,340 B1 | 10/2010 | Warren |
| 7,827,128 B1 | 11/2010 | Karlsson et al. |
| 7,865,457 B2 | 1/2011 | Ravin et al. |
| 7,877,679 B2 | 1/2011 | Ozana |
| 7,895,193 B2 | 2/2011 | Cucerzan |
| 7,958,066 B2 | 6/2011 | Pinckney et al. |
| 7,966,564 B2 | 6/2011 | Catlin et al. |
| 7,975,020 B1 | 7/2011 | Green et al. |
| 8,010,422 B1 | 8/2011 | Lascelles et al. |
| 8,065,666 B2 | 11/2011 | Schnabele |
| 8,166,026 B1 | 4/2012 | Sadler |
| 8,185,544 B2 | 5/2012 | Oztekin et al. |
| 8,260,846 B2 | 9/2012 | Lahav |
| 8,266,127 B2 | 9/2012 | Mattox et al. |
| 8,321,906 B2 | 11/2012 | Agrusa |
| 8,386,340 B1 | 2/2013 | Feinstein |
| 8,386,509 B1 | 2/2013 | Scofield |
| 8,392,580 B2 | 3/2013 | Allen et al. |
| 8,738,732 B2 | 5/2014 | Karidi |
| 8,762,313 B2 | 6/2014 | Lahav et al. |
| 8,799,200 B2 | 8/2014 | Lahav |
| 8,805,844 B2 | 8/2014 | Schorzman et al. |
| 8,805,941 B2 | 8/2014 | Barak et al. |
| 8,843,481 B1 | 9/2014 | Xu |
| 8,868,448 B2 | 10/2014 | Freishtat et al. |
| 8,918,465 B2 | 12/2014 | Barak |
| 8,943,002 B2 | 1/2015 | Zelenko et al. |
| 8,943,145 B1 | 1/2015 | Peters et al. |
| 8,954,539 B2 | 2/2015 | Lahav |
| 8,965,998 B1 | 2/2015 | Dicker |
| 9,104,970 B2 | 8/2015 | Lahav et al. |
| 9,256,761 B1 | 2/2016 | Sahu |
| 9,331,969 B2 | 5/2016 | Barak et al. |
| 9,336,487 B2 | 5/2016 | Lahav |
| 9,350,598 B2 | 5/2016 | Barak et al. |
| 9,396,295 B2 | 7/2016 | Lahav et al. |
| 9,396,436 B2 | 7/2016 | Lahav |
| 9,432,468 B2 | 8/2016 | Karidi |
| 9,525,745 B2 | 12/2016 | Karidi |
| 9,558,276 B2 | 1/2017 | Barak et al. |
| 9,563,336 B2 | 2/2017 | Barak et al. |
| 9,563,707 B2 | 2/2017 | Barak et al. |
| 9,569,537 B2 | 2/2017 | Barak et al. |
| 9,576,292 B2 | 2/2017 | Freishtat et al. |
| 9,582,579 B2 | 2/2017 | Barak et al. |
| 9,590,930 B2 | 3/2017 | Karidi |
| 9,672,196 B2 | 6/2017 | Shachar et al. |
| 9,767,212 B2 | 9/2017 | Lavi et al. |
| 9,819,561 B2 | 11/2017 | Freishtat et al. |
| 9,892,417 B2 | 2/2018 | Shachar et al. |
| 9,948,582 B2 | 4/2018 | Karidi |
| 2001/0011245 A1 | 8/2001 | Duhon |
| 2001/0011246 A1 | 8/2001 | Tammaro |
| 2001/0011262 A1 | 8/2001 | Hoyt et al. |
| 2001/0011282 A1 | 8/2001 | Katsumata et al. |
| 2001/0013009 A1 | 8/2001 | Greening et al. |
| 2001/0014877 A1 | 8/2001 | Defrancesco et al. |
| 2001/0025249 A1 | 9/2001 | Tokunaga |
| 2001/0025309 A1* | 9/2001 | MacLeod Beck .. G06F 17/2765 709/223 |
| 2001/0027436 A1 | 10/2001 | Tenembaum |
| 2001/0032140 A1 | 10/2001 | Hoffman |
| 2001/0032244 A1 | 10/2001 | Neustel |
| 2001/0034689 A1 | 10/2001 | Heilman |
| 2001/0044751 A1 | 11/2001 | Pugliese |
| 2001/0054041 A1 | 12/2001 | Chang |
| 2001/0054064 A1 | 12/2001 | Kannan |
| 2001/0056405 A1 | 12/2001 | Muyres |
| 2002/0002491 A1 | 1/2002 | Whitfield |
| 2002/0004735 A1 | 1/2002 | Gross |
| 2002/0010625 A1 | 1/2002 | Smith et al. |
| 2002/0016731 A1 | 2/2002 | Kupersmit |
| 2002/0023051 A1 | 2/2002 | Kunzle et al. |
| 2002/0026351 A1 | 2/2002 | Coleman |
| 2002/0029188 A1 | 3/2002 | Schmid |
| 2002/0029267 A1 | 3/2002 | Sankuratripati et al. |
| 2002/0035486 A1 | 3/2002 | Huyn et al. |
| 2002/0038230 A1 | 3/2002 | Chen |
| 2002/0045154 A1 | 4/2002 | Wood |
| 2002/0046086 A1 | 4/2002 | Pletz |
| 2002/0046096 A1 | 4/2002 | Srinivasan |
| 2002/0047859 A1 | 4/2002 | Szlam et al. |
| 2002/0055878 A1 | 5/2002 | Burton et al. |
| 2002/0059095 A1 | 5/2002 | Cook |
| 2002/0067500 A1 | 6/2002 | Yokomizo et al. |
| 2002/0073162 A1 | 6/2002 | McErlean |
| 2002/0082923 A1 | 6/2002 | Merriman et al. |
| 2002/0083095 A1 | 6/2002 | Wu et al. |
| 2002/0083167 A1 | 6/2002 | Costigan et al. |
| 2002/0085705 A1 | 7/2002 | Shires |
| 2002/0091832 A1 | 7/2002 | Low et al. |
| 2002/0107728 A1 | 8/2002 | Bailey et al. |
| 2002/0111847 A1 | 8/2002 | Smith |
| 2002/0111850 A1 | 8/2002 | Smrcka et al. |
| 2002/0123926 A1 | 9/2002 | Bushold |
| 2002/0161620 A1 | 10/2002 | Hatanaka |
| 2002/0161651 A1 | 10/2002 | Godsey |
| 2002/0161664 A1 | 10/2002 | Shaya et al. |
| 2002/0167539 A1 | 11/2002 | Brown et al. |
| 2003/0004781 A1 | 1/2003 | Mallon |
| 2003/0009768 A1 | 1/2003 | Moir |
| 2003/0011641 A1 | 1/2003 | Totman et al. |
| 2003/0014304 A1 | 1/2003 | Calvert et al. |
| 2003/0023754 A1 | 1/2003 | Eichstadt et al. |
| 2003/0028415 A1 | 2/2003 | Herschap et al. |
| 2003/0036949 A1 | 2/2003 | Kaddeche et al. |
| 2003/0041056 A1 | 2/2003 | Bossemeyer et al. |
| 2003/0055778 A1 | 3/2003 | Erlanger |
| 2003/0061091 A1 | 3/2003 | Amaratunga |
| 2003/0079176 A1 | 4/2003 | Kang et al. |
| 2003/0105826 A1 | 6/2003 | Mayraz |
| 2003/0110130 A1 | 6/2003 | Pelletier |
| 2003/0140037 A1 | 7/2003 | Deh-Lee |
| 2003/0149581 A1 | 8/2003 | Chaudhri et al. |
| 2003/0149937 A1 | 8/2003 | McElfresh et al. |
| 2003/0154196 A1 | 8/2003 | Goodwin et al. |
| 2003/0167195 A1 | 9/2003 | Fernandes et al. |
| 2003/0177096 A1 | 9/2003 | Trent et al. |
| 2003/0195848 A1 | 10/2003 | Felger |
| 2003/0217332 A1 | 11/2003 | Smith et al. |
| 2003/0221163 A1 | 11/2003 | Glover et al. |
| 2003/0233425 A1 | 12/2003 | Lyons et al. |
| 2004/0034567 A1 | 2/2004 | Gravett |

(56) References Cited

U.S. PATENT DOCUMENTS

| | | |
|---|---|---|
| 2004/0064412 A1 | 4/2004 | Phillips et al. |
| 2004/0073475 A1 | 4/2004 | Tupper |
| 2004/0088323 A1 | 5/2004 | Elder et al. |
| 2004/0128390 A1 | 7/2004 | Blakley et al. |
| 2004/0141016 A1 | 7/2004 | Fukatsu et al. |
| 2004/0153368 A1 | 8/2004 | Freishtat et al. |
| 2004/0163101 A1 | 8/2004 | Swix et al. |
| 2004/0167928 A1 | 8/2004 | Anderson et al. |
| 2004/0193377 A1 | 9/2004 | Brown |
| 2004/0210820 A1 | 10/2004 | Tarr et al. |
| 2004/0243539 A1 | 12/2004 | Skurtovich et al. |
| 2004/0249650 A1 | 12/2004 | Freedman |
| 2004/0260574 A1 | 12/2004 | Gross |
| 2005/0004864 A1 | 1/2005 | Lent et al. |
| 2005/0014117 A1 | 1/2005 | Stillman |
| 2005/0033641 A1 | 2/2005 | Jha et al. |
| 2005/0033728 A1 | 2/2005 | James |
| 2005/0044149 A1 | 2/2005 | Regardie et al. |
| 2005/0091254 A1 | 4/2005 | Stabb |
| 2005/0096963 A1 | 5/2005 | Myr |
| 2005/0096997 A1 | 5/2005 | Jain et al. |
| 2005/0097089 A1 | 5/2005 | Nielsen et al. |
| 2005/0102177 A1 | 5/2005 | Takayama |
| 2005/0114195 A1 | 5/2005 | Bernasconi |
| 2005/0131944 A1 | 6/2005 | Edward |
| 2005/0132205 A1 | 6/2005 | Palliyil et al. |
| 2005/0138115 A1 | 6/2005 | Llamas et al. |
| 2005/0171861 A1 | 8/2005 | Bezos et al. |
| 2005/0183003 A1 | 8/2005 | Peri |
| 2005/0198120 A1 | 9/2005 | Reshef et al. |
| 2005/0198212 A1 | 9/2005 | Zilberfayn et al. |
| 2005/0198220 A1 | 9/2005 | Wada et al. |
| 2005/0216342 A1 | 9/2005 | Ashbaugh |
| 2005/0234761 A1 | 10/2005 | Pinto |
| 2005/0256955 A1 | 11/2005 | Bodwell et al. |
| 2005/0262065 A1 | 11/2005 | Barth et al. |
| 2005/0273388 A1 | 12/2005 | Roetter |
| 2005/0288943 A1 | 12/2005 | Wei et al. |
| 2006/0015390 A1 | 1/2006 | Rijsinghani et al. |
| 2006/0021009 A1 | 1/2006 | Lunt |
| 2006/0026147 A1 | 2/2006 | Cone et al. |
| 2006/0026237 A1 | 2/2006 | Wang et al. |
| 2006/0041378 A1 | 2/2006 | Cheng |
| 2006/0041476 A1 | 2/2006 | Zheng |
| 2006/0041562 A1 | 2/2006 | Paczkowski et al. |
| 2006/0047615 A1 | 3/2006 | Ravin et al. |
| 2006/0059124 A1 | 3/2006 | Krishna |
| 2006/0106788 A1 | 5/2006 | Forrest |
| 2006/0122850 A1 | 6/2006 | Ward et al. |
| 2006/0168509 A1 | 7/2006 | Boss et al. |
| 2006/0224750 A1 | 10/2006 | Davies |
| 2006/0253319 A1 | 11/2006 | Chayes et al. |
| 2006/0265495 A1 | 11/2006 | Butler et al. |
| 2006/0271545 A1 | 11/2006 | Youn et al. |
| 2006/0277477 A1 | 12/2006 | Christenson |
| 2006/0282327 A1 | 12/2006 | Neal et al. |
| 2006/0282328 A1 | 12/2006 | Gerace et al. |
| 2006/0284378 A1 | 12/2006 | Snow et al. |
| 2006/0284892 A1 | 12/2006 | Sheridan |
| 2006/0288087 A1 | 12/2006 | Sun |
| 2006/0293950 A1 | 12/2006 | Meek et al. |
| 2007/0027771 A1 | 2/2007 | Collins et al. |
| 2007/0027785 A1 | 2/2007 | Lent et al. |
| 2007/0053513 A1 | 3/2007 | Hoffberg |
| 2007/0061412 A1 | 3/2007 | Karidi et al. |
| 2007/0061421 A1 | 3/2007 | Karidi |
| 2007/0073585 A1 | 3/2007 | Apple et al. |
| 2007/0094228 A1 | 4/2007 | Nevin et al. |
| 2007/0100653 A1 | 5/2007 | Ramer et al. |
| 2007/0100688 A1 | 5/2007 | Book |
| 2007/0116238 A1 | 5/2007 | Jacobi |
| 2007/0116239 A1 | 5/2007 | Jacobi |
| 2007/0162501 A1 | 7/2007 | Agassi et al. |
| 2007/0162846 A1 | 7/2007 | Cave |
| 2007/0168874 A1 | 7/2007 | Kloeffer |
| 2007/0185751 A1 | 8/2007 | Dempers |
| 2007/0206086 A1 | 9/2007 | Baron et al. |
| 2007/0214048 A1 | 9/2007 | Chan |
| 2007/0239527 A1 | 10/2007 | Nazer et al. |
| 2007/0250585 A1 | 10/2007 | Ly et al. |
| 2007/0256003 A1 | 11/2007 | Wagoner |
| 2007/0260596 A1 | 11/2007 | Koran et al. |
| 2007/0260624 A1 | 11/2007 | Chung et al. |
| 2007/0265873 A1 | 11/2007 | Sheth et al. |
| 2008/0021816 A1 | 1/2008 | Lent et al. |
| 2008/0033794 A1 | 2/2008 | Ou et al. |
| 2008/0033941 A1 | 2/2008 | Parrish |
| 2008/0040225 A1 | 2/2008 | Roker |
| 2008/0072170 A1 | 3/2008 | Simons |
| 2008/0133650 A1 | 6/2008 | Saarimaki et al. |
| 2008/0147480 A1 | 6/2008 | Sarma et al. |
| 2008/0147486 A1 | 6/2008 | Wu et al. |
| 2008/0147741 A1 | 6/2008 | Gonen et al. |
| 2008/0183745 A1 | 7/2008 | Cancel et al. |
| 2008/0183806 A1 | 7/2008 | Cancel et al. |
| 2008/0201436 A1 | 8/2008 | Gartner |
| 2008/0215541 A1 | 9/2008 | Li et al. |
| 2008/0222656 A1 | 9/2008 | Lyman |
| 2008/0244024 A1 | 10/2008 | Aaltonen et al. |
| 2008/0262897 A1 | 10/2008 | Howarter et al. |
| 2008/0270294 A1 | 10/2008 | Lent et al. |
| 2008/0270295 A1 | 10/2008 | Lent et al. |
| 2008/0275864 A1 | 11/2008 | Kim |
| 2008/0288658 A1 | 11/2008 | Banga |
| 2008/0319778 A1 | 12/2008 | Abhyanker |
| 2009/0006174 A1 | 1/2009 | Lauffer |
| 2009/0006179 A1 | 1/2009 | Billingsley et al. |
| 2009/0006622 A1 | 1/2009 | Doerr |
| 2009/0030859 A1 | 1/2009 | Buchs et al. |
| 2009/0037355 A1 | 2/2009 | Brave |
| 2009/0055267 A1 | 2/2009 | Roker |
| 2009/0063645 A1 | 3/2009 | Casey et al. |
| 2009/0076887 A1 | 3/2009 | Spivack et al. |
| 2009/0099904 A1 | 4/2009 | Affeld et al. |
| 2009/0119173 A1 | 5/2009 | Parsons et al. |
| 2009/0132368 A1 | 5/2009 | Cotter et al. |
| 2009/0138563 A1 | 5/2009 | Zhu |
| 2009/0138606 A1 | 5/2009 | Moran et al. |
| 2009/0164171 A1 | 6/2009 | Wold et al. |
| 2009/0177771 A1 | 7/2009 | Britton et al. |
| 2009/0210405 A1 | 8/2009 | Ortega et al. |
| 2009/0222572 A1 | 9/2009 | Fujihara |
| 2009/0228914 A1 | 9/2009 | Wong |
| 2009/0240586 A1 | 9/2009 | Ramer et al. |
| 2009/0287534 A1 | 11/2009 | Guo et al. |
| 2009/0287633 A1 | 11/2009 | Nevin et al. |
| 2009/0293001 A1 | 11/2009 | Lu et al. |
| 2009/0298480 A1 | 12/2009 | Khambete |
| 2009/0307003 A1 | 12/2009 | Benjamin |
| 2009/0319296 A1 | 12/2009 | Schoenberg |
| 2009/0327863 A1 | 12/2009 | Holt et al. |
| 2010/0023475 A1 | 1/2010 | Lahav |
| 2010/0023581 A1 | 1/2010 | Lahav |
| 2010/0049602 A1 | 2/2010 | Softky |
| 2010/0063879 A1 | 3/2010 | Araradian et al. |
| 2010/0106552 A1 | 4/2010 | Barillaud |
| 2010/0125657 A1 | 5/2010 | Dowling et al. |
| 2010/0169176 A1 | 7/2010 | Turakhia |
| 2010/0169342 A1 | 7/2010 | Kenedy |
| 2010/0205024 A1 | 8/2010 | Shachar et al. |
| 2010/0211579 A1 | 8/2010 | Fujioka |
| 2010/0255812 A1 | 10/2010 | Nanjundaiah et al. |
| 2010/0262558 A1 | 10/2010 | Willcock |
| 2010/0281008 A1 | 11/2010 | Braunwarth |
| 2010/0306043 A1 | 12/2010 | Lindsay et al. |
| 2011/0041168 A1 | 2/2011 | Murray et al. |
| 2011/0055207 A1 | 3/2011 | Schorzman et al. |
| 2011/0055331 A1 | 3/2011 | Adelman et al. |
| 2011/0055338 A1 | 3/2011 | Loeb et al. |
| 2011/0112893 A1 | 5/2011 | Karlsson et al. |
| 2011/0113101 A1 | 5/2011 | Ye et al. |
| 2011/0119264 A1 | 5/2011 | Hu et al. |
| 2011/0131077 A1 | 6/2011 | Tan |
| 2011/0137733 A1 | 6/2011 | Baird et al. |

(56) References Cited

U.S. PATENT DOCUMENTS

| | | |
|---|---|---|
| 2011/0138298 A1 | 6/2011 | Alfred et al. |
| 2011/0161792 A1 | 6/2011 | Florence et al. |
| 2011/0208822 A1 | 8/2011 | Rathod |
| 2011/0246255 A1 | 10/2011 | Gilbert et al. |
| 2011/0246406 A1 | 10/2011 | Lahav et al. |
| 2011/0258039 A1 | 10/2011 | Patwa et al. |
| 2011/0270926 A1 | 11/2011 | Boyd |
| 2011/0271175 A1 | 11/2011 | Lavi et al. |
| 2011/0307331 A1 | 12/2011 | Richard et al. |
| 2011/0320715 A1 | 12/2011 | Ickman et al. |
| 2012/0012358 A1 | 1/2012 | Horan et al. |
| 2012/0036200 A1 | 2/2012 | Cole |
| 2012/0042389 A1 | 2/2012 | Bradley et al. |
| 2012/0059722 A1 | 3/2012 | Rao |
| 2012/0066345 A1 | 3/2012 | Rayan |
| 2012/0130918 A1 | 5/2012 | Gordon |
| 2012/0136939 A1 | 5/2012 | Stern et al. |
| 2012/0150973 A1 | 6/2012 | Barak |
| 2012/0173373 A1 | 7/2012 | Soroca |
| 2012/0195422 A1 | 8/2012 | Famous |
| 2012/0254301 A1 | 10/2012 | Fiero |
| 2012/0259891 A1 | 10/2012 | Edoja |
| 2012/0323346 A1 | 12/2012 | Ashby et al. |
| 2013/0013362 A1 | 1/2013 | Walker et al. |
| 2013/0036202 A1 | 2/2013 | Lahav |
| 2013/0054707 A1 | 2/2013 | Muszynski et al. |
| 2013/0117276 A1 | 5/2013 | Hedditch |
| 2013/0117804 A1 | 5/2013 | Chawla |
| 2013/0132194 A1 | 5/2013 | Rajaram |
| 2013/0165234 A1 | 6/2013 | Hall |
| 2013/0182834 A1 | 7/2013 | Lauffer |
| 2013/0204859 A1 | 8/2013 | Vijaywargi et al. |
| 2013/0212497 A1 | 8/2013 | Zelenko et al. |
| 2013/0238714 A1 | 9/2013 | Barak et al. |
| 2013/0268468 A1 | 10/2013 | Vijayaraghavan et al. |
| 2013/0275862 A1 | 10/2013 | Adra |
| 2013/0290533 A1 | 10/2013 | Barak |
| 2013/0311874 A1 | 11/2013 | Schachar et al. |
| 2013/0326375 A1 | 12/2013 | Barak et al. |
| 2013/0336471 A1 | 12/2013 | Agarwal et al. |
| 2013/0339445 A1 | 12/2013 | Perincherry |
| 2014/0068011 A1 | 3/2014 | Zhang et al. |
| 2014/0115466 A1 | 4/2014 | Barak et al. |
| 2014/0222888 A1 | 8/2014 | Karidi |
| 2014/0250051 A1 | 9/2014 | Lahav et al. |
| 2014/0278795 A1 | 9/2014 | Satyamoorthy |
| 2014/0310229 A1 | 10/2014 | Lahav et al. |
| 2014/0372240 A1 | 12/2014 | Freishtat et al. |
| 2015/0012602 A1 | 1/2015 | Barak et al. |
| 2015/0012848 A1 | 1/2015 | Barak et al. |
| 2015/0019525 A1 | 1/2015 | Barak et al. |
| 2015/0019527 A1 | 1/2015 | Barak et al. |
| 2015/0149571 A1 | 5/2015 | Barak et al. |
| 2015/0200822 A1 | 7/2015 | Zelenko et al. |
| 2015/0213363 A1 | 7/2015 | Lahav et al. |
| 2015/0248486 A1 | 9/2015 | Barak et al. |
| 2015/0269609 A1 | 9/2015 | Mehanian |
| 2015/0278837 A1 | 10/2015 | Lahav et al. |
| 2016/0055277 A1 | 2/2016 | Lahav et al. |
| 2016/0117736 A1 | 4/2016 | Barak et al. |
| 2016/0248706 A1 | 8/2016 | Karidi |
| 2016/0380932 A1 | 12/2016 | Matan et al. |
| 2017/0011146 A1 | 1/2017 | Lahav et al. |
| 2017/0046021 A1 | 2/2017 | Karidi |
| 2017/0054701 A1 | 2/2017 | Barak et al. |
| 2017/0169081 A1 | 6/2017 | Barak et al. |
| 2017/0171047 A1 | 6/2017 | Freishtat et al. |
| 2017/0206568 A1 | 7/2017 | Schachar et al. |

FOREIGN PATENT DOCUMENTS

| | | | |
|---|---|---|---|
| EP | 1276 064 | A2 | 1/2003 |
| EP | 1549025 | A1 | 6/2005 |
| EP | 1 840 803 | A1 | 10/2007 |
| EP | 1845436 | A2 | 10/2007 |
| EP | 1850284 | A1 | 10/2007 |
| FR | 2 950 214 | A1 | 3/2011 |
| JP | 9288453 | A2 | 11/1997 |
| JP | 2004-054533 | | 2/2004 |
| JP | 2010/128877 | | 6/2010 |
| KR | 20040110399 | A | 12/2004 |
| KR | 20050010487 | A | 1/2005 |
| KR | 20080046310 | A | 5/2008 |
| KR | 20080097751 | A | 11/2008 |
| WO | 9722073 | A1 | 6/1997 |
| WO | 9845797 | A2 | 10/1998 |
| WO | 9909470 | A1 | 2/1999 |
| WO | 9922328 | A1 | 5/1999 |
| WO | 9944152 | A1 | 9/1999 |
| WO | 00/57294 | A1 | 9/2000 |
| WO | 0127825 | A1 | 4/2001 |
| WO | 2001/035272 | A2 | 5/2001 |
| WO | 02/065367 | A2 | 8/2002 |
| WO | 03/032146 | A1 | 4/2003 |
| WO | 2004/057473 | A1 | 7/2004 |
| WO | 2005/059777 | A1 | 6/2005 |
| WO | 2007/044757 | A1 | 4/2007 |
| WO | 2007/129625 | A1 | 11/2007 |
| WO | 2008/057181 | A2 | 5/2008 |
| WO | 2008/143382 | A1 | 11/2008 |
| WO | 2009/029940 | A1 | 3/2009 |
| WO | 2010/099632 | A1 | 9/2010 |
| WO | 2010/119379 | A1 | 10/2010 |
| WO | 2010/144207 | A2 | 12/2010 |
| WO | 2011/127049 | A1 | 10/2011 |
| WO | 2013/119808 | A1 | 8/2013 |
| WO | 2013/158830 | A1 | 10/2013 |
| WO | 2013/163426 | A1 | 10/2013 |
| WO | 2015/021068 | A2 | 2/2015 |

OTHER PUBLICATIONS

Just Answer (2004 Faq) Archive.org cache of www.justanswer.com circa (Dec. 2004), 8 pages.
Pack Thomas, "Human Search Engines the next Killer app," (Dec. 1, 2000) Econtent DBS vol. 23; Issue 6, 7 pages.
Match.com "Match.com Launches Match.com Advisors," PR Newswire (Oct. 14, 2003), 2 pages.
SITEL, "SITEL to Provide Live Agent Support Online for Expertcity.com," PR Newswire (Feb. 28, 2000), 2 pages.
Webmaster World, "Link to my website is in a frame with banner ad at the top," www.webmasterworld.com (Nov. 11, 2003), 2 pages.
Bry et al., "Realilzing Business Processes with ECA Rules: Benefits, Challenges, Limits," Principles and Practice of Sematic Web Reasoning Lecture Notes in Computer Science, pp. 48-62, LNCS, Springer, Berlin, DE (Jan. 2006).
FAIRISAAC, "How SmartForms for Blaze Advisor Works," www.fairisaac.com 12 pages (Jan. 2005).
Mesbah A et al., "A Component-and Push-Based Architectural Style for Ajax Applications," The Journal of Systems & Software, 81 (12): pp. 2194-2209, Elsevier North Holland, New York, NY US (Dec. 2008).
Oracle Fusion Middleware Administrator's Guide for Oracle SOA (Oracle Guide) Suite 11g Release 1 (11.1.1) Part No. E10226-02 www.docs.oracle.com (Oct. 2009), 548 pages.
"OAuth core 1.0 Revision A [XP002570263]," OAuth Core Workgroups, pp. 1-27 www.ouath.net/core/1.0a/ (retrieved Jan. 31, 2013), 24 pages.
Anon., "AnswerSoft Announces Concerto; First to Combine Call Center Automation with Power of Web," Business Wire, (Feb. 3, 1997) 3 pages.
Emigh, J., "AnswerSoft Unveils Concerto for Web-Based Call Centers Feb. 5, 1996," Newsbytes, (Feb. 5, 1997) 2 pages.
Grigonis, R., "Webphony—It's not Just Callback Buttons Anymore," Computer Telephony, (Dec. 1997) 4 pages.
Wagner, M., "Caring for Customers," Internet World, (Sep. 1, 1999) 3 pages.
Sweat, J., "Human Touch—A New Wave of E-Service Offerings Blends the Web, E-Mail, and Voice Bringing People back into the Picture," Information week, (Oct. 4, 1999) 2 pages.

(56) References Cited

OTHER PUBLICATIONS

Kirkpatrick, K., "Electronic Exchange 2000, The, " Computer Shopper, (Nov. 1999) 5 pages.
Anon., "InstantService.com Teams with Island Data to provide Integrated Solution for Online Customer Response," Business Wire, (May 22, 2000) 3 pages.
Kersnar, S., "Countrywide Offers Proprietary Technology for Online Wholesale Lending," National Mortgage News, vol. 24, No. 38, (Jun. 5, 2000) 2 pages.
Douglas Armstrong, Firstar Web site helps add up future, Milwaukee Journal Sentinel, (Mar. 28, 1996) 3 pages.
Redhat_.com downloaded on Jul. 23, 2006.
Apache.org downloaded on Jul. 23, 2006.
Mysql.com downloaded on Jul. 23, 2006.
Developer.com downloaded on Jul. 23, 2006.
Canter, Ronald S., "Lender Beware-Federal Regulation of Consumer Credit", Credit World, vol. 81, No. 5, pp. 16-20, (May 1993).
Staff, "On-Line System Approves Loans While Customer Waits," Communication News, vol. 31, Issue 9, (Sep. 1994) 3 pages.
"Low-Rent Loan Officer in a Kiosk", Bank Technology News vol. 8 No. 2, p (Feb. 1995) 2 pages.
Duclaux, Denise, "A Check for $5,000 in Ten Minutes", ABA Banking Journal, vol. 87, No. 8, p. 45, AUQ. (1995) 2 pages.
"World Wide Web Enhances Customer's Choice", Cards International, No. 143, p. 9, (Nov. 1995) 2 pages.
Wells Fargo Launches First Real-Time, Online Home Equity Credit Decision-Making Service, Business Wire, (Jun. 3, 1998), Dialog_ File 621: New Product Announcement, 3 pages.
Handley, John, "Credit Review Lets the Numbers Do the Talking in Home Mortgage Game", Chicago Tribune (Jul. 1998) 3 pages.
Sherman, Lee, "Wells Fargo Writes a New Online Script", Interactive Week, vol. 5, No. 31, p. 29, (Aug. 1998) 2 pages.
Calvey, Mark, "Internet Gives Bankers a Snappy Comeback", San Francisco Business Times, vol. 13, No. 5, p. 3 (Sep. 1998) 2 pages.
McCormick, Linda, "Users of Credit Scoring Face Tough Rules on Notification", American Banker, Dialog File 625: American Banker Publications, (Mar. 21, 1982) 2 pages.
What the Credit Bureau is Saying About You: If a Mistake Sneaks Into Your Record, You May Not Know About it Until You Get Turned Down for Credit, Changing Times, vol. 37, p. 56, (Jul. 1983) 2 pages.
McShane. Peter K., "Got Financing?", Business Journal Serving Southern Tier, CNY, Mohawk Valley, Finger Lakes. North, vol. 11, Issue 19, p. 9, (Sep. 15, 1997) 3 pages.
Borowsky, Mark, "The Neural Net: Predictor of Fraud or Victim of Hype?", Bank Technology News DialoQ File 16:PROMT, p. 7 (Sep. 1993) 2 pages.
FICO http://houseloans.idis.com/fico (2009) 1 page.
Altavista: search, FICO http://www.altavista.com (2001) 3 pages.
What Do FICO Scores Mean to Me?, http://www.sancap.com. (1999) 3 pages.
What is a FICO Score?, http://www.aspeenloan.com (2009) 1 page.
"Credit", The New Encyclopedia Britannica vol. 3 p. 722. (1994) 3 pages.
"Creditnet.com—An Online Guide to Credit Cards", http://www.creditnet/com. (1999) 1 page.
"Phillips 66 Introduces Mastercard with Rebate Feature", PR Newswire, p914NY067, (Sep. 14, 1995) 1 page.
Anon, "VAR Agreement Expands Credit Bureau Access.", (CCS America, Magnum Communications Ltd expand CardPac access, Computers in Banking, v6, n10, (1) (Oct. 1989) 2 pages.
Wortmann, Harry S., "Reengineering Update—Outsourcing: An Option Full of Benefits and Responsibilities", American Banker, (Oct. 24, 1994), p. 7A vol. 159, No. 205 3 pages.
Anon. "To Boost Balances, AT&T Renews No-Fee Universal Credit Card Offer", Gale Group Newsletter, V 10, N. 13, (Mar. 30, 1992) 2 pages.
Anon. "Citgo Puts a New Spin on the Cobranded Oil Card", Credit Card News, p. 4, (Nov. 1, 1995) 2 pages.

Anon. "Microsoft Targets More than PIM Market with Outlook 2000," Computer Reseller News, N. 805 pp. 99, (Aug. 31, 1998) 2 pages.
Chesanow, Neil, "Pick the Right Credit Cards—and use them wisely", Medical Economics, v. 75, n. 16, p. 94, (Aug. 24, 1998) 4 pages.
Friedland, Marc, "Credit Scoring Digs Deeper into Data", Credit World, v. 84, n. 5 p. 19-23, (May 1996) 5 pages.
Hollander, Geoffrey, "Sibling Tool Personator 3 untangles File Formats", InfoWorld, v20, n5, pp. 102 (Feb. 2, 1998) 2 pages.
Kantrow, Yvette D., "Banks Press Cardholders to Take Cash Advances", American Banker, v. 157, n. 18 pp. 1-2. (Jan. 28, 1992) 2 pages.
Lotus News Release: "Lotus Delivers Pre-Release of Lotus Notes 4.6 Client Provides Compelling New Integration with Internet Explorer", (May 20, 1997) 2 pages.
Stetenfeld, Beth, "Credit Scoring: Finding the Right Recipe", Credit Union Management, v. 17, n. 11, pp. 24-26 (Nov. 1994).
Block, Valerie, "Network Assembles Card Issuers at an Internet Site", Am. Banker, V160, (1998) 1 page.
CreditNet Financial Network http://consumers.creditnet.com (1999) 1 page.
Anon., "Lending Tree: Lending Tree Provides Borrowers Fast and Easy Online Access to Multiple Loan Offers," Business Wire, Jun. 23, 1998, 2 pages.
Anon, Regulation Z Commentary Amendments, Retail Banking Digest, vol. 15, No. 2, p. 17-18, (Mar.-Apr. 1995).
Anon, San Diego Savings Association Offers Customers No-Fee Visa Product, Card News, (Feb. 29, 1988) 1 page.
Bloom, J.K., "For This New Visa, Only Web Surfers Need Apply," American Banker, vol. 1163, No. 34 12 (Feb. 20, 1998) 2 pages.
Harney, K.R., "Realty Brokers, Lenders Face Restrictions," Arizona Republic, Final Chaser edition, Sun Living section, (Feb. 10, 1991) 2 pages.
Higgins, K.T., "Mr. Plastic Joins the Marketing Team," Credit Card Management, vol. 6, No. 3, pp. 26-30, Jun. 1993.
Microsoft Press Computer Dictionary, Third Edition, Microsoft Press, Redmond, 1997, 4 pages.
Whiteside, D.E., "One Million and Counting," Collections and Credit Risk, vol. 1, No. 11 (Nov. 1996) 5 pages.
Fickenscher, L., "Providian Undercuts rivals with 7.9% Rate Offer," American banker, vol. 163, Oct. 8, 1998, 2 pages.
Fargo, J., "The Internet Specialists," Credit Card Management, vol. 11, No. 10, pp. 38-45, Jan. 1999.
Lemay, T., "Browsing for a Mortgage a Click away," Financial Post, (Jan. 15, 2000) 1 page.
Wijnen, R., "Banks Fortify Online Services," Bank Technology News, vol. 13, No. 3, Mar. 2000, 3 pages.
Anon. "IAFC Launches NextCard, The First True Internet VISA," Business Wire, New York: (Feb. 6, 1998), 3 pages.
Lazarony, Lucy, "Only Online Applicants Need Apply," Bank Advertising News, North Palm Beach, Mar. 23, 1998, vol. 21, Issue 15, 3 pages.
FIData, Inc., News & Press Releases, "Instant Credit Union Loans via the Internet," http://web.archive.org/web/19990221115203/www.fidata-inc.com/news-pr01.htm (1999) 2 pages.
FIData, Inc., Press Releases, "Instant Loan Approvals via the Internet," http://www.fidata-inc.com/news/pr_040198.htm, (Apr. 1, 1998) 2 pages.
Staff, "On-Line System Approves Loans While Customer Waits"—Abstract, Communication News, vol. 31, Issue 9, (Sep. 1994) 3 pages.
Anon. "Affordable Lending Systems Now Available for Smaller Financial Institutions," Business Wire, (May 18, 1998), 2 pages.
Nexis—All News Sources—Examiner's NPL Search Results in U.S. Appl. No. 11/932,498, included with Office Action dated Oct. 8, 2008, 14 pages.
"Sample Experian Credit Report" by Consumer Information consumerinfo.com (Jul. 9, 1998) 4 pages.
Plaintiffs Original Complaint, *Nextcard, LLC* v. *Liveperson, Inc.*; Civil Action No. 2:08-cv-00184-TJW, in the U.S. District Court for the Eastern District of Texas, Marshall Division, filed Apr. 30, 2008 (7 pages).

(56) References Cited

OTHER PUBLICATIONS

Amended Complaint and Jury Demand; *Liveperson, Inc.* v. *Nextcard, LLC, et al.*; Civil Action No. 08-062 (GMS), in the U.S. District Court for the District of Delaware, filed Mar. 18, 2008 (5 pages).
Plaintiffs Second Amended Complaint; *Nextcard, LLC* v. *American Express Company, et al*; Civil Action No. 2:07-cv-354 (TJW); In the U.S. District Court for the Eastern District of Texas, Marshall Division, filed Apr. 9, 2008 (12 pages).
Defendants HSBC North America Holdings Inc.'s and HSBC USA Inc's Answer, Affirmative Defenses and Counterclaims to Plaintiffs Second Amended Complaint; *Nextcard, LLC* v. *American Express Company, et al*; Civil Action No. 2:07-cv-354 (TJW); In the U.S. District Court for the Eastern District of Texas, Marshall Division filed (Apr. 28, 2008), 13 pages.
Answer and Counterclaims of Defendant DFS Services LLC; *Nextcard, LLC* v. *American Express Company, et al*; Civil Action No. 2:07-cv-354 (TJW); In the U.S. District Court for the Eastern District of Texas, Marshall Division, filed Apr. 28, 2008 (13 pages).
Defendant The PNC Financial Services Group, Inc.'s Answer and Affirmative Defenses to Second Amended Complaint; *Nextcard, LLC* v. *American Express Company, et al*; Civil Action No. 2:07-cv-354 (TJW); In the U.S. District Court for the Eastern District of Texas, Marshall Division, filed Apr. 28, 2008, 10 pages.
Plaintiffs Second Amended Reply to Counterclaims of Defendants HSBC North America Holdings Inc. and HSBC USA Inc.; *Nextcard, LLC* v. *American Express Company, et al*; Civil Action No. 2:07-cv-354 (TJW); In the U.S. District Court for the Eastern District of Texas, Marshall Division, filed May 14, 2008, 5 pages.
Plaintiffs Second Amended Reply to Counterclaims of Defendant DFS Services LLC; *Nextcard, LLC* v. *American Express Company, et al*; Civil Action No. 2:07-cv-354 (TJW); In the U.S. District Court for the Eastern District of Texas, Marshall Division, filed May 14, 2008 (71 pages).
Plaintiffs Second Amended Reply to Counterclaims of Defendant American Express Company; *Nextcard, LLC* v. *American Express Company, et al*; Civil Action No. 2:07-cv-354 (TJW); In the U.S. District Court for the Eastern District of Texas, Marshall Division, filed (May 8, 2008), 8 pages.
Justin Hibbard, Gregory Dalton, Mary E Thyfault. (Jun. 1998). "Web-based customer care." Information Week, (684) 18-20, 3 pages.
Kim S. Nash "Call all Customers." Computerworld, 32 (1), 25-28 (Dec. 1997), 2 pages.
PRN: "First American Financial Acquires Tele-Track Inc.,"PR Newswire, (May 11, 1999), Proquest #41275773, 2 pages.
Young, Deborah, "The Information Store," (Sep. 15, 2000), Wireless Review, pp. 42, 44, 46, 48, 50.
Whiting et al., "Profitable Customers," (Mar. 29, 1999), Information Week, Issue 727, pp. 44, 45, 48, 52, 56.
Bayer, Judy, "A Framework for Developing and Using Retail Promotion Response Models," Cares Integrated Solutions, retrieved from www.ceresion.com (2007) 5 pages.
Bayer, Judy, "Automated Response Modeling System for Targeted Marketing," (Mar. 1998), Ceres Integrated Solutions, 5 pages.
Sweet et al., "Instant Marketing," (Aug. 12, 1999), Information Week, pp. 18-20.
SmartKids.com "Chooses Quadstone—The Smartest Customer Data Mining Solution," (Jul. 31, 2000), Business Wire, 2 pages.
"NCR's Next Generation Software Makes True Customer Relationship Management a Reality," (Jul. 26, 1999) PR Newswire, 3 pages.
"Quadstone System 3.0 Meets New Market Demand for Fast, Easy-to-Use Predictive Analysis for CRM," (May 22, 2000) Business Wire, 3 pages.
"Net Perceptions Alters Dynamics of Marketing Industry with Introduction of Net Perceptions for Call Centers," (Oct. 12, 1998) PR Newswire, 3 pages.
"Ceres Targeted Marketing Application," Ceres Integrated Solutions: retrieved from www.ceresios.com/Product/index.htm (2007) 3 pages.

Prince, C. J., E:business: A Look at the Future, Chief Executive, vol. 154, (Apr. 2000), pp. 10-11.
Oikarinen et al. "Internet Relay Chat Protocol" RFC-1459, pp. 1-65, (May 1993).
EDiet.com: Personalized Diets, Fitness, and Counseling, (May 3, 1998), pp. 1-15.
Fiszer, Max; "Customizing an inbound call-center with skills-based routing," Telemarketing & Call Center Solutions, (Jan. 1997), v15i7 p. 24; Proquest #11267840, 5 pages.
"ESL Federal Credit Union Inaugurates Internet Target Marketing." PR Newswire p. 4210 (Oct. 6, 1998), 3 pages.
"Welcome to eStara—The Industry Leader in Click to Call and Call Tracking Solutions," e-Stara, Inc., retrieved from www.estara.com on Mar. 21, 2013, 1 page.
"Push to Talk Live Now! From your website" iTalkSystem, Inc., retrieved from www.italksystems.com on Mar. 21, 2013, 1 page.
Richardson et al., "Predicting Clicks: Estimating the Click-Through Rate for New Ads," (May 2007) 9 pages.
"Welcome to Keen" retrieved from www.archive.org/web/20010302014355/http://www.keen.com/ on Jan. 25, 2013, 1 page.
Christophe Destruel, Herve Luga, Yves Duthen, Rene Caubet. "Classifiers based system for interface evolution." Expersys Conference, 265-270 (1997), 6 pages.
Ulla de Stricker, Annie Joan Olesen. "Is Management Consulting for You?" Searcher, 48-53 (Mar. 2005), 6 pages.
Humberto T. Marques Neto, Leonardo C.D. Rocha, Pedro H.C. Guerra, Jussara M. Almeida, Wagner Meira Jr., Virgilio A. F. Almeida. "A Characterization of Broadband User Behavior and Their E-Business Activities." ACM SIGMETRICS Performance Evaluation Review, 3-13 (2004), 11 pages.
Greg Bowman, Michael M. Danchak, Mary LaCombe, Don Porter. "Implementing the Rensselaer 80/20 Model in Professional Education." 30th ASEE/IEEE Frontiers in Education Conference, Session T3G (Oct. 18-21, 2000), 1 page.
Elizabeth Sklar Rozier, Richard Alterman. "Participatory Adaptation." CHI, 97, 261-262 (Mar. 22-27, 1997), 2 pages.
Frank White. "The User Interface of Expert Systems: What Recent Research Tells Us." Library Software Review, vol. 13, No. 2, p. 91-98 (Summer 1994) 8 pages.
Frederick W. Rook, Michael L. Donnell. "Human Cognition and the Expert System Interface: Mental Models and Inference Explanations." IEEE Transactions on Systems, Man, and Cybernetics, vol. 23, No. 6, p. 1649-1661 (Nov./Dec. 1993), 13 pages.
Francois Bry et al., "Realizing Business Processes with ECA Rules: Benefits Challenges, Limits" (2006) Principles and Practive of Semantic Web Reasoning Lecture Notes in Computer Science; LNCS Springer Belin DE pp. 48-62 XP019042871, ISBN: 978-3540-39586-7.
International Search Report and Written Opinion for PCT Application No. PCT/US2013/041147, dated Jul. 30, 2013, 9 pages.
International Search Report and Written Opinion for PCT Application No. PCT/US2013/037086, dated Jul. 12, 2013, 9 pages.
International Search Report and Written Opinion for PCT Application No. PCT/US2013/29389, dated Jul. 24, 2013, 8 pages.
International Search Report and Written Opinion for PCT Application No. PCT/US2013/038212, dated Jul. 17, 2013, 11 pages.
International Search Report for PCT Application No. PCT/US03/41090, dated Sep. 1, 2004, 3 pages.
International Search Report for PCT Application No. PCT/US05/40012, dated Oct. 5, 2007, 2 pages.
International Preliminary Report on Patentability for PCT Application No. PCT/US2006/039630, dated Apr. 16, 2008, 4 pages.
International Search Report for PCT Application No. PCT/US2011/031239, dated Jul. 7, 2011, 3 pages.
International Search Report for PCT Application No. PCT/US2011/064946, dated Jun. 22, 2012, 3 pages.
International Preliminary Report on Patentability for PCT Application No. PCT/US2011/031239, dated Oct. 9, 2012, 8 pages.
International Search Report and Written Opinion for PCT Application No. PCT/US14/49822, dated Feb. 27, 2015, 11 pages.
Extended European Search Report dated Jul. 7, 2015 for European Patent Application No. 15161694.3; 8 pages.

(56) References Cited

OTHER PUBLICATIONS

International Preliminary Report on Patentability for PCT Application No. PCT/US2014/049822, dated Feb. 18, 2016, 7 pages.
Non-Final Office Action dated Dec. 11, 2008 for U.S. Appl. No. 11/394,078, 15 pages.
Final Office Action dated Jul. 9, 2009 for U.S. Appl. No. 11/394,078, 15 pages.
Non-Final Office Action dated Jan. 28, 2010 for U.S. Appl. No. 11/394,078, 14 pages.
Final Office Action dated Jul. 9, 2010 for U.S. Appl. No. 11/394,078, 16 pages.
Non-Final Office Action dated Feb. 1, 2011 for U.S. Appl. No. 11/394,078, 20 pages.
Final Office Action dated Aug. 2, 2011 for U.S. Appl. No. 11/394,078, 23 pages.
Non-Final Office Action dated May 16, 2012 for U.S. Appl. No. 11/394,078, 23 pages.
Final Office Action dated Jan. 25, 2013 for U.S. Appl. No. 11/394,078, 22 pages.
Non-Final Office Action dated Jun. 22, 2012 for U.S. Appl. No. 13/080,324, 9 pages.
Non-Final Office Action dated Aug. 15, 2012 for U.S. Appl. No. 12/967,782, 31 pages.
Non-Final Office Action dated Jul. 29, 2011 for U.S. Appl. No. 12/608,117, 20 pages.
Final Office Action dated Apr. 4, 2012 for U.S. Appl. No. 12/608,117, 25 pages.
Non-Final Office Action dated Apr. 24, 2004 for U.S. Appl. No. 09/922,753, 16 pages.
Final Office Action dated Oct. 14, 2004 for U.S. Appl. No. 09/922,753, 13 pages.
Non-Final Office Action dated May 17, 2005 for U.S. Appl. No. 09/922,753, 13 pages.
Non-Final Office Action dated Mar. 14, 2006 for U.S. Appl. No. 09/922,753, 13 pages.
Final Office Action dated Jul. 26, 2006 for U.S. Appl. No. 09/922,753, 13 pages.
Non-Final Office Action dated Aug. 13, 2008 for U.S. Appl. No. 09/922,753, 10 pages.
Final Office Action dated Apr. 23, 2009 for U.S. Appl. No. 09/922,753, 11 pages.
Non-Final Office Action dated Jul. 21, 2009 for U.S. Appl. No. 09/922,753, 10 pages.
Final Office Action dated Feb. 18, 2010 for U.S. Appl. No. 09/922,753, 9 pages.
Non-Final Office Action dated Apr. 25, 2011 for U.S. Appl. No. 09/922,753, 9 pages.
Final Office Action dated Nov. 25, 2011 for U.S. Appl. No. 09/922,753, 10 pages.
Non-Final Office Action dated Aug. 7, 2007 for U.S. Appl. No. 10/980,613, 16 pages.
Non-Final Office Action dated May 15, 2008 for U.S. Appl. No. 10/980,613, 23 pages.
Non-Final Office Action dated Apr. 30, 2012 for U.S. Appl. No. 12/504,265, 16 pages.
Final Office Action dated Aug. 28, 2012 for U.S. Appl. No. 12/504,265, 28 pages.
Final Office Action dated Feb. 14, 2013 for U.S. Appl. No. 13/080,324, 11 pages.
Non-Final Office Action dated Mar. 30, 2013 for U.S. Appl. No. 11/360,530, 23 pages.
Final Office Action dated Apr. 11, 2013 for U.S. Appl. No. 12/967,782, 18 pages.
Non-Final Office Action dated May 10, 2013 for U.S. Appl. No. 13/563,708, 20 pages.
Non-Final Office Action dated Jun. 12, 2013 for U.S. Appl. No. 12/608,117, 56 pages.
Non-Final Office Action dated Jun. 20, 2013 for U.S. Appl. No. 13/157,936, 19 pages.
Non-Final Office Action dated Jun. 27, 2013 for U.S. Appl. No. 12/504,265, 11 pages.
Non-Final Office Action dated Jul. 8, 2013 for U.S. Appl. No. 13/413,197, 10 pages.
Final Office Action dated Oct. 21, 2013 for U.S. Appl. No. 12/504,265 14 pages.
Non-Final Office Action dated Oct. 30, 2013 for U.S. Appl. No. 13/961,072, 10 pages.
Non-Final Office Action dated Dec. 5, 2013 for U.S. Appl. No. 12/967,782, 14 pages.
Non-Final Office Action dated Dec. 4, 2014 for U.S. Appl. No. 14/275,698, 6 pages.
Notice of Allowance dated Jan. 3, 2014 for U.S. Appl. No. 11/360,530, 29 pages.
Final Office Action dated Jan. 22, 2014 for U.S. Appl. No. 12/608,117, 45 pages.
Final Office Action dated Jan. 27, 2014 for U.S. Appl. No. 13/563,708, 35 pages.
Non-Final Office Action dated Jan. 30, 2014 for U.S. Appl. No. 13/413,158, 19 pages.
Notice of Allowance dated Feb. 12, 2014 for U.S. Appl. No. 13/157,936, 33 pages.
Final Office Action dated Feb. 19, 2014 for U.S. Appl. No. 13/961,072, 35 pages.
Non-Final Office Action dated Feb. 20, 2014 for U.S. Appl. No. 10/980,613, 43 pages.
Notice of Allowance dated Feb. 28, 2014 for U.S. Appl. No. 09/922,753, 13 pages.
Notice of Allowance dated Mar. 25, 2014 for U.S. Appl. No. 12/504,265 31 pages.
Notice of Allowance dated Mar. 31, 2014 for U.S. Appl. No. 12/725,999, 41 pages.
Notice of Allowance dated Mar. 30, 2015 for U.S. Appl. No. 14/275,698, 11 pages.
Notice of Allowance dated Apr. 1, 2014 for U.S. Appl. No. 13/413,197, 32 pages.
Non-Final Office Action dated Jul. 17, 2014 for U.S. Appl. No. 11/394,078, 41 pages.
Non-Final Office Action dated Jul. 31, 2014 for U.S. Appl. No. 13/080,324, 38 pages.
Notice of Allowance dated Aug. 18, 2014 for U.S. Appl. No. 12/967,782, 43 pages.
Non-Final Office Action dated Aug. 21, 2014 for U.S. Appl. No. 10/980,613, 43 pages.
Final Office Action dated Mar. 12, 2015 for U.S. Appl. No. 13/080,324, 13 pages.
Non-Final Office Action dated Mar. 13, 2015 for U.S. Appl. No. 13/841,434, 26 pages.
Non-Final Office Action dated Apr. 9, 2015 for U.S. Appl. No. 13/830,719, 24 pages.
Final Office Action dated Apr. 7, 2015 for U.S. Appl. No. 11/394,078, 18 pages.
Non-Final Office Action dated Apr. 6, 2015 for U.S. Appl. No. 14/322,736, 13 pages.
Non-Final Office Action dated May 7, 2015 for U.S. Appl. No. 13/829,708, 16 pages.
Final Office Action dated May 8, 2015 for U.S. Appl. No. 10/980,613, 18 pages.
Non-Final Office Action dated May 13, 2015 for U.S. Appl. No. 14/317,346, 21 pages.
Non-Final Office Acton dated Jun. 2, 2015 for U.S. Appl. No. 12/608,117, 26 pages.
First Action Pre-Interview Communication dated Jun. 19, 2015 for U.S. Appl. No. 14/244,830, 7 pages.
Non-Final Office Action dated Jul. 20, 2015 for U.S. Appl. No. 14/711,609; 12 pages.
Non-Final Office Action dated Jul. 20, 2015 for U.S. Appl. No. 14/500,537; 12 pages.
Final Office Action dated Jul. 31, 2015 for U.S. Appl. No. 14/317,346, 13 pages.
Final Office Action dated Aug. 10, 2015 for U.S. Appl. No. 13/961,072, 12 pages.

(56) References Cited

OTHER PUBLICATIONS

Non-Final Office Action dated Aug. 14, 2015 for U.S. Appl. No. 14/543,397, 12 pages.
Non-Final Office Action dated Aug. 18, 2015 for U.S. Appl. No. 14/570,963, 23 pages.
Non-Final Office Action dated Aug. 27, 2015 for U.S. Appl. No. 11/394,078, 21 pages.
Non-Final Office Action dated Sep. 11, 2015 for U.S. Appl. No. 14/500,502; 12 pages.
Final Office Action dated Sep. 18, 2015 for U.S. Appl. No. 14/288,258, 17 pages.
Notice of Allowance dated Sep. 18, 2015 for U.S. Appl. No. 14/244,830, 11 pages.
First Action Interview Pilot Program Pre-Interview Communication dated Oct. 21, 2015 for U.S. Appl. No. 14/313,511, 3 pages.
Final Office Action dated Oct. 22, 2015 for U.S. Appl. No. 13/830,719, 29 pages.
Final Office Action dated Nov. 10, 2015 for U.S. Appl. No. 13/841,434; 30 pages.
Final Office Acton dated Nov. 17, 2015 for U.S. Appl. No. 12/608,117, 32 pages
Non-Final Office Action dated Dec. 4, 2015 for U.S. Appl. No. 10/980,613 21 pages.
Non-Final Office Action dated Dec. 24, 2015 for U.S. Appl. No. 14/317,346, 15 pages.
Notice of Allowance dated Dec. 30, 2015 for U.S. Appl. No. 14/322,736, 9 pages.
Non-Final Office Action dated Jan. 5, 2016 for U.S. Appl. No. 14/245,400, 33 pages.
Notice of Allowance dated Jan. 7, 2016 for U.S. Appl. No. 14/313,511, 5 pages.
First Action Pre-Interview Communication dated Jan. 12, 2016 for U.S. Appl. No. 14/753,496, 3 pages.
Notice of Allowance dated Jan. 20, 2016 for U.S. Appl. No. 13/829708, 11 pages.
Final Office Action dated Jan. 29, 2016 for U.S. Appl. No. 14/711,609; 15 pages.
Final Office Action dated Jan. 29, 2016 for U.S. Appl. No. 14/500,537; 15 pages.
Non-Final Office Action dated Feb. 12, 2016 for U.S. Appl. No. 13/080,324, 15 pages.
Notice of Allowance dated Mar. 16, 2016 for U.S. Appl. No. 14/582,550; 9 pages.
Notice of Allowance dated Mar. 21, 2016 for U.S. Appl. No. 14/753,496; 5 pages.
Final Office Action dated Apr. 14, 2016 for U.S. Appl. No. 10/980,613, 21 pages.
Final Office Action dated Apr. 21, 2016 for U.S. Appl. No. 14/317,346, 17 pages.
Non-Final Office Action dated Apr. 22, 2016 for U.S. Appl. No. 14/288,258 11 pages.
Notice of Allowance dated Apr. 22, 2016 for U.S. Appl. No. 11/394,078, 16 pages.
Non-Final Office Action dated May 12, 2016 for U.S. Appl. No. 13/961,072, 12 pages.
Non-Final Office Acton dated May 23, 2016 for U.S. Appl. No. 12/608,117, 35 pages.
Final Office Action dated Jun. 9, 2016 for U.S. Appl. No. 14/543,397, 18 pages.
Final Office Action dated Jun. 17, 2016 for U.S. Appl. No. 14/570963, 18 pages.
Notice of Allowance dated Jun. 23, 2016 for U.S. Appl. No. 13/830,719; 26 pages.
Final Office Action dated Jun. 28, 2016 for U.S. Appl. No. 14/500,502, 10 pages.
Final Office Action dated Jul. 12, 2016 for U.S. Appl. No. 14/245,400, 36 pages.
First Action Pre-Interview Communication dated Jul. 14, 2016 for U.S. Appl. No. 14/970,225.
Final Office Action dated Sep. 8, 2016 for U.S. Appl. No. 13/080,324, 15 pages.
Notice of Allowance dated Sep. 21, 2016 for U.S. Appl. No. 14/711,609, 22 pages.
Notice of Allowance dated Sep. 22, 2016 for U.S. Appl. No. 14/500,537, 19 pages.
Notice of Allowance dated Sep. 23, 2016 for U.S. Appl. No. 13/841,434, 15 pages.
Notice of Allowance dated Sep. 30, 2016 for U.S. Appl. No. 14/317,346, 19 pages.
Notice of Allowance dated Oct. 7, 2016 for U.S. Appl. No. 14/288,258, 10 pages.
Non-Final Office Action dated Jan. 13, 2017 for U.S. Appl. No. 14/543,397, 19 pages.
Non-Final Office Action dated Jan. 9, 2017 for U.S. Appl. No. 14/570,963, 16 pages.
Notice of Allowance dated Jan. 13, 2017 for U.S. Appl. No. 15/294,441, 10 pages.
Pre-Interview First Office Action dated Apr. 3, 2017 for U.S. Appl. No. 15/384,895, 7 pages.
Non-Final Office Action dated Mar. 27, 2017 for U.S. Appl. No. 14/245,400; 43 pages.
Notice of Allowance dated May 22, 2017 for U.S. Appl. No. 13/080,324; 10 pages.
Non-Final Office Action dated Jul. 17, 2017 for U.S. Appl. No. 15/131,777; 11 pages.
Non-Final Office Action dated Sep. 7, 2017 for U.S. Appl. No. 15/273,863, 29 pages.
Pre-Interview First Office Action dated Sep. 11, 2017 for U.S. Appl. No. 15/409,720, 6 pages.
Final Office Action dated Sep. 22, 2017 for U.S. Appl. No. 14/543,397, 18 pages.
Non-Final Office Action dated Sep. 25 2017 for U.S. Appl. No. 15/632,069, 12 pages.
Final Office Action dated Oct. 6, 2017 for U.S. Appl. No. 14/570,963, 17 pages.
Notice of Allowance dated Oct. 2, 2017 for U.S. Appl. No. 15/595,590, 9 pages.
Notice of Allowance dated Dec. 8, 2017 for U.S. Appl. No. 15/409,720, 9 pages.
Final Office Action dated Jan. 4, 2018 for U.S. Appl. No. 14/245,400; 22 pages.
Final Office Action dated Jan. 9, 2018 for U.S. Appl. No. 15/384,895, 10 pages.
Non-Final Office Action dated Feb. 8, 2018 for U.S. Appl. No. 14/570,963; 25 pages.
Non-Final Office Action dated Mar. 19, 2018 for U.S. Appl. No. 15/084,133; 16 pages.

\* cited by examiner

TAB #1

Close Side Menu

| Button 1 |
| Button 2 |
| Button 3 |
| Button 4 |
| Button 5 |
| Button 6 |

Open All    Close All    Hide All    Show All    Logout

Visitors — 1900

| Name | Value | Clicks | Now Viewing | Time Browsing |
|---|---|---|---|---|
| Bob Henry | 86 | 13 | Object #1 | 62 minutes |
| Unknown | 95 | 12 | Object #2 | 36 minutes |

User Profiles — 1908

| Name | Address | Phone | Relationship | Correspondence |
|---|---|---|---|---|
| | | | | 1 Email New |
| Cynthia Keppel | Address #1 | Telephone No. | | 4 Emails Total |
| | | | | 0 Email New |
| Alison Smith | Address #2 | Telephone No. | | 12 Emails Total |
| Earnesto Santo | Address #3 | Telephone No. | | 34 Email New |

Inbox — 1904

| From | Subject | Received |
|---|---|---|
| Dave Letterman (212) 345-9023 | How many checks can I write a month? | 3/22/01 |
| Unknown (313) 349-0593 | | 3/22/01 |
| jumparound@aol.com | Have rates changed today? | 3/15/01 |
| Unknown (409) 689-3857 | | 3/15/01 |
| "Cyndi Brady" goofoff@earthlink.net | Can I review the agreement prior to closing? | 3/01/01 |
| "Alice Cramden" | (No subject) | 2/25/01 |
| Unknown (505) 679-0984 | | 2/15/01 |

☑ Email Message    ○ Phone Message

FIG. 19

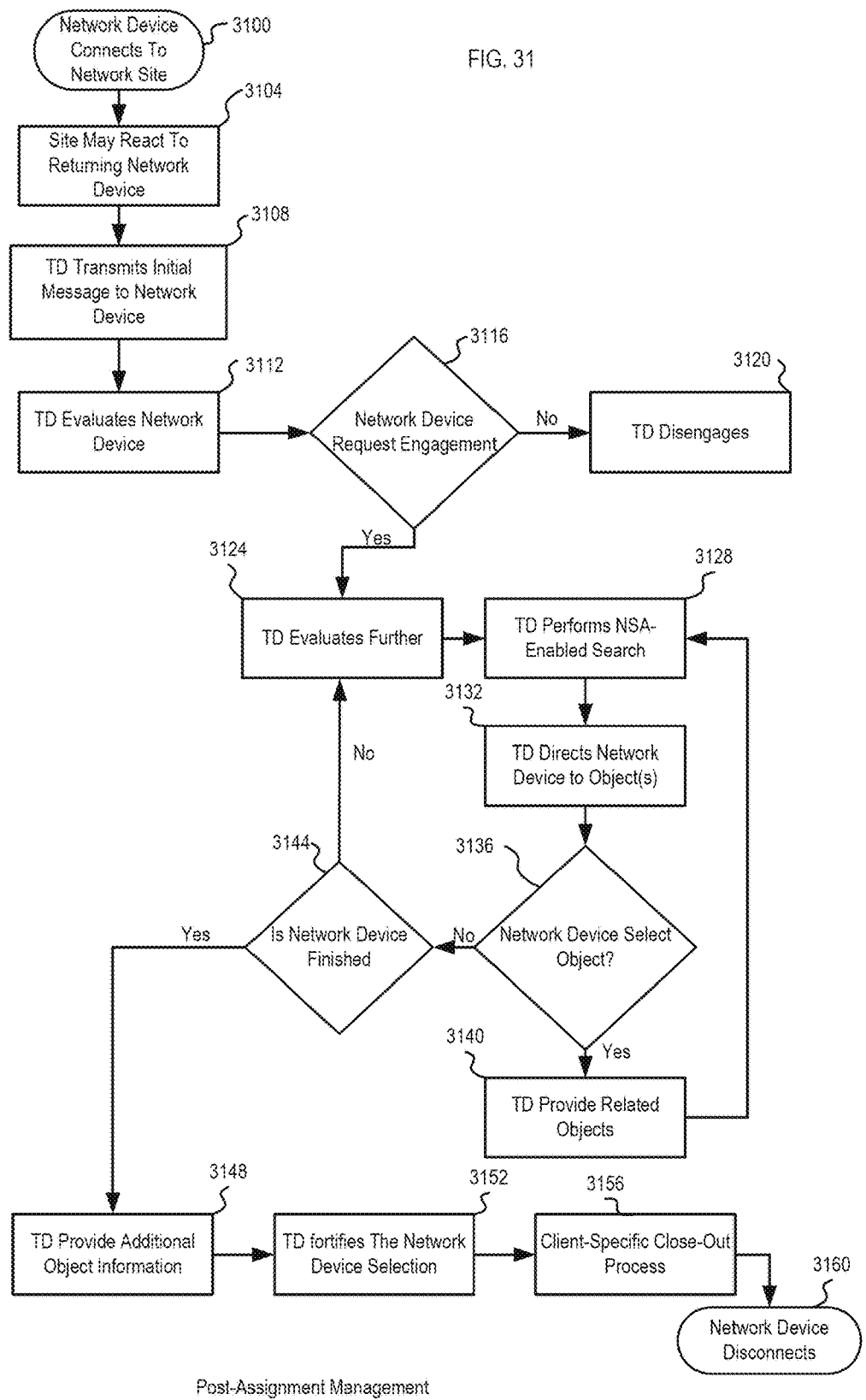

SYSTEM AND METHODS FOR FACILITATING OBJECT ASSIGNMENTS

CROSS-REFERENCE TO RELATED APPLICATIONS

This application is a continuation of U.S. patent application Ser. No. 15/294,441 filed Oct. 14, 2016, which is a continuation-in-part of U.S. patent application Ser. No. 14/288,258 filed on May 27, 2014, now issued as U.S. Pat. No. 9,576,292, which is a continuation of U.S. patent application Ser. No. 09/922,753 filed on Aug. 6, 2001, now issued as U.S. Pat. No. 8,868,448, which claims priority under 35 U.S.C. § 119(e) to U.S. Provisional Application No. 60/244,039 filed on Oct. 26, 2000. U.S. patent application Ser. No. 15/294,441 is also a continuation-in-part of U.S. application Ser. No. 10/980,613 filed on Nov. 3, 2004, which is a continuation of U.S. patent application Ser. No. 09/922,753 filed on Aug. 6, 2001, now issued as U.S. Pat. No. 8,868,448, which claims priority under 35 U.S.C. § 119(e) to U.S. Provisional Application No. 60/244,039 filed on Oct. 26, 2000. The disclosures of each of the foregoing patent applications is incorporated herein by reference in their entirety for all purposes.

FIELD OF THE INVENTION

The present disclosure relates to generally to facilitating routing of communications. More specifically, techniques are provided to facilitate communication sessions between network devices and terminal devices.

BACKGROUND

In order to enhance the efficiency of agents, clients define rules that attempt to improve the agents' time usage. Clients try to create rules which they feel are indicators of a user's likelihood of ending up with a positive result. Invariably, these rules are almost always wrong. In fact, using such a technique, rule upon rule may be created, and after a while one can logically determine the efficacy of these rules that are created due to their complexity.

A system does not exist that (i) connects users with agents, (ii) provides relevant information to terminal devices and then (iii) facilitates the type of communication between the network device and the terminal device that is familiar in real-world situations.

SUMMARY OF THE INVENTION

The present invention is directed to a system and functionality that removes the guess work out of trying to determine which network devices (e.g., computing devices associated with users interacting with a network site) are more inclined to end up with a positive result. The present invention captures as much information about network devices at a server with respect to their interactions with the server. Then the server enables the client to use rules to define the plurality of network devices that are suitable for chat invitations. Out of this plurality, the server, on behalf of each terminal device (e.g., computing devices associated with agents), can engage in communication with network devices in a random manner. As terminal devices are communicating with network devices and determining their result codes (e.g., a code representing a particular event or result), the server determines if it can identify any characteristics in those communications or communication sessions (e.g., engagements) that end up with a target result code. For example, the server may detect that network devices who were invited to communicate (e.g. chat) in the 8th minute of their session and those who had seen two particular pages end up in positive engagements four times more often than a normal network device. When a defined set of engagements is performed to allow the server to develop an evaluation protocol (e.g., a model or profile) of network devices that end up with positive engagements, the server compares all new network devices against this evaluation protocol and generates a parameter (e.g., a score or value) indicating the similarity between the new network device and the evaluation protocol. This parameter is then used by the system to order the network devices in real time and used as the rule defining who should be engaged and in which order.

The invention can also analyze information that extends beyond the network device's action or interaction (e.g., behavior) on the network site (e.g., web page, network interface, network location, URL, etc., used interchangeably herein) by interfacing with other data sources, such as network device records in the client, to provide the process additional data to analyze.

Furthermore, the invention can also use specific network device interactions on the network interface to determine if network devices have ended up with positive results, such as completion of an object assignment during or after the communication. This can be determined by analyzing the clickstream data obtained or provided by the client.

In addition, the present invention creates a system that allows agents to assign objects (e.g. products and/or services, referred to herein as "objects") to users over, through, or in conjunction with a server connected to a network. The terms "over, through or in conjunction with," used singly or in combination, contemplate object assignments that occur through the present invention that (i) are performed solely through interactions with the server, as well as object assignments that occur through the present invention that merely originate through interactions with the server, or (ii) are captured by interactions using the server, such as through the present invention, but are completed either through a telephone connection (as contemplated herein) or in face-to-face settings. With regard to the scenarios contemplated in item (ii) above, the present invention represents a bridge that connects server-based and face-to-face object assignments.

The present invention fundamentally changes object assignments using interactions with the server to one similar to object assignments in face-to-face situations with real time access to people who have resource sets relating to the objects being assigned. Moreover, the present invention provides the terminal devices with object data from the client and third parties. The present invention further monitors each object assignment and accumulates a record of techniques and data. The present invention further provides real-time communication functionality, via chat functions, voice over IP, data streaming and the public switched telephone network ("PSTN"), that facilitates live communication between the terminal devices and network devices. The present invention may be implemented by a client either as a stand-alone application or on integrated with other applications that operate in reference to a client's network site, or a client's existing customer relationship management ("CRM"), or client resource planning ("ERP") systems.

The present invention allows clients to bring their existing terminal devices into communication with network devices—generating more requests for object assignments, irrespective of where a the communication originates. The present invention further allows a new paradigm to emerge by permitting terminal devices to provide data on an object-centric, rather than an client-centric manner. Independent terminal devices (independents with respect to the client that provide a particular object) may be available for any number of network-based object assignment options.

The present invention is for use in connection with the network environment, whether wired or wireless, or can be used with other environments. The present invention has application in face-to-face environments as well. For example, the data store of subject-matter specific terminal devices could be accessed by other subject-matter specific terminal devices within the client (or by the client's administrators) to obtain data as to which agent would be fit to be the engage with a user on a face-to-face engagement. Similarly, terminal devices could use the data store of engagement data (e.g., collateral material) to address a network device's objection expressed in a face-to-face engagement. Thus, there are both offline and network-accessible (e.g., online) applications of the present invention. Within this application, the word network site refers to any electronic interface to the client and includes, but is not limited to, a network site accessed by a computer or wireless device with a browser functionality and also includes any other electronic interface where a client's objects can be assigned to users, including a network connected telephone or voice response system.

The system of the present invention performs several major tasks. First, the system provides a registration system for all terminal devices that enables the system to monitor all terminal devices and allows for a verification of the terminal device. The system also provides training procedures that enable terminal devices to establish their resource set to assign specific types (e.g., classes) of objects and to assign objects over a network in general. The system determines whether a network device interacting with a network interface has characteristics indicating a need for engagement from a terminal device based upon available clickstream and/or login data (the login data, for example, might identify the network device as a high value device who either already is or is eligible to become a private client). The system also allows the network device either to transmit a request for an engagement or to be engaged by a terminal device to assign that object and who has been made aware of the option using the similarity parameters of the system.

As noted above, the system includes an engagement unit. The engagement unit dynamically connects terminal devices with network devices based on a range of client and/or system-driven rules to determine the most appropriate terminal device to connect to each network device (based on data about the network device's session (the nature of the engagement), the network device and the terminal device and performance orders (e.g., rankings), defined permissions). Examples of the relevant connection rules (e.g., matching rules) can include clickstream data, spatial characteristics of the network device or the terminal device. The system enables the client to establish and weigh these similarity parameters to facilitate the most appropriate connections based on previous engagements with the systems. The engagement unit additionally dynamically changes the connection rule based on various factors, such as positive results. The engagement unit orders the terminal devices based on the connection rules used and generates a list of terminal devices in an order. The rules underlying the engagement unit can be dynamically modified by the client's administrators to set different 'triggers' for terminal device/ network device communication in accordance with changes in the client's engagement workflows. A client server can parse the processing load (e.g., traffic) at the server to the most suitable terminal devices depending upon an range of variables: the type of object, the location characteristics of both the network device and the terminal device, the abilities of the terminal device in that object type and the terminal device's ability to complete a networked object assignment.

The mismatches of terminal device to engagement options, either in terms of the object resource set of the terminal device, or of the location characteristics of the network device and the terminal device, are addressed by the present invention. The present invention addresses this by connecting object-specific terminal devices with network devices based on (i) available clickstream data that passes data to the system about the nature of the object assignment option itself, (ii) spatial data about the network device, (iii) data about the proficiencies of the terminal devices in the client's terminal device force (e.g., which terminal devices perform well into these types of engagements to these types of network devices) and (iv) the nature of the 'triggers,' or connection rules established by the client.

After the engagement unit performs the connection function, the terminal device can be linked to the network device in a range of ways. First, the system can identify the most appropriate terminal device for a particular engagement; if that terminal device is not available, the engagement unit will identify the next most appropriate terminal device and so on until the network device is engaged by a terminal device. The engagement unit can notify the terminal device of an engagement even when the device is not connected, such as through a page or a call to the terminal device's telephone. Second, the engagement unit can transmit a notification message to a group of terminal devices and allow the terminal devices that initiates an engagement first to connect with the network device for a communication session.

Alternatively, the engagement unit can provide the terminal devices with their similarity parameter (or notify them, without necessarily providing their similarity, that they are available for a particular engagement), and let the terminal devices determine whether to engage the network device (or let the terminal devices 'race' to the network device). This data is provided to the terminal device on a series of terminal device-facing pages (e.g., a terminal device desktop) that the terminal device can view to see, in a dynamic, real-time manner, the number and kind of network devices that the terminal device is authorized under the system to engage. So, the terminal device can identify candidate engagements by being connected to the system or the terminal device, with the client's permission, can be contacted by the system when an appropriate candidate engagement for that terminal device is identified by the system.

In some instances, the connection unit allows for "permissive" and "required" engagements, as established through the system by the client (e.g., the object distributor (e.g. vender) of a particular object) that controls its operation. A "permissive" situation is defined by the system as one in which a terminal device may (permissively) engage a network device based on elements of the connection unit. A "required" situation is defined as one that the client has defined as requiring a terminal device to engage (mandatory). The system allows both "permissive" and "required" scenarios to be executed, and for the parameters that define these scenarios to be established, weighted, ordered and then re-ordered based on actual performance.

The system can operate independently to the client's networked channel or be connected to the client's servers to obtain data about known network devices (the system of course allows terminal devices to engage both network devices known to the client (such as through login data or a cookie) and network devices, as far as the client is aware at the time of engagement, simply anonymous connected network devices). The system can also be connected to the other client servers to retrieve object and catalog data, such as alternative object data, and any related objects. This data is provided to the terminal device on the terminal device-facing interface.

An external data obtaining unit allows the terminal devices to obtain, at the point of an engagement option (e.g., opportunity), engagement data (either from the client or from third-party servers accessible through a network or from other servers) that may facilitate an object assignment process. A range of data, both internal and external to the client, could be obtained that might be helpful completing an object assignment process with the network device, including existing client-provided information. The data obtaining unit obtains this data (as established in a baseline (i.e., initial) configuration), and as it has subsequently been used throughout the client's terminal device force), and then can prescribe specific engagement data for use in conjunction with any particular engagement option to the terminal device via the terminal device-facing network sites.

Additionally, the system includes a protocol unit that monitors the object assignment process to create a data store of functions (e.g. techniques) and engagement data that were and were not conducive to any particular object assignment process. The unit continually evaluates and re-orders terminal devices (e.g. engagement options available to terminal devices) and engagement data based on all activity captured by the system contemporaneously. During an object assignment process, the system enables terminal devices to access one or more data stores using the terminal device's interface so that the terminal device can facilitate completion of an object assignment process with a network device.

The system does not have to result in the completion of object assignments processes through networked interactions. For example, in a complex situation, it may be sufficient for the engagement to originate via a networked or connected (e.g. online) process at a device interface, for the terminal device to achieve an introduction through a proactive chat session, for the session to bridge from chat to a PSTN connection, for the terminal device to make an appointment with the network device at a defined location. Accordingly, the utility of the application is not limited to the network channel. Hence, the present invention also relates to functionality that will enable a terminal device to first communicate with a network device in chat, but also to bridge from the chat session to a telephonic connection through the PSTN or via VOIP technology.

The system also continuously monitors the object assignment process and provides this data as well as reports on network devices, terminal devices, and object assignments to the client server. This data can also be transmitted to data stores associated with the client for management purposes. Further, the system obtains a data store of network device object assignment characteristics that provide network device action data (e.g., data representing an interaction between a network device/terminal device and a network site) to terminal devices and clients. This data drives connections between terminal devices and network devices (both in terms of agents and object assignment data that are determined in any engagement option). Therefore, the present invention will substantially enhance network device's networked object assignment processes and increase the volume of object assignments, over, through, or in conjunction with networked environments.

The present invention enhances the effectiveness of the networked object assignment process particularly with respect to more complex objects, such as electronic equipment, automobiles, and other objects that typically require a high-level of interaction with a terminal device. Thus, the present invention allows clients to expand the types of objects that can be assigned using a networked channel. Moreover, by enabling terminal devices to engage connected network devices, the present invention enables clients to use the communication functionality provided through the present invention to address network device requirements in real time, either for the purpose of completing an object assignment. Thus, the present invention bridges the networked and face-to-face object assignment processes.

The present invention addresses networked object assignment problems by connecting current object assignment availabilities with terminal devices—in effect placing a terminal device into the networked channel.

A major difference between current eCRM and the present invention is that the present invention goes beyond existing CRM tactics by connecting the network device with the most appropriate terminal devices for the network devices requirements, bringing the most appropriate terminal device to the engagement, and then providing that terminal device with the necessary tools to execute the object assignment process (both data and communication functionalities). This should be compared to current eCRM that merely provide access to a call center representative who is inadequately trained to answer questions about objects or suggest reasonable alternatives to network devices. By establishing interaction between network and terminal devices as part of the object assignment process rather than waiting for a network device to request an engagement, the present invention improves the networked object assignment interaction (e.g. experience). Additionally, the present invention allows for a terminal device to have a relationship with the network devices (rather than the "data store" building a relationship with the network device). Further, the present invention provides a dynamic solution—not a mechanized solution. Finally, the present invention contemplates a series of real-time communication functionalities—chat, VOIP, streaming media and, importantly, the PSTN—that bridge the networked and offline channels and make the networked interaction far more potent from an object assignment perspective.

BRIEF DESCRIPTION OF THE DRAWINGS

The present disclosure is described in conjunction with the appended figures:

FIG. 19 is a screen shot of the object assignment function of a terminal device user interface.

FIG. 31 is a flow diagram illustrating object assignment process according to an embodiment of the present invention.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides examples of embodiment(s) only and is not intended to limit the scope, applicability or configuration of the disclosure. Rather, the ensuing description of the examples of embodiment(s) will provide those skilled in the art with an enabling description for implementing examples of embodiment. It is understood that various changes can be made in the function and arrangement of elements without departing from the spirit and scope as set forth in the appended claims.

Figure 1:
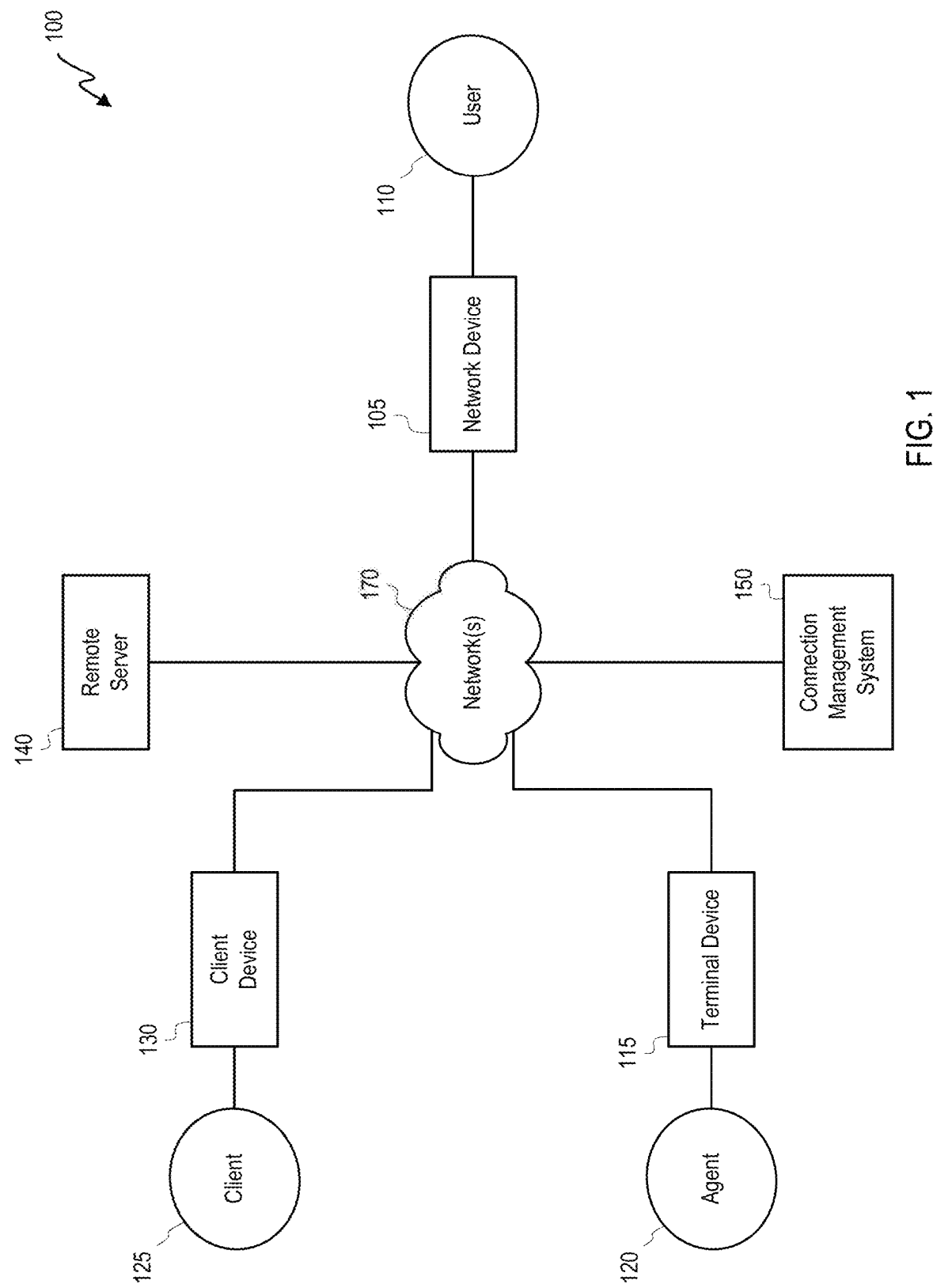
FIG. 1 shows a block diagram of an embodiment of a network interaction system.

FIG. 1 shows a block diagram of an embodiment of a network interaction system 100 which implements and supports certain embodiments and features described herein. Certain embodiments relate to establishing a connection channel between a network device 105 (which can be operated by a user 110) and a terminal device 115 (which can be operated by an agent 120). In certain embodiments, the network interaction system 100 can include a client device 130 associated with a client 125.

In certain embodiments, a user 110 can access remote server 140 to interact with an interface. A client 125 can be an entity that provides, operates, or runs the network site, or agents employed by or assigned by such an entity to perform the tasks available to a client 125 as described herein. The agent 120 can be a person, such as a support agent tasked with providing support or data to the user 110 regarding the network site (e.g., data about objects available for assignment over a network). Out of a large number of agents, a subset of agents may be appropriate for providing support or data for a particular client 125. The agent 120 may be affiliated or not affiliated with the client 125. Each agent can be associated with one or more clients 125. In some non-limiting examples, a user 110 can access a network site using a user device (e.g., a smartphone, an electronic computing device, an electronic computing device, and other suitable computing devices), a client 125 can be a company that provides objects to be assigned to users that meet certain conditions (e.g., pays a specific price), and an agent 120 can be an agent that is associated with the company. In various embodiments, the user 110, client 125, and agent 120 can be other users or entities.

While FIG. 1 shows only a single network device 105, terminal device 115 and client device 130, an interaction system 100 can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a particular network device. Further complicating matters, a remote server 140 may also be configured to receive and respond to select network-device communications.

A connection management system 150 can facilitate strategic routing of communications. A communication can include a message with content (e.g., defined based on input from an entity, such as typed or spoken input). The communication can also include additional data, such as data about a transmitting device (e.g., an IP address, user identifier, device type and/or operating system); a destination address; an identifier of a client; an identifier of an interface or interface element (e.g., a network site or network site element being visited when the communication was generated or otherwise associated with the communication); a time (e.g., time of day); and/or destination address. Other data can be included in the communication. In some instances, connection management system 150 routes the entire communication to another device. In some instances, connection management system 150 modifies the communication or generates a new communication (e.g., based on the initial communication). The new or modified communication can include the message (or processed version thereof), at least some (or all) of the additional data (e.g., about the transmitting device, network interface and/or time) and/or other data identified by connection management system 150 (e.g., user data associated with a particular user identifier or device). The new or modified communication can include other data as well.

Part of strategic-routing facilitation can include establishing, updating and using one or more connection channels between network device 105 and one or more terminal devices 115. For example, upon receiving a communication from network device 105, connection management system 150 can first estimate to which client (if any) the communication corresponds. Upon identifying a client, connection management system 150 can identify a terminal device 115 associated with the client for communication with network device 105. In some instances, the identification can include evaluating a protocol (e.g., profile) of each of a plurality of agents, each agent (e.g., agent 120) in the plurality of agents being associated with a terminal device (e.g., terminal device 115). The evaluation can relate to a content in a network-device message. The identification of the terminal device 115 can include a technique described, for example, in U.S. application Ser. No. 12/725,799, filed on Mar. 17, 2010, which is hereby incorporated by reference in its entirety for all purposes.

In some instances, connection management system 150 can determine whether any connection channels are established between network device 105 and a terminal device associated with the client (or remote server 140) and, if so, whether such channel is to be used to transmit and receive a series of communications including the communication or message. This determination may depend, at least in part, on a topic associated with the communication, a polarity parameter (e.g., a sentiment score or value) associated with the communication or a past related communication, an estimated response latency for terminal device 115 and/or a type of communication channel associated with the communication (e.g., instant message, message, email, phone). Selecting an established communication channel may reduce the need to relay data from network device 105 multiple times. Meanwhile, determining that a new communication channel is to be established can facilitate quicker responses from more specialized agents.

A decision as to whether to select (or continue to use) an established communication channel and/or a selection of a new terminal device can include determining an extent to which each of one or more terminal devices (e.g., associated with a client) corresponds to a communication and/or an associated the user. Such correspondence can relate to, for example, an extent to which an agent's resource set (e.g., knowledge base) corresponds to a communication topic, an availability of an agent at a particular time and/or over a channel type, a language similarity between a user and agent.

Connection management system 150 may use communication analyses to influence routing determinations (e.g., determining whether to route a communication to a terminal device having previously received a communication from a network device having transmitted the communication or selecting a terminal device to receive or transmit a communication). One communication analysis can include determining one or more types or tags of a current or past communication or communication series. For example, a communication can be assigned a type for each of (for example) a topic, channel type (e.g., email, SMS message, real-time chat, phone call or asynchronous message), complexity level, message polarity, and/or whether/which file type is attached, and a terminal-device selection can be biased towards terminal devices associated with similar or related types.

Upon selecting a terminal device 115 to communicate with network device 105, connection management system 150 can establish a connection channel between the network device 105 and terminal device 115. In some instances, connection management system 150 can transmit a message to the selected terminal device 115. The message may request that the terminal device approve a proposed assignment to communicate with a network device 105 or identify that such an assignment has been generated. The message can include data about network device 105 (e.g., IP address, device type, and/or operating system), data about an associated user 110 (e.g., language spoken, duration of having interacted with client, skill level, and/or topic preferences), a received communication, code (e.g., a clickable hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the transmitting and/or receiving of communications or messages and to detect issues (e.g., as defined based on rules) such as non-responsiveness of either device or extended latency. Further, such a configuration can facilitate selective or complete storage of communications, which may later be used, for example, to determine a quality of a communications between network devices and terminal devices and/or to support learning to update or generate routing rules so as to determine particular post-communication targets. Such storage can also facilitate generation of a series of previous messages (e.g., a message history) between a network device and first terminal device, which may be transmitted (for example) to a second terminal device when it is determined that the second terminal device is to join an existing or participate in a new communication series with the network device.

In some embodiments, connection management system 150 can monitor the transmitting and receiving of communications in real-time and perform automated actions (e.g., rule-based actions) based on the live communications. For example, when connection management system 150 determines that a communication relates to a particular object, connection management system 150 can automatically transmit an additional message to terminal device 115 containing additional data about the object (e.g., quantity of objects available, other data about the similar objects, etc.).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide data in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic similarity. As another example, client device 130 may identify one or more weights to apply to various variables that may impact routing determinations (e.g., estimated response time, device type and capabilities, and/or terminal-device load balancing). It will be appreciated that which terminal devices and/or agents are to be associated with a client may be dynamic. Communications from client device 130 and/or terminal devices 115 may provide data indicating that a particular terminal device and/or agent is to be added or removed as one associated with a client. For example, client device 130 can transmit a communication with IP address and an indication as to whether a terminal device with the address is to be added or removed from a list identifying client-associated terminal devices.

In one instance, connection management system 150 facilitates an initial connection and routing between network device 105 and a first terminal device 115. For example, a message received in a communication from network device 105 can be routed to the first terminal device. As another example, communication management system 150 can transmit a communication to the first terminal device that includes or is indicative of a request or instruction to transmit a communication (e.g., initiating a communication series) to network device 105.

Connection management system 150 can monitor and/or analyze a corresponding communication series between network device 105 and the first terminal device to determine a characteristic. For example, connection management system 150 can analyze message content in one or more communications (e.g., to determine whether and/or how many of particular words, symbols or character types, such as "frustrat*", "very", "thank", or "irritat*", "!" or capital letters, were used). As another example, connection management system 150 can determine one or more statistics relating to each of one or more messages and/or the series. Examples of statistics can include, for example, message length (e.g., in words or characters), latency between a receipt of a communication and transmission of a responsive communication, latency between subsequent message transmissions, or typing speed while typing a message. As yet another example, connection management system 150 can receive and process one or more inputs, detected initially at network device 105 or the first terminal device and then identified to connection management system 150. Such inputs can identify, for example, a reroute request, or a resolution stage.

Connection management system 150 can evaluate the characteristic (e.g., characterizing message content, including a statistic or characterizing an input) to determine whether to define subsequent routing rules in a particular manner. For example, a continuous-channel rule can include a condition relating to a characteristic that specifies when routing of network-device messages is to be inclined towards the first terminal device (which previously communicated with the network device). The rule can be configured such that satisfaction of the condition results in establishment of a continuous channel between the network device and the first terminal device. The continuous channel can allow subsequent messages from the network device to be automatically routed to the first terminal device and/or preferentially routed to the first terminal device. The continuous channel can be configured to persist through multiple communication series. For example, even if a first series of messages are communicated between the network device and first terminal device on a first day, the channel can inclination routing of another message from the network device transmitted on a second day to be routed to the same first terminal device. A magnitude of such inclination may depend on, for example, a time since a previous interaction between the network device and first terminal device (e.g., increasing the level of inclination when a past interaction was recent), a total duration of and/or number of communications in a previous conversation (e.g., series of messages communicated between the network device and first terminal device) and/or a number of previous messages communicated between the network device and first terminal device (and/or a cumulative interaction time or count of messages).

Upon establishing a continuous channel, connection management system 150 can further facilitate presenting a presentation (e.g., notification) at network device 105 so as to alert user 110 that a continuous channel has been established, to identify the first terminal device or associated user and/or to indicate that subsequent messages (e.g., transmitted in association with an identifier of the channel, associated with a particular client, etc.) are to be routed to or to have routing inclined towards the first terminal device.

Conversely, connection management system 150 may determine that the characteristic indicates that subsequent messages from network device 105 (e.g., relating to a client) are not to be routed to the same first terminal device and/or are to be rerouted. For example, it can be determined that the condition in the continuous-channel rule is not satisfied. Upon such a determination, connection management system 150 can identify a new terminal device to route communications (e.g., relating to a client) to from the network device.

In one instance, a continuous-channel rule is configured such that a continuous channel is to be established between a network device and a terminal device following an initial routing of a communication between the two devices. Thus, the continuous channel may serve to facilitate consistent message routing within a single conversation (e.g., series of communicated messages). In an alternative or same instance, a continuous-channel rule may (also or alternatively) be configured such that a continuous channel is established, maintained or used so as to execute consistent message routing across different message series (e.g., the series being separated in time). Depending on the embodiment, a continuous-channel rule may limit a number of continuous channels that can be provided with respect to a network device and/or client. For example, a rule may indicate that, for a network device and client, the network device can only be connected to one (or three or another specified number) terminal devices via continuous channel.

In some instances, connection management system 150 can determine that a re-routing process is to be initiated (e.g., based on satisfaction of a condition in a re-routing rule). The determination can be based on a characteristic (e.g., characterizing message content, including a statistic or characterizing an input). For example, a re-routing rule can be configured such that re-routing is to be initiated upon detecting a characteristic indicative of user frustration or dissatisfaction; detecting a characteristic indicative of a lack of progress towards a resolution of an issue; detecting impermissible terminal-device communication statistics (e.g., long response latencies); or detecting that messages are beginning to focus on a new topic.

A re-routing process can include identifying a different terminal device to participate in a communication session with network device 105. Such an identification can be based on, for example, a topic associated with the communication, a polarity parameter associated with the communication or a past related communication, an estimated response latency for terminal device 115, a type of communication channel associated with the communication (e.g., instant message, message, email, phone), a type of each of one or more other terminal devices, a capability of one or more other terminal devices, and the like. A selection of the different terminal device may be performed in a same, similar or different manner as compared to a selection of a first terminal device. For example, determining that a re-routing rule's condition has been satisfied may incline a subsequent terminal-device selection towards higher-ranked devices.

A re-routing process may include transmitting a notification identifying a proposed re-routing to one or more devices, such as network device 105, the first terminal device or the different terminal device. The notification may include an option to authorize and/or an option reject the proposed re-routing. The notification may include data about network device 105, the first terminal device and/or the different terminal device and/or an associated party.

To reduce an abrupt transition between terminal devices, connection management system 150 can coordinate an overlap time period. During this time period, each of the first terminal device and the different terminal device can receive one or more communications (or processed versions thereof) from network device 105. For example, a new communication from network device 105 can be duplicated and then routed to each of the first and different terminal device.

In some instances, connection management system 150 can generate a dynamic message chronicle that includes multiple messages from network device 105 and/or from the first terminal device. The chronicle can include, for example, all messages in a communication session, all messages routed within a defined time period (e.g., previous 3 minutes), or all messages associated with one or more defined tags or types. For example, messages relating to a particular topic, message polarity (e.g., corresponding to dissatisfaction), or content type (e.g., including a question) can be selected. Connection management system 150 can transmit the dynamic message chronicle to the different terminal device. New messages from network device 105 and/or the first terminal device can further be transmitted to the different terminal device, such that the dynamic message chronicle can be appended with such new messages. Message selection for a dynamic message chronicle and/or whether a dynamic message chronicle is to be provided may also depend on whether re-routing is to occur during a temporally clustered series of messages or between message series.

In some instances, connection management system 150 can determine whether and/or when to stop routing communications to the first terminal device. For example, such routing termination may be performed upon detecting a response communication from the different terminal device, after a defined time period has elapsed following transmission of the message chronicle, after detecting an input received at the first terminal device indicating an intent to terminate a communication session, after detecting an input received at the different terminal device indicating an intent to handle a communication session, after detecting an input received at network device 105 requesting the proposed re-routing to the different terminal device be executed, and so on.

Depending on a rule or a reason for initiating a re-routing transfer, the re-routing may include closing a connection channel between network device 105 and the first terminal device (e.g., if a re-routing process was initiated in response to a low user polarity) and/or establishing a new connection channel between network device 105 and the different terminal device.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RCS, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in related manners. For example, a software agent on a device can be configured to obtain and transmit data about device usage to a separate connection management system, and a software application on the separate connection management system can be configured to receive and process the data.

Figure 2:
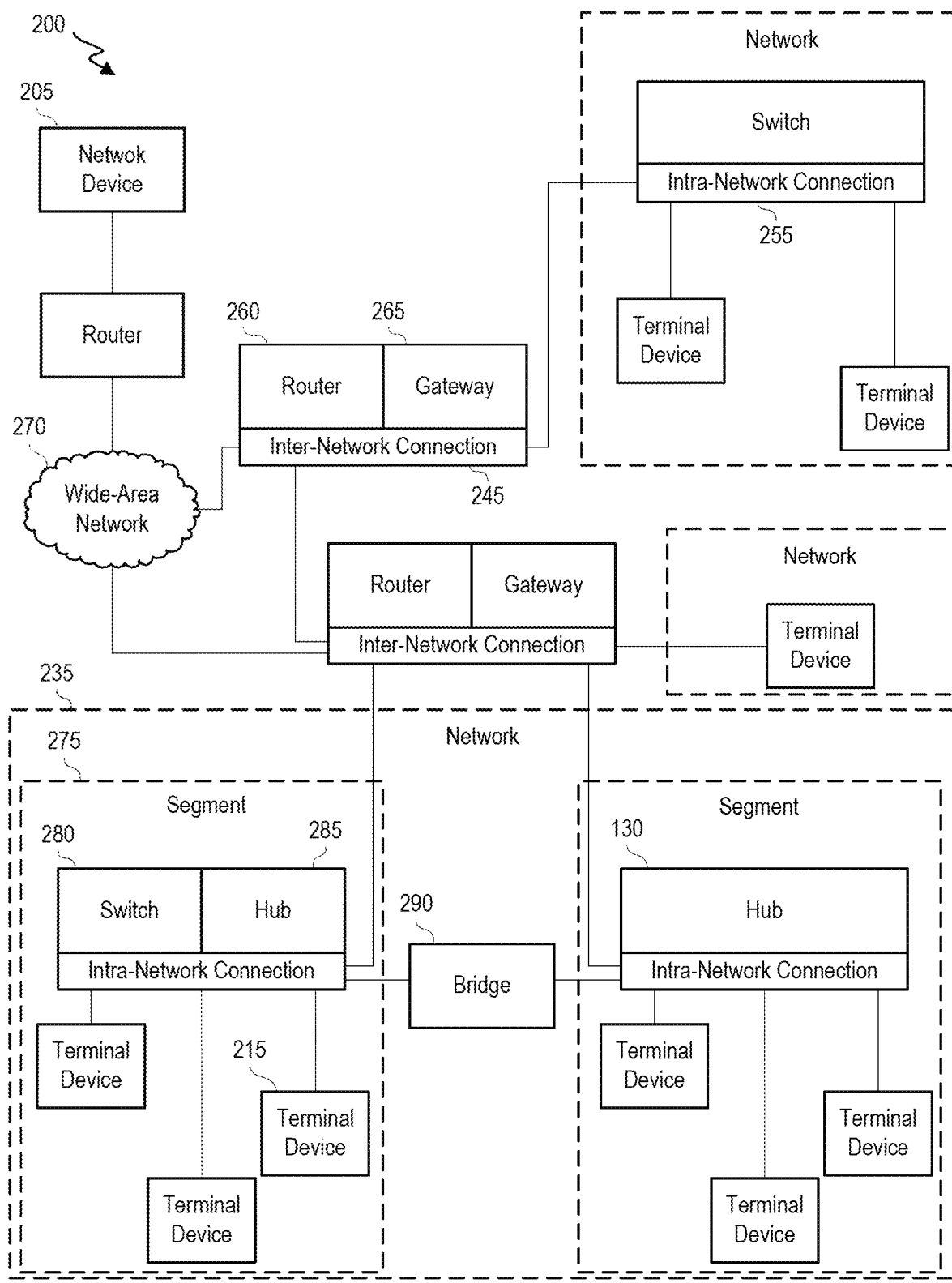
FIG. 2 shows a block diagram of another embodiment of a network interaction system.

FIG. 2 shows a block diagram of another embodiment of a network interaction system 200. Generally, FIG. 2 illustrates a range of components configured and arranged to enable a network device 205 to communicate with one or more terminal devices 215. The depicted instance includes nine terminal devices 215 included in three local-area networks 235.

In some instances, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 280 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (as opposed to ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details relating to terminal devices can give rise to particular routings being advantageous as compared to others. For example, terminal devices in the set may differ from each other with respect to (for example) which communication channels are supported, location and/or network proximity to a network device and/or characteristics of associated agents (e.g., availability, etc.). Accordingly, select routings may facilitate faster responses that more accurately and/or completely respond to a network-device communication. A complication is that static routings mapping network devices to terminal devices may fail to consider variations in communication topics, channel types, agent availability, and so on.

Figure 3A:
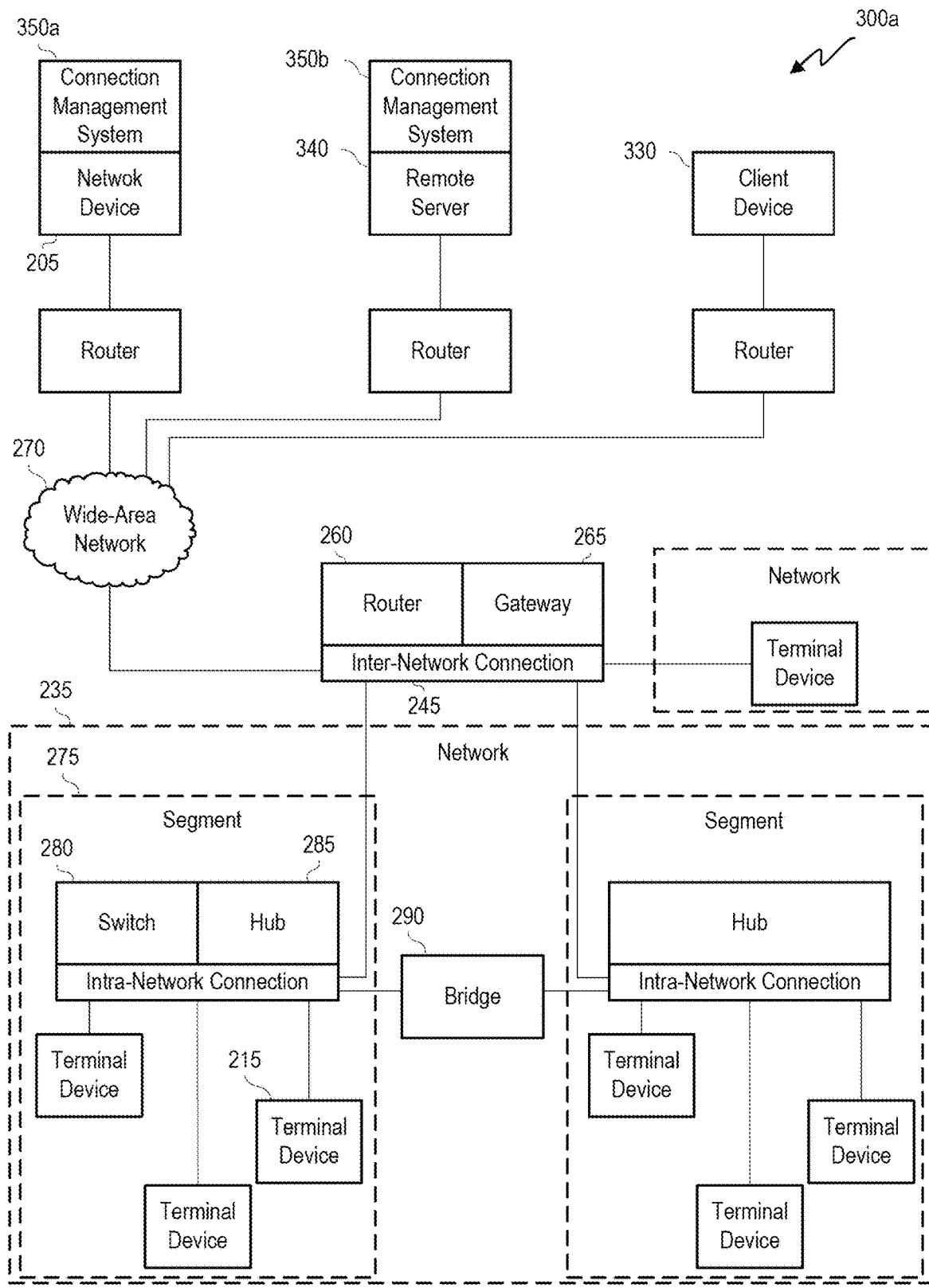
FIGS. 3A-3C show block diagrams of other embodiments of a network interaction system that includes a connection management system.
Figure 3B:
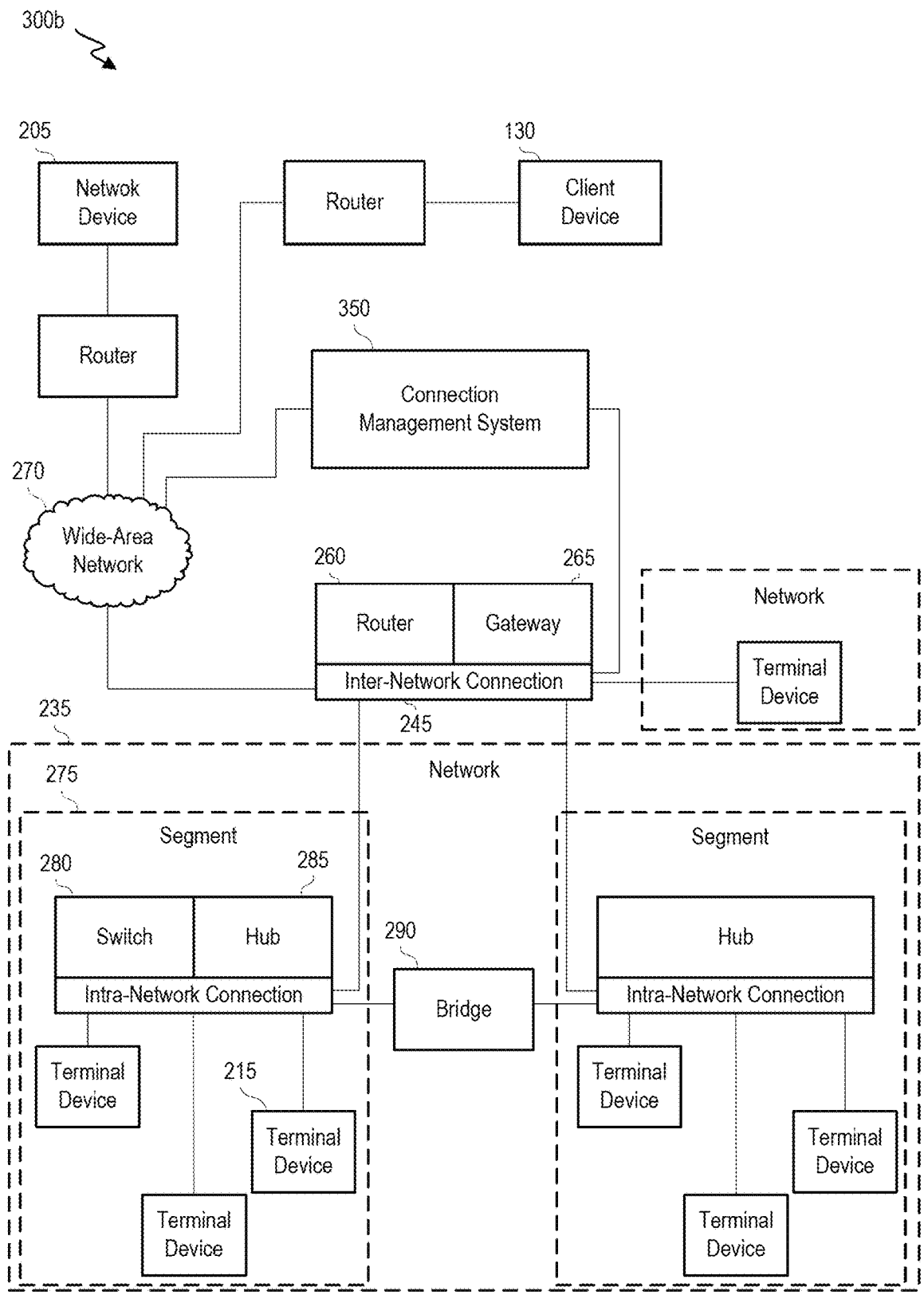
Figure 3C:
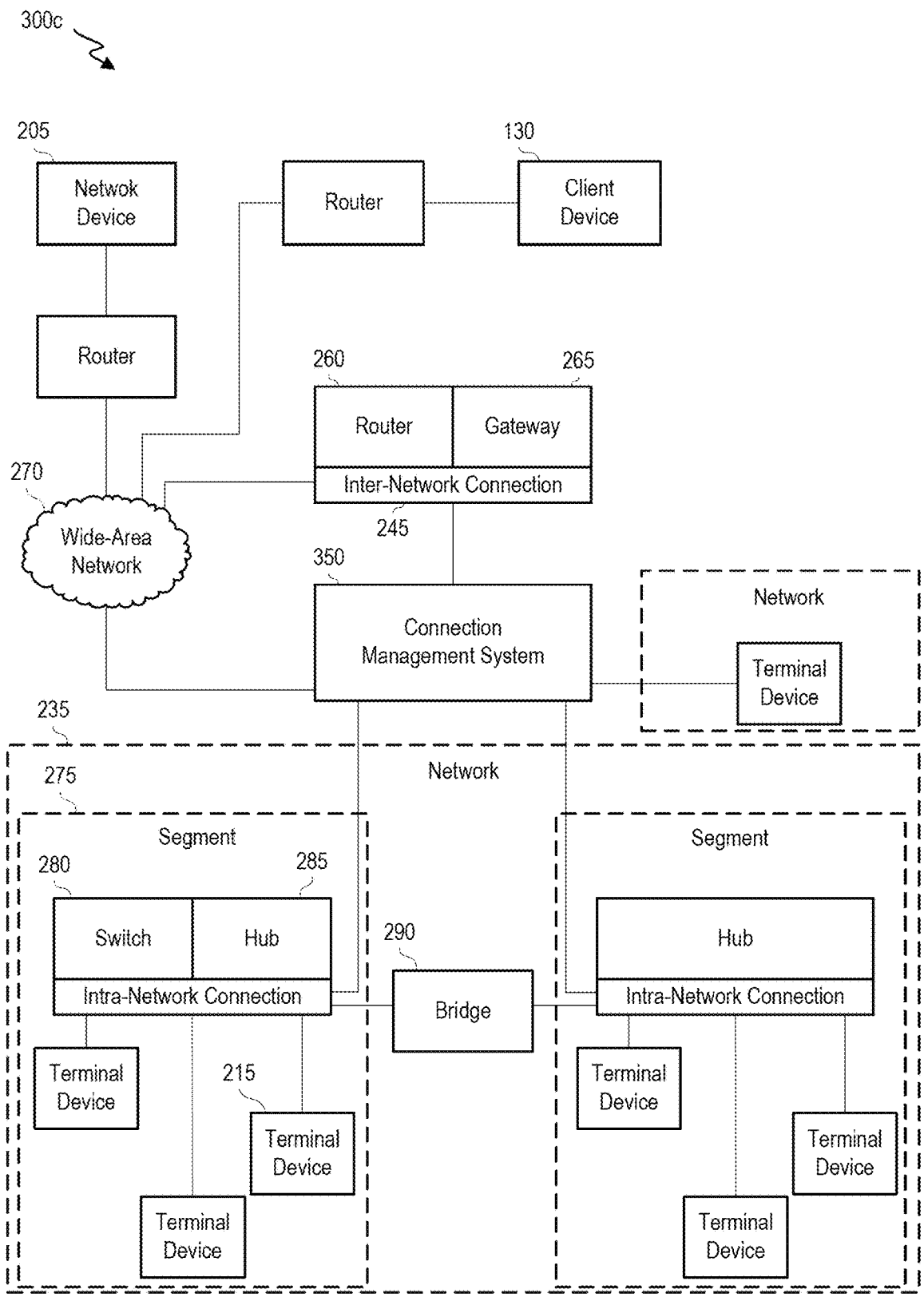

FIGS. 3A-3C show block diagrams of other embodiments of a network interaction system 300*a-c* that includes a connection management system. Each of the depicted systems 300*a-c* show only 2 local-area networks 235 for simplicity, though it can be appreciated that embodiments can be extended to expand the number of local-area networks. Each of systems 300*a-c* include a connection management system 350, which can identify which terminal device is to communicate with network device 205, can establish and manage (e.g., maintain or close) connection channels, can determine whether and when to re-route communications in an communication session, and so on. Thus, connection management system 350 can be configured to dynamically, and in real-time, evaluate communications, agent availability, capabilities of terminal devices or agents, and so on, to influence routing determinations.

In FIG. 3A, connection management system 350 is associated with each of network device 205 and a remote server 340 (e.g., connection management system 350*a* is associated with network device 205 and connection management system 350*b* is associated with remote server 340). For example, connection management system 350*a* and/or connection management system 350*b* can be installed or stored as an application on each of network device 205 and remote server 340, respectively. Execution of the application(s) can facilitate, for example, a communication between network device 205 and remote server 340 to identify a terminal device 215 selected to participate in a communication session with network device 205. The identification can be made based on one or more factors disclosed herein (e.g., availability, connections between a communication's topic/level of detail with agents' or terminal devices' resource sets, estimated latency, channel-type availability, and so on).

A client device 330 can provide client data indicating how routing determinations are to be made. For example, such data can include: indications as to how particular characteristics are to be weighted or constraints or inclinations (e.g., relating to load balancing or estimated response latency). Client data can also include specifications related to when communication channels are to be established (or closed) or when communications are to be re-routed to a different network device. Client data can be used to define various client-specific rules, such as rules for communication routing; channel establishment, management or closing; communication re-routing; communication type-identification, and so on.

Connection management system 350b executing on remote server 340 can monitor various metrics relating to terminal devices (e.g., relating to a client), such as which communication channels are supported, location and/or network proximity to a network device, communication latency and/or stability with the terminal device, a type of the terminal device, a capability of the terminal device, whether the terminal device (or agent) has communicated with a network device (or user) before and/or characteristics of associated agents (e.g., languages spoken, availability, etc.). Accordingly, communication management system 350b may be enabled to select routings to facilitate faster responses that more accurately and/or completely respond to a network-device communication based on the metrics.

In the example depicted in FIG. 3A, a communication session between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and obtain metrics for those terminal devices. The metrics can be evaluated (e.g., by remote server 340) so as to select a terminal device to involve in a communication session, and data relating to the terminal device (e.g., an IP address) can be sent to network device 205. In some embodiments, remote server 340 may continuously or periodically obtain and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication session based on the stored evaluation results.

In FIG. 3B, connection management system 350 can be configured to serve as a relay and/or destination address. Thus, for example, a set of network devices 205 may transmit communications, each identifying connection management system 350 as a destination. Connection management system 350 can receive each communication and can concurrently monitor a set of terminal devices (e.g., so as to generate metrics for each terminal device). Based on the monitoring and a rule, connection management system 350 can identify a terminal device 215 to which it may relay each communication. Depending on the embodiment, terminal device communications may similarly be directed to a consistent destination (e.g., of connection management system 350) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 350 is directly connected to intra-network components (e.g., terminal devices, intra-network connections, or other).

It will be appreciated that many variations of FIGS. 3A-3C are contemplated. For example, connection management system 350 may be associated with a connection component (e.g., inter-network connection component 245 or intra-network connection component 255) such that an application corresponding to connection management system 350 (or part thereof) is installed on the component. The application may, for example, perform independently or by communicating with one or more similar or related applications (e.g., executing on one or more other components, network devices or remotes servers).

Figure 4:
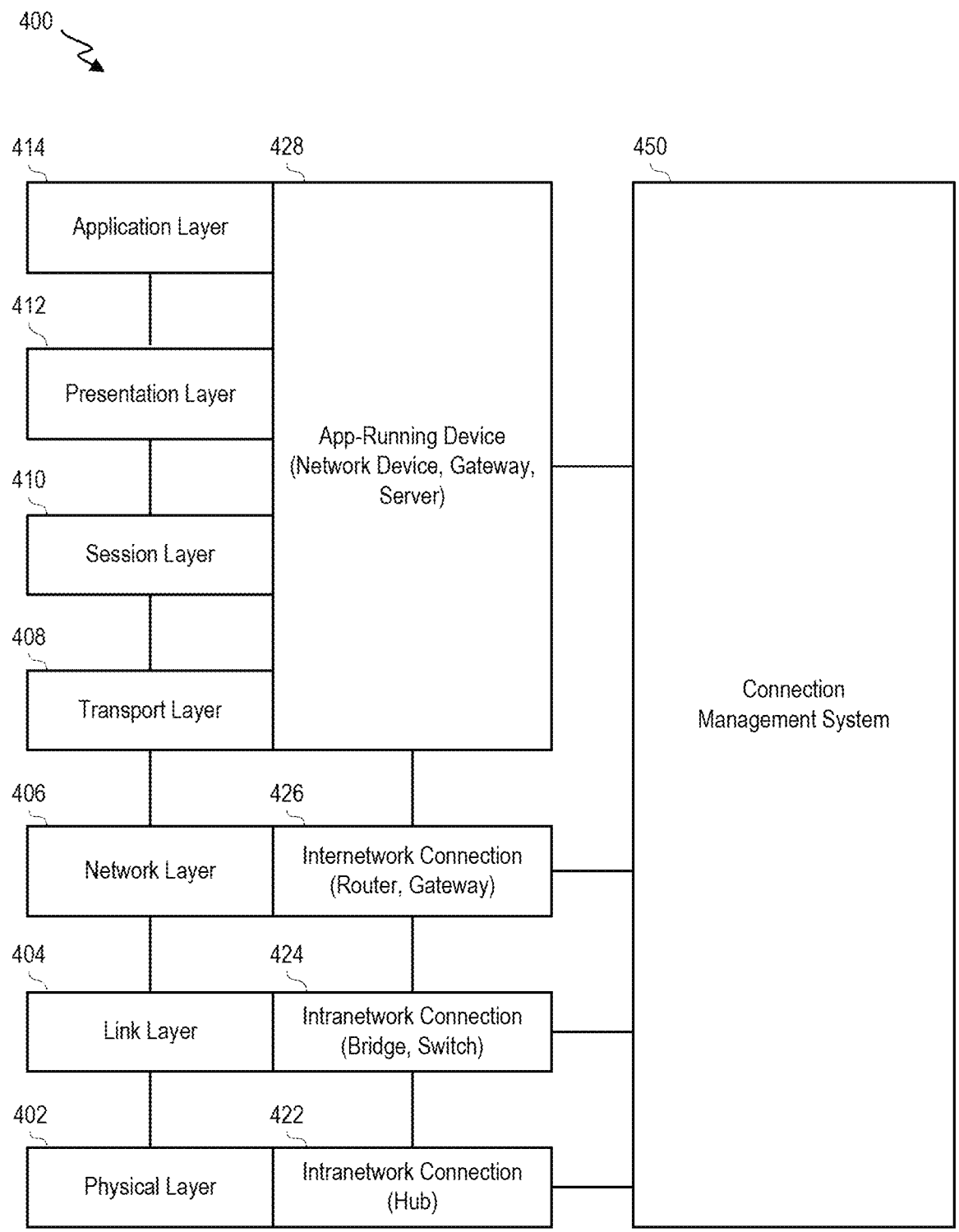
FIG. 4 shows a representation of a protocol-stack mapping of connection components' operation.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can transform a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect transmission errors occurring in layers 402-406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402-414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406-414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular data (e.g., new destination addresses) based on the existing communication. Thus, connection management system 450 can influence communication routing and channel establishment (or maintenance or termination) via interaction with a wide range of devices and/or via influencing operating at a wide range of protocol-stack layers.

Figure 5:
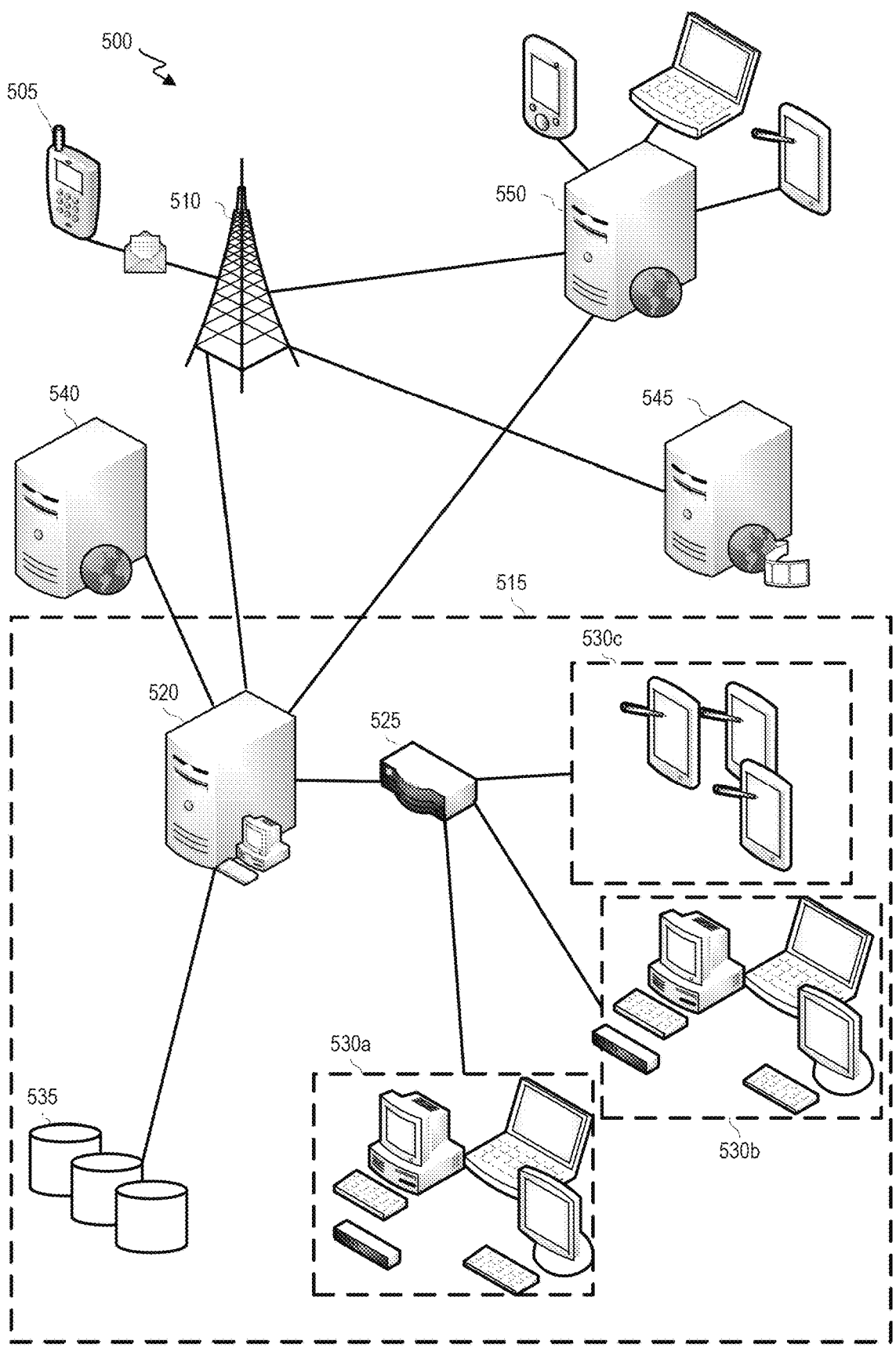
FIG. 5 represents a multi-device communication interaction system according to an embodiment.

FIG. 5 represents a multi-device communication interaction system 500 according to an embodiment. System 500 includes a network device 505 configured to communicate with a various terminal devices over various types of communication channels.

In the depicted instance, network device 505 can transmit a communication over a cellular network (e.g., via a base station 510). The communication can be routed to an operative network 515. Operative network 515 can include a connection management system 520 that receives the communication and identifies which terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 5, each cluster of terminal devices 530a-c can correspond to a different client. The terminal devices may be locationally co-located or disperse. The metrics may be determined based on stored or learned data and/or real-time monitoring (e.g., based on availability).

Connection management system 520 can communicate with various terminal devices via one or more routers 525 or other inter-network or intra-network connection components. Connection management system 520 may obtain, analyze and/or store data from or relating to communications, terminal-device operations, client rules, and/or user-associated actions (e.g., interaction activity on a network site, etc.) at one or more data stores. Such data may influence communication routing.

Notably, various other devices can further be used to influence communication routing and/or processing. For example, in the depicted instance, connection management system 520 also is connected to a network server 540. Thus, connection management system 540 can retrieve data of interest, such as technical object details and additional data, and so on.

Network device 505 may also be connected to a network server (e.g., including a streaming network server 545). In some instances, communication with such a server provided an initial option to initiate a communication session with connection management system 520. For example, network device 505 may detect that, while visiting a particular network site, a communication engagement option is available and such an option can be presented.

One or more elements of communication system 500 can also be connected to a social-networking server 550. Social networking server 550 can aggregate data received from various user devices. Thus, for example, connection management system 520 may be able to estimate a general (or user-specific) polarity towards a particular topic or estimate a general action of a user or type of users.

Figure 6:
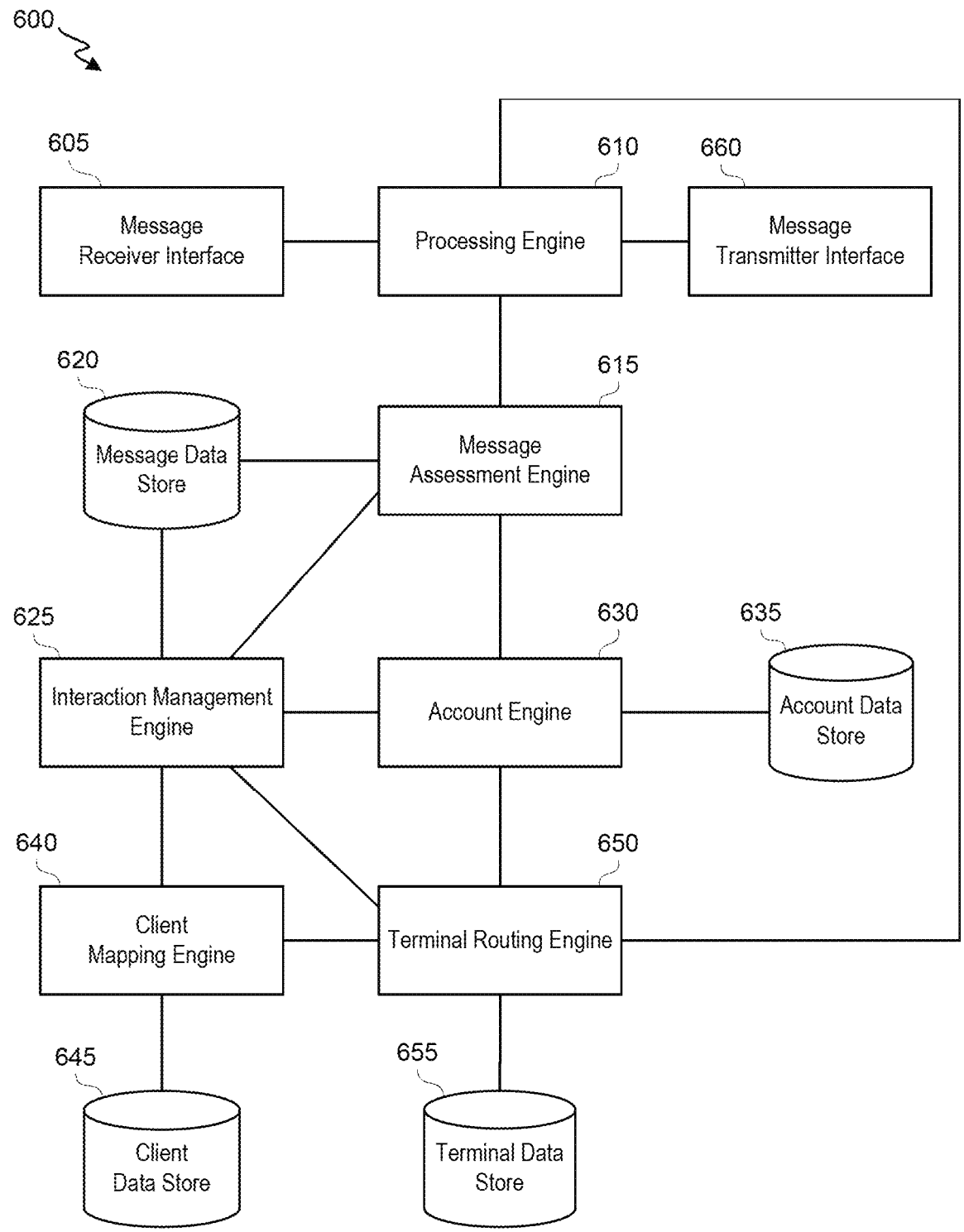
FIG. 6 shows a block diagram of an embodiment of a connection management system.

FIG. 6 shows a block diagram of an embodiment of a connection management system 600. A message receiver interface 605 can receive a message. In some instances, the message can be received, for example, as part of a communication transmitted by a source device (e.g., housed separately from connection management system 600 or within a same housing), such as a network device or terminal device. In some instances, the communication can be part of a series of communications or a communicate session, which can include a series of messages or message being routed between two devices (e.g., a network device and terminal device). This message or communication session may be part of and/or may define an interaction between the devices. A communication channel or operative channel can include one or more protocols (e.g., routing protocols, task-assigning protocols and/or addressing protocols) used to facilitate routing and a communication session between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device is presenting a particular app page or network interface or has provided a particular input command (e.g., key sequence). The message can include an instruction or request, such as one to initiate a communication session.

In some instances, the message can include or be associated with an identifier of a client. For example, the message can explicitly identify the client (or a device associated with the client); the message can include or be associated with a network interface or app page associated with the client; the message can include or be associated with a destination address associated with a client; or the message can include or be associated with an identification of an object associated with the client. To illustrate, a network device may be presenting an app page of a particular client, which may provide an option to transmit a communication to an agent. Upon receiving user input corresponding to a message, a communication may be generated to include the message and an identifier of the particular client.

A processing unit 610 may process a received communication and/or message. Processing can include, for example, extracting one or more particular data elements (e.g., a message, a client identifier, a network-device identifier, a user or user protocol identifier, and so on). Processing can include transforming a formatting or communication type (e.g., to be compatible with a particular device type, operating system, communication-channel type, protocol and/or network).

A message determination unit 615 may determine the message. The determination can include identifying, for example, one or more types or tags for the message. Examples of type or tag types can include (for example) topic, message polarity, complexity, and urgency. A difference between determining a type of message and tagging a message can be that types can be limited (e.g., according to a predefined set of type options), while tags can be open. A topic can include, for example, an object, a technical issue, a use question, a complaint, or other suitable topic. A type or tag can be determined, for example, based on a semantic analysis of a message (e.g., by identifying keywords, sentence structures, repeated words, punctuation characters and/or non-article words); user input (e.g., having selected one or more types); and/or message-associated statistics (e.g., typing speed and/or response latency).

In some instances, message determination unit 615 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message determination unit 615 can store a message, message metric and/or message statistic in a message data store 620. Each message can also be stored in association with other data (e.g., metadata), such as data identifying a corresponding source device, destination device, network device, terminal device, client, one or more types, one or more stages and/or message-associated statistics). Various components of connection management system 600 (e.g., message determination unit 615 and/or an interaction management unit 625) can query message data store 620 to retrieve query-responsive messages, message metrics and/or message statistics.

An interaction management unit 625 can determine to which device a communication is to be routed and how the receiving and transmitting devices are to communicate. Each of these determinations can depend, for example, on whether a particular network device (or any network device associated with a particular user) has previously communicated with a terminal device in a set of terminal devices (e.g., any terminal device associated with connection management system 600 or any terminal device associated with one or more particular clients).

In some instances, when a network device (or other network device associated with a sane user or user protocol (e.g., profile)) has previously communicated with a terminal device (e.g., about matters relating to a client), communication routing can be generally inclined towards the same terminal device. Other factors that may influence routing can include, for example, an inferred or identified user or agent polarity relating to the previous communication; a topic of a present communication (e.g., and an extent to which that relates to a topic of a previous communication and/or a resource set associated with one or more terminal devices or agents); whether the terminal device (or corresponding agent) is available; and/or an estimated response latency of the terminal device. Such factors may be considered absolutely or relative to similar metrics corresponding to other terminal devices. A re-routing rule (e.g., a client-specific or general rule) can indicate how such factors are to be evaluated and weighted to determine whether to forego agent consistency.

When a network device (or other network device associated with a same user or user protocol) has not previously communicated with a terminal device (e.g., about matters relating to a client), a terminal-device selection can be performed based on factors such as, for example, an extent to which various agents' resource set corresponds to a communication topic, availability of various agents at a time and/or over a channel type, types and/or capabilities of terminal devices (e.g., associated with the client), a language similarity between a user and agents. In one instance, a rule can identify how to determine a sub-parameter to one or more factors such as these and a weight to assign to each parameter. By combining (e.g., summing) weighted sub-parameters, a parameter for each agent can be determined. A terminal device selection can then be made by comparing terminal devices' parameters (e.g., to select a high or highest value).

With regard to determining how devices are to communicate, interaction management unit 625 can (for example) determine whether a terminal device is to respond to a communication via (for example) email, chat, SMS message, voice call, video chat, etc. A communication type can be selected based on, for example, a communication-type priority list (e.g., at least partly defined by a client or user); a type of a communication previously received from the network device, a complexity of a received message, capabilities of the network device, and/or an availability of one or more terminal devices. Appreciably, some communication types will result in real-time communication (e.g., where fast message response is expected), while others can result in asynchronous communication (e.g., where delays (e.g., of several minutes or hours) between messages are acceptable).

Further, interaction management unit 625 can determine whether a continuous channel between two devices should be established, used or terminated. A continuous channel can be structured so as to facilitate routing of communications from a network device to a specified terminal device. This inclination can persist even across message series (e.g., days, weeks or months). In some instances, a representation of a continuous channel (e.g., identifying an agent) can be included in a presentation to be presented on a network device. In this manner, a user can understand that communications are to be consistently routed.

In one instance, a parameter (e.g., a score or value, etc.) can be generated using one or more factors described herein and a rule (e.g., that includes a weight for each of the one or more factors) to determine a connection parameter corresponding to a network device and terminal device. The parameter may relate to an overall similarity or one specific to a communication or communication series. Thus, for example, the parameter may reflect a degree to which a terminal device is estimated to be suited to respond to a network-device communication. In some instances, analysis of the parameter can identify a terminal device to route a communication to and whether to establish, use or terminate a connection channel. When an analysis is used to both address a routing decision and a channel decision, a parameter relevant to each decision may be determined in a same, similar or different manner.

Thus, for example, it will be appreciated that different factors may be considered depending on whether the parameter is to estimate a strength of a long-term similarity compared to one to respond to a particular message query. For example, in the former instance, considerations of overall schedules and time zones may be important, while in the latter instance, immediate availability may be more highly weighted. A parameter can be determined for a single network-device/terminal-device combination, or multiple parameters can be determined, each characterizing a similarity between a network device and a different terminal device.

To illustrate, a set of three terminal devices associated with a client may be evaluated for determining candidate terminal devices for communication routing. A parameter may be generated for each that relates to a similarity for the particular communication. Each of the first two terminal devices may have previously communicated with a network device having transmitted the communication. An input from the network device may have indicated satisfaction with an interaction with the communication(s) with the first device. Thus, a past-interact sub-parameter (as calculated according to a rule) for the first, second and third devices may be 10, 5, and 0, respectively. (Negative satisfaction inputs may result in negative sub-parameters.) It may be determined that only the third terminal device is immediately available. It may be estimated that the second terminal device will be available for responding within 15 minutes, but that the first terminal device will not be available for responding until the next day. Thus, a fast-response sub-parameter for the first, second and third devices may be 1, 3 and 10. Finally, it may be estimated a degree to which an agent (associated with the terminal device) can communicate regarding a topic. It may be determined that an agent associated with the third terminal device can communicate with a network device at a higher level than those associated with the other two devices, resulting in sub-parameters of 3, 4 and 9. In this example, the rule does not include weighting or normalization parameters (though, in other instances, a rule may), resulting in parameters of 14, 11 and 19. Thus, the rule may indicate that the message is to be routed to a device with the highest parameter, that being the third terminal device. If routing to a particular terminal device is unsuccessful, the message can be routed to a device with the next-highest parameter, and so on.

A parameter may be compared to one or more absolute or relative thresholds. For example, parameters for a set of terminal devices can be compared to each other to identify a high parameter to select a terminal device to which a communication can be routed. As another example, a parameter (e.g., a high parameter) can be compared to one or more absolute thresholds to determine whether to establish a continuous channel with a terminal device. An overall threshold for establishing a continuous channel may (but need not) be higher than a threshold for consistently routing communications in a series of messages. This difference between the overall threshold and threshold for determining whether to consistently route communication may be because a strong similarity is important in the continuous-channel context considering the extended utility of the channel. In some embodiments, an overall threshold for using a continuous channel may (but need not) be lower than a threshold for establishing a continuous channel and/or for consistently routing communications in a series of messages.

Interaction management unit 625 can interact with an user data unit 630 in various contexts. For example, user data unit 630 may look up an identifier of a network device or terminal device in a protocol data store 635 to identify a protocol corresponding to the device. Further, user data unit 630 can maintain data about previous communication sessions (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a time of last use, any channel constraints and/or supported types of communication), user or agent preferences or constraints (e.g., related to terminal-device selection, response latency, terminal-device consistency, agent resource set, and/or communication-type preference or constraint), and/or user or agent characteristics (e.g., age, language(s) spoken, location, interests, and so on).

Further, interaction management unit 625 can alert user data unit 630 of various connection-channel actions, such that protocol data store 635 can be updated to reflect the current channel data. For example, upon establishing a channel, interaction management unit 625 can notify user data unit 630 of the establishment and identify one or more of: a network device, a terminal device, a user protocol and a client protocol unit 635 can (in some instances) subsequently notify a user of the channel's existence such that the user can be aware of the agent consistency being availed.

Interaction management unit 625 can further interact with a client mapping unit 640, which can map a communication to one or more clients (and/or associated brands). In some instances, a communication received from a network device itself includes an identifier corresponding to a client (e.g., an identifier of a client, object provided by a client, network site, or app page). The identifier can be included as part of a message (e.g., which client mapping unit 640 may detect) or included as other data in a message-inclusive communication. Client mapping unit 640 may then look up the identifier in a client data store 645 to retrieve additional data about the client and/or an identifier of the client.

In some instances, a message may not particularly correspond to any client. For example, a message may include a general query. Client mapping unit 640 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 645 can include identifications of one or more terminal devices (and/or agents) associated with the client. A terminal routing unit 650 can retrieve data relating to each of one, more or all such terminal devices (and/or agents) so as to influence routing determinations. For example, terminal routing unit 650 may maintain a terminal data store 655, which can store data such as terminal devices' device types, operating system, communication-type capabilities, installed applications accessories, location and/or identifiers (e.g., IP addresses). Data can also include agent data, such as position, resource sets (e.g., topics that the agent is knowledgeable about), identifier metrics, working hours, language(s) spoken and/or location data. Some data can be dynamically updated. For example, data indicating whether a terminal device is available may be dynamically updated based on (for example) a communication from a terminal device (e.g., identifying whether the device is asleep, being turned off/on, idle/active, or identifying whether input has been received within a time period); a communication routing (e.g., indicative of whether a terminal device is involved in or being assigned to be part of a communication session); or a communication from a network device or terminal device indicating that a communication session has ended or begun.

It will be appreciated that, in various contexts, being engaged in one or more communication sessions do not necessarily indicate that a terminal device is not available to engage in another communication session. Various factors, such as communication types (e.g., message, email, chat, phone), client-identified or user-identified target response times, and/or system loads (e.g., generally or with respect to a user) may influence how many communication sessions a terminal device may be involved in.

When interaction management unit 625 has identified a terminal device to involve in a communication session or connection channel, it can notify terminal routing unit 650, which may retrieve any pertinent data about the terminal device from terminal data store 655, such as a destination (e.g., IP) address, device type, protocol, etc. Processing unit 610 can then (in some instances) modify the message-inclusive communication or generate a new communication (including the message) so as to have a particular format, comply with a particular protocol, and so on. In some instances, a new or modified message may include additional data, such as user data corresponding to a network device, a message chronicle, and/or client data.

A message transmitter interface 660 can then transmit the communication to the terminal device. The transmission may include, for example, a wired or wireless transmission to a device housed in a separate housing. The terminal device can include a terminal device in a same or different network (e.g., local-area network) as connection management system 600. Accordingly, transmitting the communication to the terminal device can include transmitting the communication to an inter- or intra-network connection component.

Systems and Methods for Facilitating Object Assignments

Figure 7A:
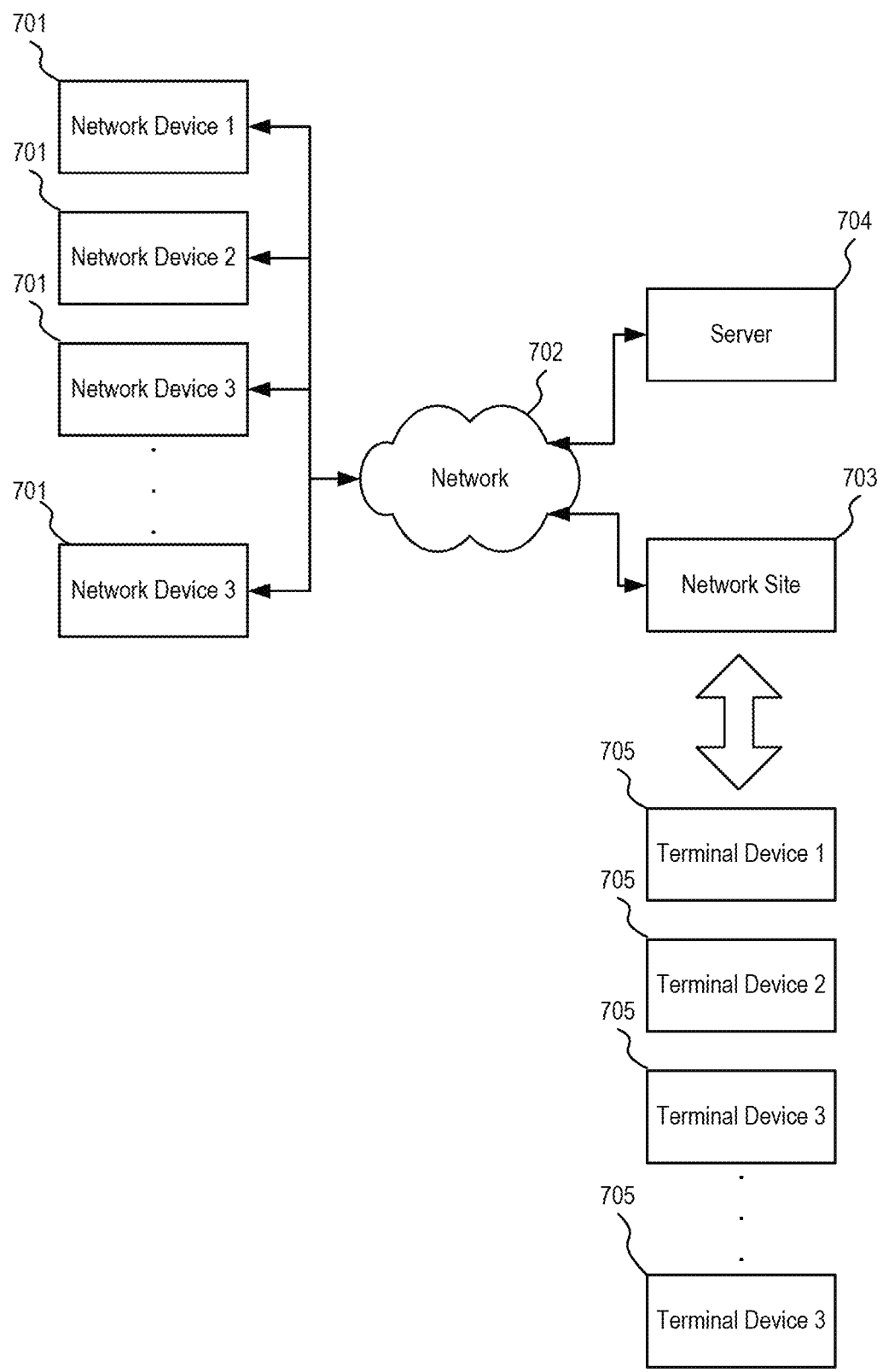
FIGS. 7A and 7B are block diagrams illustrating the overall architecture of the present invention.
Figure 7B:
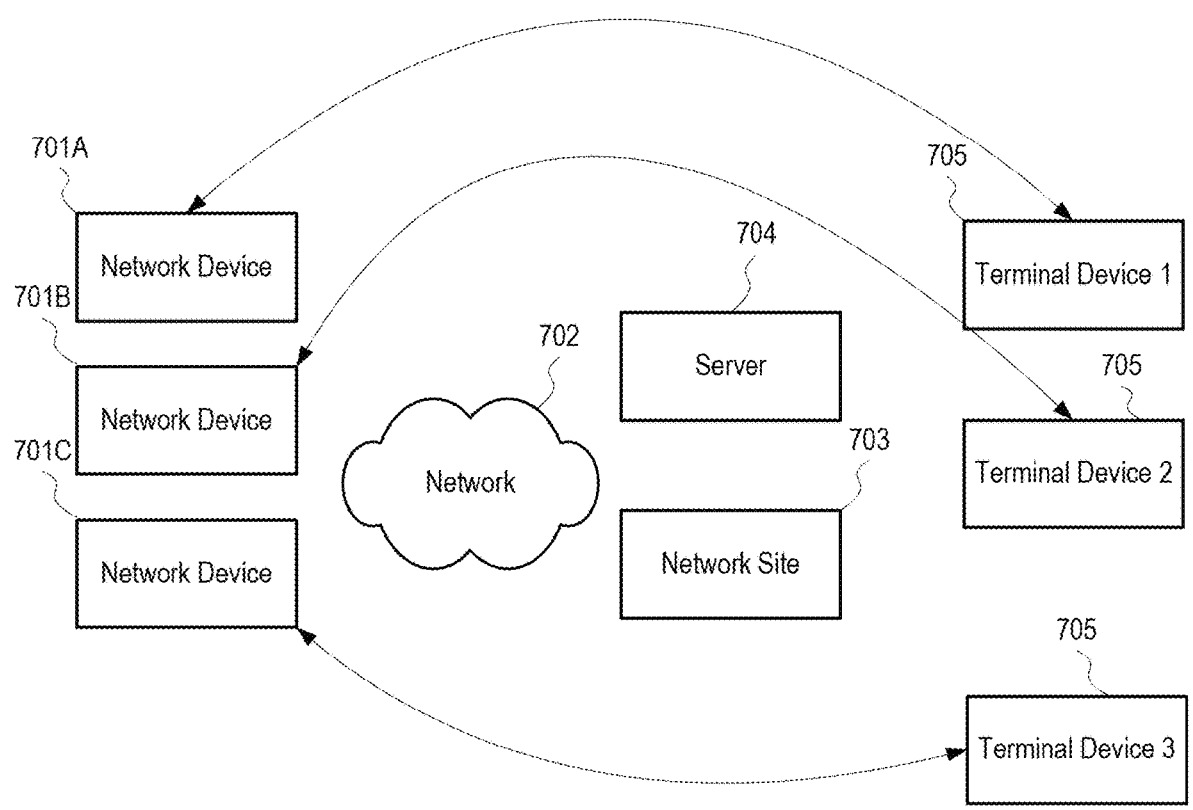

FIGS. 7A and 7B are block diagrams depicting the overall structure of the present invention in one embodiment. Network devices 701 (corresponding to 701A, 701B, 701C in FIG. 7B) can access an interface 703 (e.g., a website) through, for example, the network 702, and can access data regarding objects using the interface 703. Interface 703 may operate as a server, using one of the various types of execution units, including but not limited to a static or dynamic network platform that provides user-specific content to network devices, and network platforms for object assignments. For example, an object assignment and/or object assignment process can refer to the sale of an object while accessing or through the server 704.

A server 704 may store data representing the interface 703, and one or more terminal devices 705 may operate computing devices (e.g., a mobile device) and connect to the server 704 to access the interface, such that the interface is displayed on a screen of the terminal device 705.

The server 704 can operate on any operating system and any hardware platform, such as those that supports JAVA, C, and C++ environments. This includes, but is not limited to, Windows, Linux, Solaris, AIX, etc. In one embodiment, the server 704 may utilize the platform, operating system and development platform as described in detail with respect to system 10 in co-pending U.S. Ser. No. 09/922,753, filed Aug. 6, 2001, which is incorporated by reference herein in its entirety for all purposes.

The interface 703 may facilitate any type of activity, including the assignment of objects, retrieving and/or communication of data, etc. The present invention is not limited thereto—it may be used in conjunction with any type of interface 703 or server that may be accessed by network device 701, or equivalents thereof.

Specifically, the data mining unit (implemented by server 704) of the present invention enables a server to identify specific network devices 701A (see FIG. 7B, described further below) accessing the interface 703. Additionally, this unit may be used to target network devices 701A across multiple interfaces 703, within or outside one or more clients.

FIG. 7B depicts a graphical representation of the type of activity that the present invention can facilitate. Network devices 701A, 701B and 701C can be included in the pool of network devices that can access interface 703 by connecting to server 704 through the network 702. Network devices 701A represent those network devices that are likely to transmit requests for the assignment of an object using the interface 703. In contrast, network devices 701C represent those network devices that the server 704 do not wish to engage. Finally, network devices 701B represent those network devices that may or may not be likely to transmit a request for an object to be assigned to them using the interface based on previous interactions with server 704.

Figure 8:
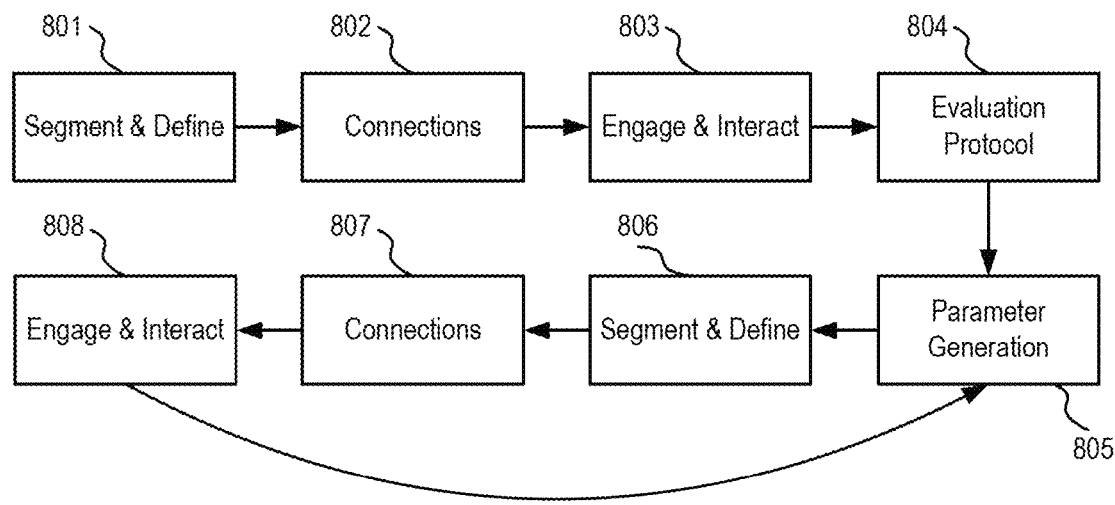
FIG. 8 is a process diagram illustrating the overall operation of the present invention.

FIG. 8 depicts the process performed by the server 104, in one embodiment (with reference to step numbers of FIG. 8):
Step Explanation
  801 SEGMENT and DEFINE—The server 704 can segment the network device 701 pool based on a set of predefined rules identified by the client operating the interface 703.
  802 CONNECTIONS—The set of segmented and candidate engagements with network devices from step 801 are connected to specific terminal devices 705 or terminal device pools.
  803 ENGAGE/INTERACT RANDOMLY—The terminal device 705 then has the option of selecting network devices 701 to engage based on a list of candidate network devices 701 available for engagements, OR, the terminal device 705 can set the system into automatic engage mode where the server 704 can engage network devices 701. The terminal device 705 can tag the end of the engagement with a code that represents the result code of the engagement. Result codes are a set of codes that indicate a type of end result of an engagement.
  804 EVALUATION PROTOCOL—The server 704 uses statistical sampling of appropriate connections (e.g., engagements) for modeling the communication session between the network device and the terminal device. Appropriate connections are defined as those connections with network devices 701 terminating in specific result codes, or connections in which network devices 701 successfully completed an object assignment process, or connections in which the client has determined that the network device successfully completed an object assignment process at a later time. The server 704 identifies attributes of network devices 701 while the network devices 701 are accessing a server (e.g., a client server) to determine attributes that can estimate an intent of a user associated with the network device to request assignment of an object during one or more new connections (such as, e.g., using a regression analysis as described herein). The server generates an evaluation protocol from the data for subsequent analysis.

805 PARAMETER GENERATION—When an evaluation protocol is generated, subsequent network devices 701 are continuously analyzed using the generated evaluation protocol and one or more parameters are generated. For example, the subsequent network devices 701 can be analyzed using the evaluation protocols every 6-10 seconds. A parameter can be generated as a result of analyzing the subsequent network devices 701 using the evaluation protocol. This parameter is used to order all of the network devices 701 connected to the interface 703.

At this point, the process goes to the SEGMENT and DEFINE step 806 (similar to step 801), the CONNECTIONS step 807 (similar to step 802), and the ENGAGE AND INTERACT STEP 808 (similar to step 803), and then the process is repeated at step 805. Subsequent connection determinations are executed using the order generated by the PARAMETER GENERATION step 805 and connect to those with the largest parameters first.

As described above in steps 803 and 808, in one embodiment, the evaluation protocol is generated by having terminal devices 705 that are connected to the server 704 randomly initiate communications with network devices 701 until a statistically relevant number of interactions are obtained for network devices that complete an object assignment. The interactions may be initiated through windows or buttons displayed on the network devices, along with accompanying chat, telephone communications or co-browsing as needed.

For example, for a client operating the interface 703, a desired result code may be defined as a case when a network device 101 initiates an assignment request for an object provided by the client.

Co-pending U.S. patent application Ser. No. 09/922,753, filed Aug. 6, 2001, as well as co-pending U.S. patent application Ser. No. 09/742,091, filed Dec. 22, 2000, disclose various techniques for allowing terminal devices to engage network devices, along with accompanying chat, phone and co-browsing communications, and are both incorporated herein in their entirety by reference thereto. These patent applications are commonly assigned to the assignee of the present application.

Figure 7C:
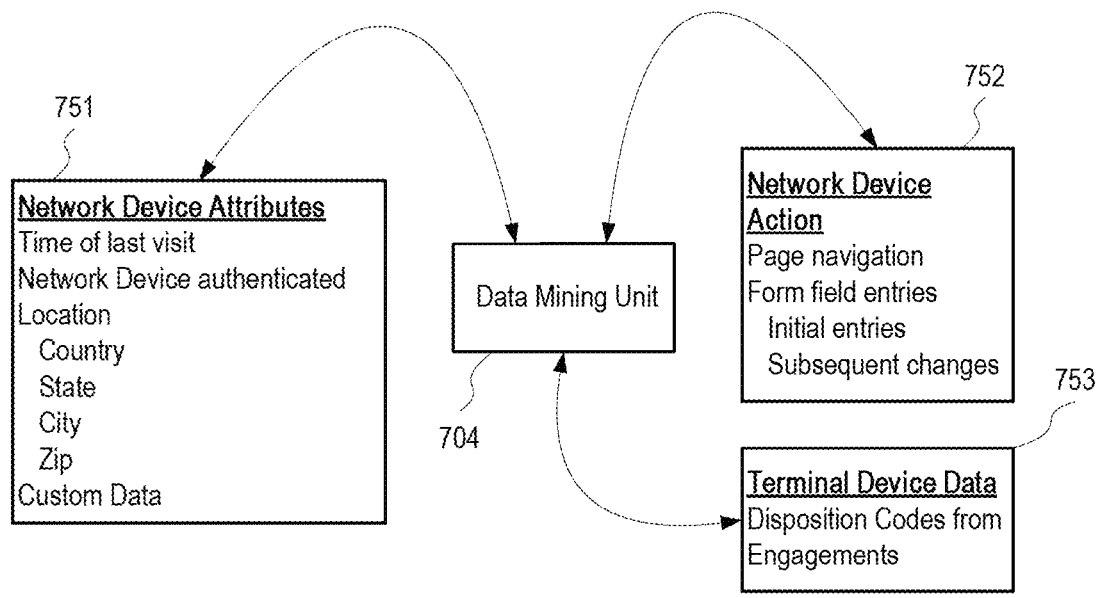
FIG. 7C is a diagram illustrating examples of the various types of attributes, actions, and terminal device feedback that may be evaluated by the real time data mining unit.

FIG. 7C graphically depicts the type of data that is used to generate the evaluation protocol in step 804. Network device attributes 751, network device action 752 and terminal device data 753 are all attributes and characteristics that are obtained by the data mining unit (server) 104 as the evaluation protocol. In the example of FIG. 7C, the network device attributes include data such as: time of last visit, authentication of network device 701, location of network device 701, and/or other suitable data. For example, network device action may include page navigation detected at the network device 701 and data received from inputs into form fields displayed on the network device. Terminal device data may include result codes that terminal devices 705 may use when initially engaging a random sampling of network device 701, and determining what type of object assignment (if any) the network device completed while accessing the interface 703. The result codes may include "completed object assignment", "started but not completed object assignment", and are a set of codes into which the client wants to determine a type of the end results of an engagement. They may vary from implementation to implementation.

According to an aspect of the present disclosure, the network device attributes used to generate the evaluation protocol of step 804 should be random. Rules that distort the selection of one type of network device 701 over another should be bypassed and terminal devices should be prevented from distorting the sample set by initiating connections with network devices in a random manner. The client operating the interface 703 can exclude certain types of network devices (for example those with bad confidence), but any exclusion that exists in the sampling data should persist in the current environment. Specifically, for example, excluding network devices with bad confidence in the sample set, should continue to be excluded network devices with negative attributes when evaluating network devices 701. Moreover, in one embodiment, terminal devices may continue to randomly connect to a certain number of network devices 701 in order to maintain the integrity of the evaluation protocol. The sample size of the random set of network devices will depend on the "lift" provided by the evaluation protocol and how fast evaluation protocols deteriorate or become inaccurate. "Lift" is computed as the increase in predetermined result code rates while using an evaluation unit when compared to a completely random selection process. If 100% of the connected network devices are engaged, then the lift will be zero.

The server 704 requires a predefined amount of data before an algorithm analysis (e.g., regression analysis) may be performed in step 804 (described further below). In one embodiment, terminal devices 705 may randomly connect to network devices 701 until a set number of connections (e.g., 500-1000 connections) occur and corresponding result codes are generated. In another embodiment, terminal devices 705 may conduct a sufficient number of engagements with network devices 701 until they reach a set number (e.g. 500-1000) of "appropriate" engagements.

In step 804, an algorithm analysis is executed which determines the most occurring attributes of network devices 701. In one embodiment, the attributes on which the algorithm analysis is executed are undistorted by any manual process, and the attribute data is obtained. Moreover, the attributes common among those network devices 701 having executed or initiated the object assignment process may vary. For example, suppose the following attributes are obtained for network device 701 while accessing server 704:

IP address
Time of day
Time on site
Values input into a digital form
Page navigation details
Version of software interface These attributes obtained when connected to one server may be different than attributes obtained when connected to a different server. Nevertheless, if over time, certain attributes are common for network device 701, then the algorithm analysis performed in step 804 will identify such common attributes.

In addition to attributes or characteristics identified by the server 704, the present invention may also perform the algorithm analysis on attributes obtained from third-party sources, such as third-party data stores, and the like. Any data associated with a network device 701 may be obtained and analyzed in an neutral manner. The present invention can include performing the algorithm analysis (in step 804) on any and all such data, and will determine common characteristics of this set of data, thereby solving for the similarities of all network devices 701 who end up interacting with a server (e.g., server 704) in a manner than results in an object assignment.

An algorithm analysis tool may be used to execute a regression analysis in step 804. Logistical Regression with Sequence Analysis may be used to perform the algorithm and generate an evaluation unit.

The present invention may be configured to characterize different types of actions, including a network device's 701 proclivity to approve an engagement by terminal devices 705, or to complete an object assignment while accessing the server 704 (e.g., an object assignment associated with a high value). For example, the type of action characterized may be based on the activity by terminal devices 705.

In step 804, when the algorithm analysis generates, as output, a list of common attributes, the list may be sorted as needed. For example, the list of attributes may be sorted in order of importance, starting with the most common attribute first.

Also in step 804, the server 704 creates an evaluation protocol of the most common attributes, and stores it in memory. The server 704 may perform this evaluation periodically, and when there is a critical mass of data, in step 805, it will then automatically begin to generate parameters for new network devices 701 against the evaluation protocol.

In step 805, the server 704 compares every new network device 701 on the network interface 703 (or plurality of network interface 703) with the stored evaluation protocol in real time (every few seconds or so). Based upon how similar the new network devices 701 are in comparison with the stored evaluation protocol, each new network device 701 is evaluated (e.g., a parameter is generated for each new network device). As the network devices 701 continue to interact with the interface 703, the evaluation may be continuously updated.

Figure 7D:
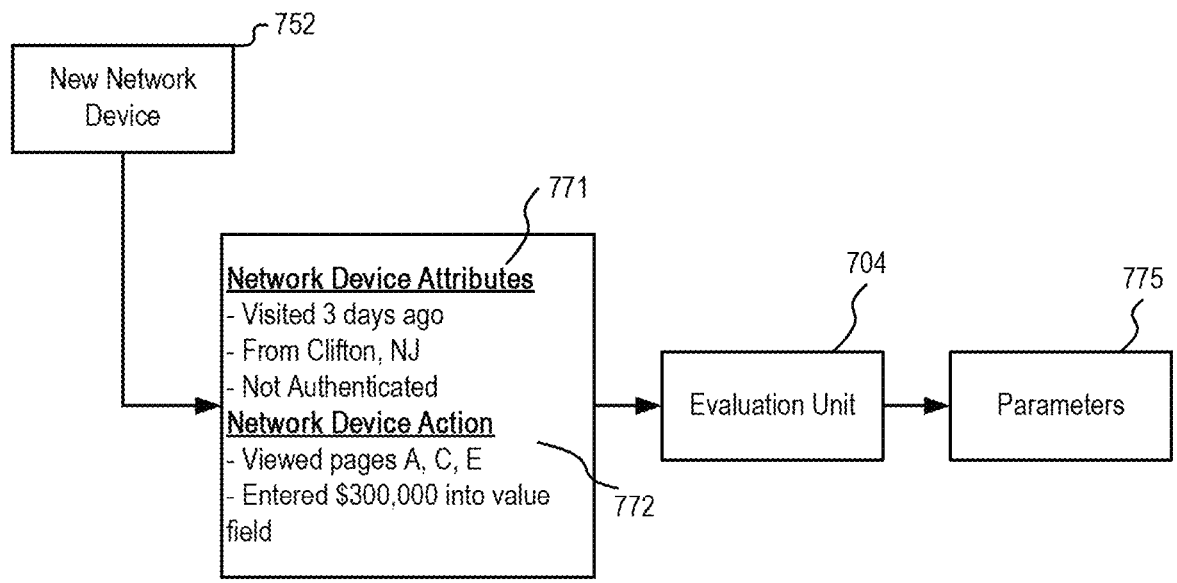
FIG. 7D illustrates the process of generating a parameter for a new network device accessing a server.

The parameter generation process of step 805 is shown graphically in FIG. 7D, whereby the new network device 701 has certain attributes 771 and action 772. In this example, the new network device 701 accessed the interface 703 three days ago, and is located in Clifton, N.J. In this case, the new network device 701 is not authenticated—for example, the new network device 701 may not have registered and logged into the server 704 before. Also, in this case, the new network device 701 has viewed pages A, C and E of the interface during this session, and has entered the value $300,000 into a "value" field of a form. The evaluation unit thereafter generate a parameter for (step 805) the new network device 701 against the evaluation protocol stored in step 804, and an evaluation 875 is created.

Figure 7E:
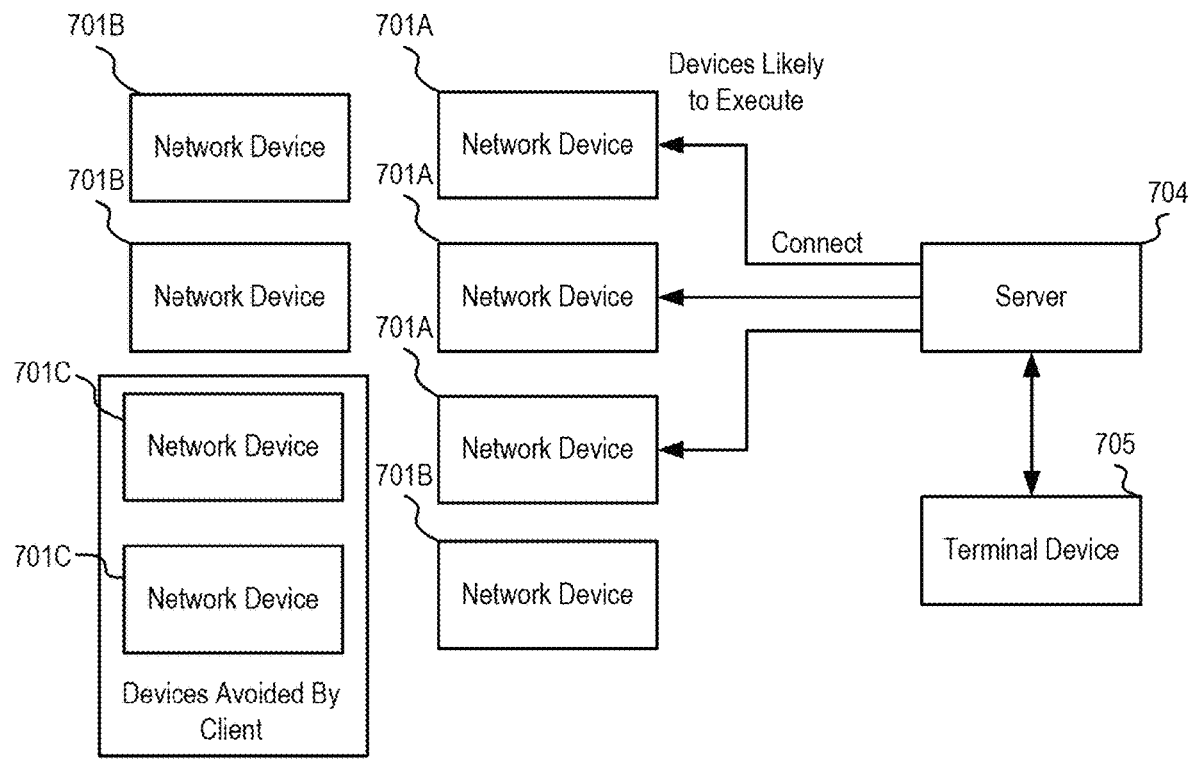
FIG. 7E illustrates sorting network devices by similarity parameter, and how terminal device may thereafter engage the network device.

After the parameters 775 for the new network devices 701 are generated, the parameters are used to determine who to engage (by a terminal device 705) and when. With reference to FIG. 7E, when the new network devices 701A, 701B and 701C have parameters generated for them in step 805, the server 704 may sort these network devices by the value of the parameter. In the example of FIG. 7E, the network devices 701A most likely to execute a process are evaluated 1, 2 and 3, the middle group 701B is evaluated 4, 5 and 6, and the network devices 701C that the client does not want to engage are evaluated 7 and 8.

The sorted list of new network device 701 may then be transmitted to or retrieved by a server (either the server 704, or a separate server). This server will then automatically engage the highest-evaluated network devices 701, on behalf of terminal devices 705.

Because parameters may change for network devices during their session (based upon changes in attributes and actions over time), the server 704 may periodically re-evaluate and re-sort new network devices 701, and thus re-prioritize which network devices 701 to engage first.

Through a combination of rules and a real time data mining unit, the server 704 operates to connect the most appropriate network devices 701A to the most appropriate terminal devices 705. Rules may be used to implement constraints—for example, identifying network device 701C that the client has defined as network devices not to be engaged (e.g., those with negative attributes, etc.). Rules may also be used to implement routing requirements (e.g., network devices 701A can be routed to terminal device 705A to communicate regarding a particular subject matter, and not terminal device 705C, etc.). For example, see U.S. Ser. No. 10/980,613, filed Nov. 3, 2004, the disclosure of which is incorporated by reference herein in its entirety for all purposes. Over time, the server 704 of the present invention will learn to identify the action of network devices 701A who are most likely to successfully completed particular processes when accessing the server hosting the interface 703 (out of the pool of network devices 701B who may not be the most appropriate, and network devices 701C who the operator of the interface 703 does not want to engage).

Identification of Terminal Devices Suitable for Engagement with Network Devices

Figure 9:
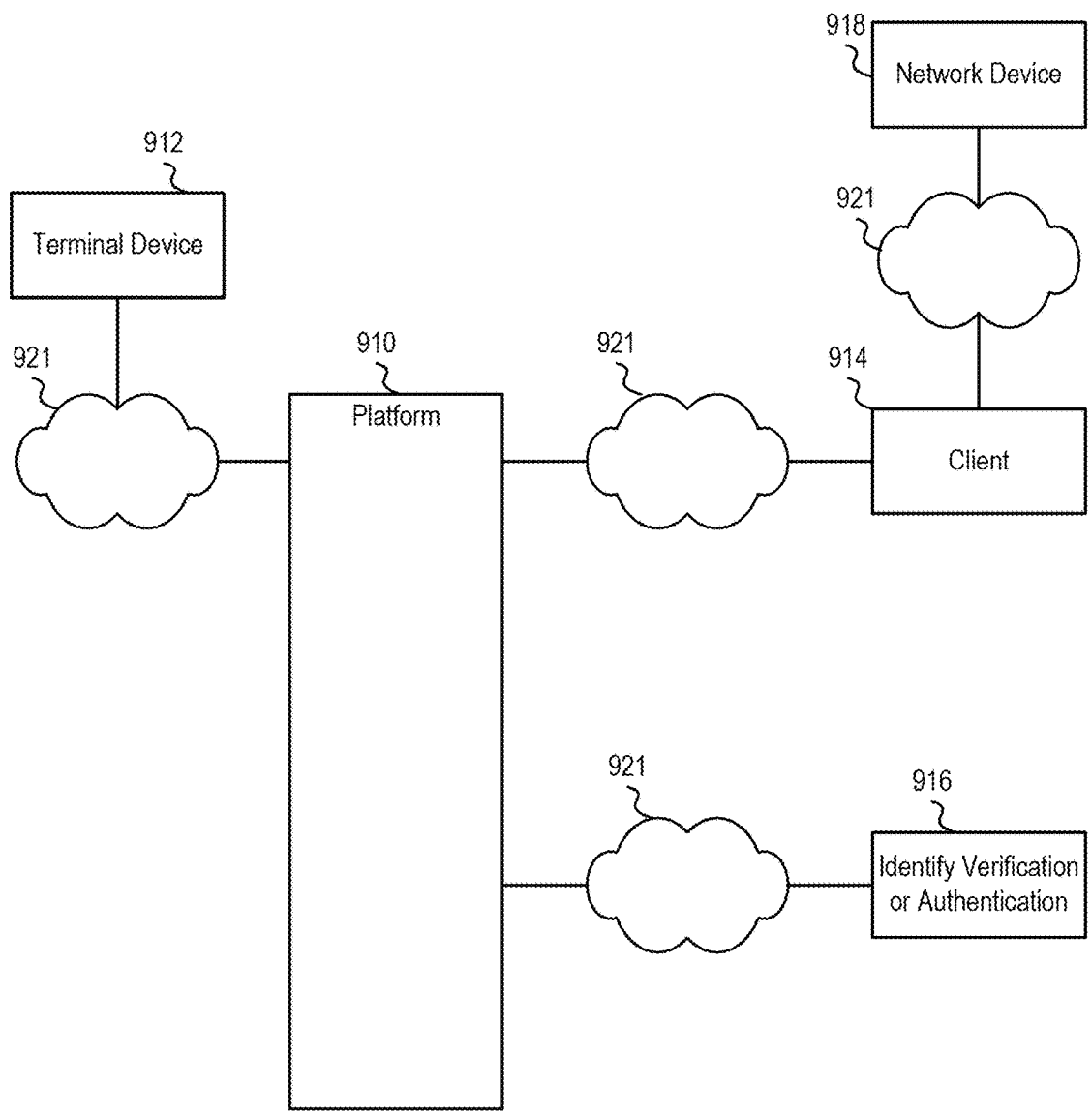
FIG. 9 is a functional diagram illustrating the external connectivity of an embodiment of a system for linking terminal devices to network devices according to the present invention.

FIG. 9 shows the connectivity of an embodiment of the platform 910 of the terminal device connection processes and systems according to the present invention to other entities. For example, platform 910 can interface with terminal devices 912, clients 914, and action reporting unit (e.g. identity verification or authentication) 916. Platform 910 is indirectly connected to network devices 918 through clients 914. Platform 910 provides a complete solution to connecting terminal devices 912 with network devices 918, so that the terminal devices 912 can set up communication sessions with the network devices 918.

In some instances, clients and client devices can be associated with any organization. For example, a client can be an entity that provides objects for assignment to users over networks, and that provides terminal devices to communicate with network devices through the network (e.g., a network site). Action reporting unit 916 includes any protocol that provides data on a user (e.g., background data and other suitable identifying data).

Platform 910 may include a network of platforms, computers, or other functionality, located in one or more locations, running any operating systems and applications. In the embodiment, platform 910 is implemented on a Sun Microsystems, JAVA-based architecture. Platform 910 may be connected to the terminal devices 912, client 914, and action reporting unit 916 and any other entity via public or private packet switched or other data networks including circuit switched networks, such as the public switched telephone network, wireless network, or any other communications infrastructure 921.

Figure 10:
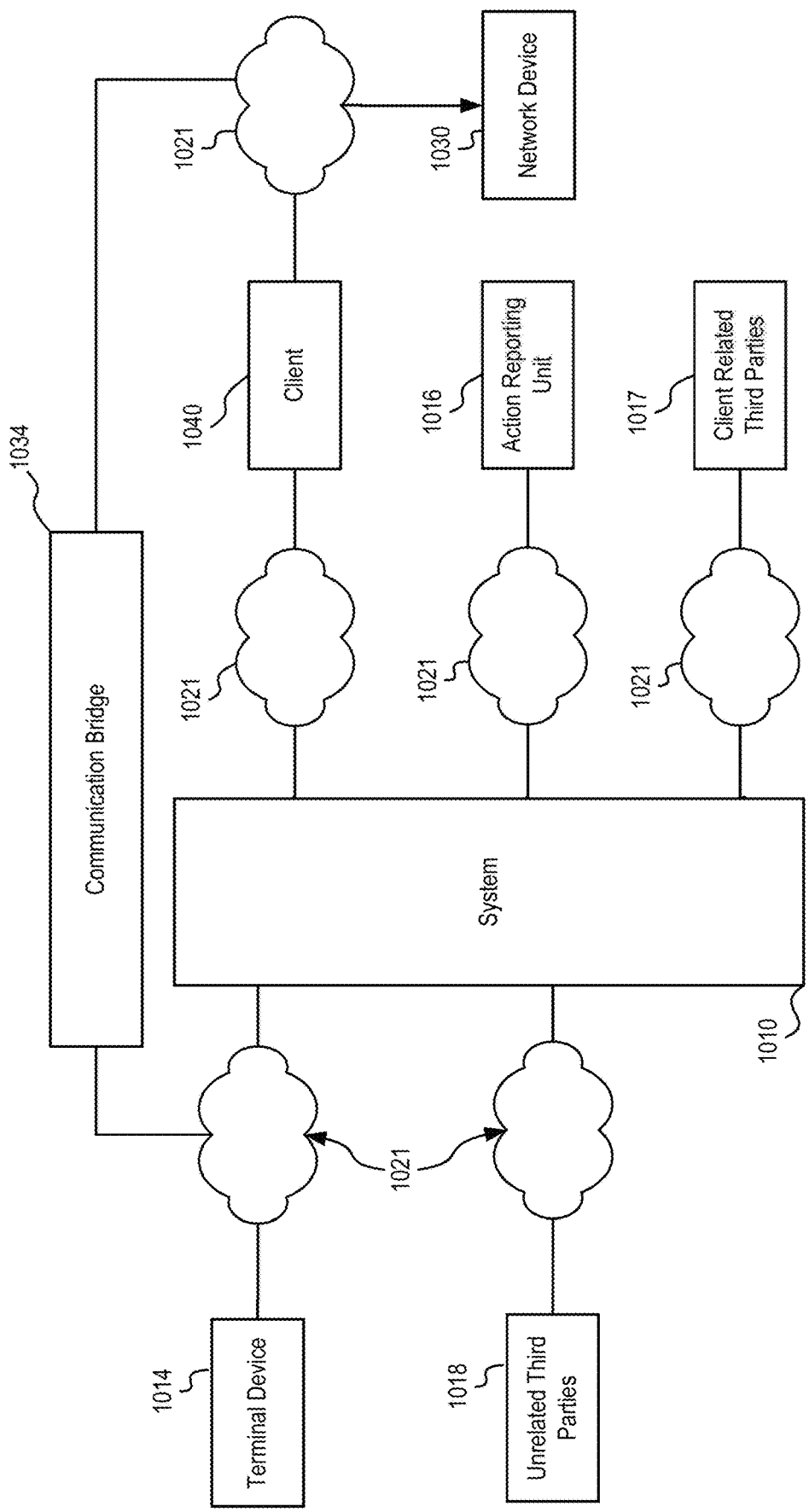
FIG. 10 is a functional diagram illustrating the external connectivity of an embodiment of a system for linking terminal devices with network devices according to the present invention.

FIG. 10 shows the connectivity of an embodiment of the system 1010 of the present invention to other entities.

System 1010 can interface with other external entities, terminal devices (e.g. computing devices operated by or associated with agents) 1014, clients 1040, action reporting unit 1016, client related third parties 1017, and unrelated third parties 1018. System 1010 is indirectly connected to network devices 1030 through the client 1040. System 1010 connects a network device with the most appropriate terminal device or terminal devices based on predetermined criteria and provides the terminal devices with tools and data to enable terminal devices via terminal device-facing interfaces to communicate with the network during communication sessions. Further communication between the terminal devices and network devices is facilitated by the communication bridge 1034. System 1010 further provides network sites or interfaces to enable the client to monitor the process.

Terminal devices can work for the client, captive terminal devices (CTD), or can be independent terminal devices (ITD), who represent the same object or set of objects for a number of different clients.

Examples of some client related third parties 1017 are the client's CRM or eCRM system, the client's ERP system, the client's data mining/analytics platforms, the client's human resources system, and the client's object quantity, and other backend systems. Unrelated third parties 1018 are parties that have relevant data to assist in the process, such as publications and a third-party's network site. Action reporting protocols 1016 are any protocols that provide identifying data relating to a user. These protocols can be accessed to verify the identity of a terminal device.

System 1010 may take the form of a network of a particular systems, computers, or other functionality, located in one or more locations, miming any operating systems and applications. In one embodiment, system 1010 is J2EE compliant and is implemented on a Sun Microsystems, JAVA-based architecture and in another embodiment system 1010 is implemented in a Linux-based system. System 1010 may be connected to the terminal devices 1012, clients 1014, action reporting protocols 1016, and client related third parties 1017 and any other entity via public or private packet switched or other data networks circuit switched networks, such as the PSTN, wireless network, or any other communications infrastructure 1021. Server is used herein to refer to an application on a server or a portion of a server shared with other applications.

Figure 11:
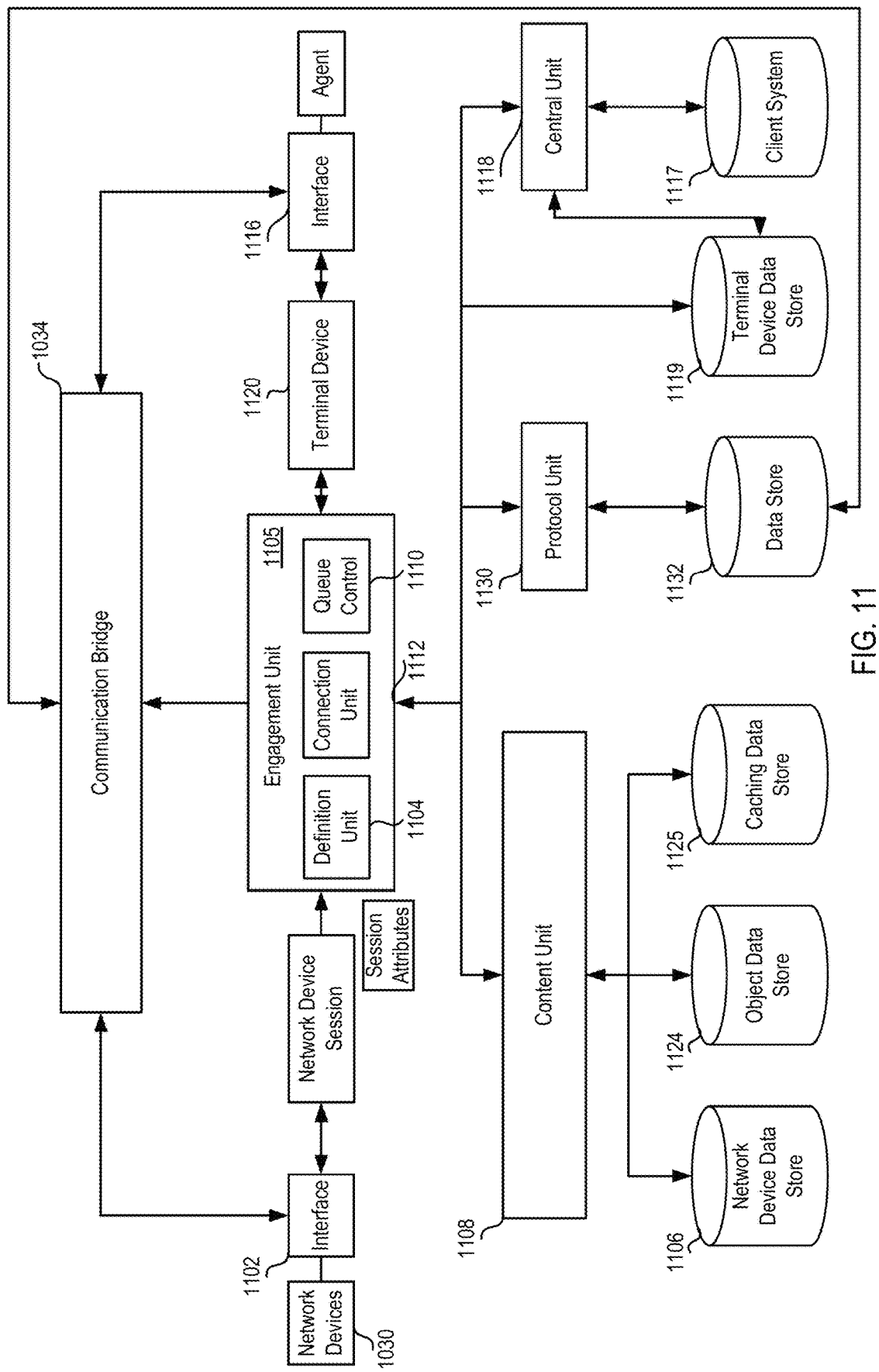
FIG. 11 is a functional diagram schematically illustrating the architecture of the system and the external connectivity of the system with an client.

FIG. 11 illustrates the connectivity and architecture of the system 1010 when connected to a particular client server 1014. A network device 1030 accesses a client server 1014 using an interface 1116. As the network device navigates the network site, the client can monitor the activities or session data of the network device 1030. For example, a session data message or messages can be transmitted in XML format, and are sent from the client server 1014 to a definition unit 1104 in an engagement unit 1105. For example, session data includes any clickstream-related data, such as, whether the network device has requested a communication session with a terminal device, whether the network device has indicated that it does not want to connect or communication with a terminal device, the page on an interface that the network device has accessed, and/or the objects the network device is displaying on that page, location or other data characterizing the network device extracted from the interface the network device is displaying, the contents of the network device's object assignment request queue (e.g., cart of objects on a network site), the time that the network device has displayed a particular object on an interface, the network device's analysis characteristics, the identity of the network device, and the network device's previous object assignments with this client. The definition unit 1104 may also receive network device data about the network device 1030 from an client's network device data store 1106 via a content unit 1108. The content unit 1108 accesses the network device data store the client's system. The network device data may include some or all of the following data: a name associated with the network device, address, previous object assignment data, past terminal devices accessed or engaged, objects of interest, past network activity, and recommended object assignment based on previous object assignments, if such data is available about the network device. Based on the session data and/or the network device data received, the definition unit 1104 defines and determines whether the network device is required to be engaged by a terminal device or is a target for permissive engagement from a terminal device. If the definition unit 1104 determines the network device requests or requires engagement from a terminal device, the definition unit 1104 sends an XML message to a connection unit 1112. The definition unit data input to the connection unit 1112 from the definition unit 1104 includes session data and network device data.

A terminal device connects to the system 1010 either through the client's internal network ("intranet") and/or through an interface 1116. A terminal device must be authorized to provide information relating to objects to be assigned to users, before initiating an engagement with a network device and communicating regarding specific objects. A central unit 1118 (e.g., intelligence unit) may also receive performance data regarding terminal devices from the client's systems 1117. For example, performance data can include data indicating a terminal device's evaluation parameter within the client (based on a range of criteria, including a number of times the terminal device has facilitated a completion of an object assignment, etc.), and any authorizations to provide certain objects. This data on terminal devices is stored in the terminal device data store 1119. The central unit 1118 also continuously obtains data regarding processes (e.g. interactions with network devices) and the performance of the terminal devices within specific process contexts, and generates reports on the processes as well as performance reports on the terminal devices. Such process data includes, for example, whether the process resulted in the object assignment and identifiers of the objects assigned or attempted to be assigned. The central unit 1118 can include applications to monitor the assignments completed over the system and manage the engagements initiated by terminal devices. The system also includes applications that monitor and generate reports on the clients and network devices and can be provided to the client via client-facing network sites. If the system is used with independent terminal devices, the system connects with action an recording unit so that action reports of the terminal device can be obtained.

When an agent is connected to a server associated with the system, the agent can access an interface displayed on terminal device 1120. The terminal device's protocol data is sent to the connection unit 1112. A terminal device's protocol data includes, for example, the terminal device's name, objects for which the terminal device can facilitate an assignment to a user, and performance data with respect to the terminal device's performance using the system. The terminal device's protocol data is continuously updated by the system. Based on the protocol data of the currently available terminal devices, network device data, and session data, the connection unit can identify available terminal devices most fit to communicate with the network device. The connection is performed in a wide range of client- and system-specified ways, as explained in more detail below. A list of identifiers of terminal devices can be sent from the connection unit to the queue control 1110 and the queue control ensures that a terminal device is paired up with the network device and that the terminal device responds or initiates an engagement with the network device.

The terminal device 1120 can display a communication user interface to the agent through which the interactions of network devices can be monitored. The terminal device 1120 can facilitate a communication session with a selected network device and provide information regarding one or more objects associated with a client. For example, during a communication session, the terminal device can remotely control the network device's navigation of one or more network sites.

The terminal device 1120 can connect to object data store 1124 using the content unit 1108 and can request object data and object quantity data. The content unit 1108 can connect to the object data store 1124 using, for example, the client's system. Object data includes, for example, object specifications, ancillary objects (e.g., similar objects or object alternatives and/or alternative quantities of objects), object type data, object data from other network sites providing similar objects. Object quantity data includes, for example, a quantity of objects available for assignment, assignment condition data (e.g., a price), and the like.

The terminal device 1120 receives external data from a caching data store 1125 via the content unit 1108 and from a data store of protocols via a protocol unit 1130. The protocol unit 1130 retrieves and organizes in the caching data store 1125 and the data store 1132 the external data, such as object-related data, and any data related to the object, whether provided from client servers, from third party servers and made available digitally or from terminal devices in past engagements.

Assignment data (referred to herein as object, object quantity, and/or external data) is obtained electronically, passed from the object data store 1124 in the case of internal data, or, in the case of external data, generated from external servers and captured through monitoring of the system over time. This data is then displayed on the terminal device 1120 through an interface.

The terminal device 1120 receives protocol data (e.g., data relating to best practices) from the data store 1132 via the protocol unit 1130. The protocol unit 1130 monitors all communication, data, external data, and resources used by a terminal device during an engagement and for a particular object. All of this data is then stored by client servers and analyzed based on a result of each engagement to generate a set of protocols (e.g., protocol data). The protocol data is then stored in the data store 1132. The protocol unit 1130 indexes the object assignment interactions (e.g., transcripts of communication sessions, audio transcripts of voice over IP sessions and/or telephone sessions, interactions with interfaces, etc.) in a manner that allows the protocol unit to generate dynamic protocol data against the specific parameters of each engagement resulting in an object assignment. Further, during an assignment, a terminal device has access to the stored protocol data and external data to assist in completing the assignment, as discussed below with reference to FIGS. 15 and 16. The protocol unit 1130 can calculate a correlation between the communication data, external data, and resources used, the use of the communication data, external data, and resources in an engagement, and how many times the communication data, external data, and resources were used in engagements that resulted in completion of an object assignment to a user associated with a network device. This data can also be transmitted to client servers.

Further communication between terminal devices and network devices is facilitated by communication bridge 1034. Communication bridge 1034 facilitates communication channels, such as telephone, instant messaging, collaboration, conferencing, e-mail, and voice over IP. The communication bridge 1034 can be internal or external to the system 1010. Through this communication bridge, an object assignment to a user associated with a network device that was initiated in a communication session (e.g., a chat) with a terminal device can be bridged through a third-party to a PSTN-based phone call. This bridge is established either by the terminal device during the communication session with the network device using a telephone number to call or by the network device providing the terminal device with the a telephone number associated with the user operating the network device. The terminal device can establish a telephone call with the network device via the communications bridge 1034. In that call, if the terminal device has access to both a phone line and a connected network, the terminal device and network device can communicate via voice, while still maintaining a co-browsing session, i.e., the terminal device can talk to the network device while navigating the network device through a network site.

Figure 12:
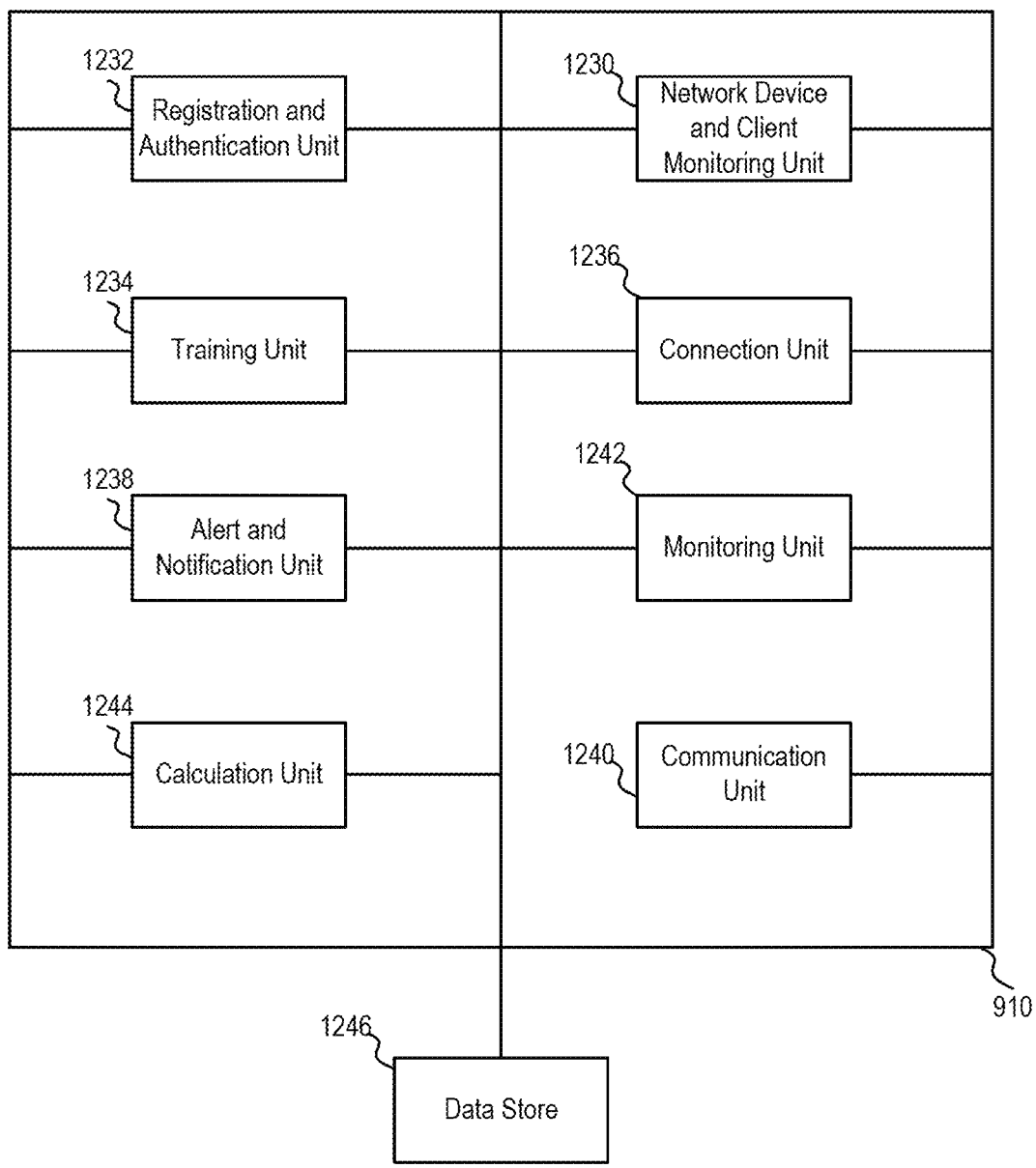
FIG. 12 is a functional diagram schematically illustrating the architecture of the system and the external connectivity of the system with an client.

FIG. 12 shows various units that facilitate the data flow and system activity and processes of platform 910. Platforms 910 can include some or all of the units shown in FIG. 12; they need not include all such units. The Network Device and Client Monitoring Unit 1230 monitors network device interaction with the client's server when accessing a network site. The Registration and Authentication Unit 1232 facilitates registering new terminal devices (including verification of the candidate terminal device's identity) and authenticating existing terminal devices. The Training Unit 1234 facilitates the training and authorization procedures that enable terminal devices to establish a resource set relating to objects provided by the client for assignment to users. The Connection Unit 1236 connects terminal devices with network devices (or allows network devices to connect to specified terminal devices with which the network device had prior positive communications) based on various client or network device conditions.

The Alert and Notification Unit 1238 transmits alerts via instant messaging, email, pager, telephone, or any similar method to terminal devices that they have been selected to engage with a network device accessing a client's server (e.g., to display a network site), monitors the number of terminal devices connected to a server, and transmits alerts to terminal devices when certain conditions are satisfied (e.g., a rule is satisfied based on interactions between the client server and the network device) to connect to the server and initiate communication sessions with network devices. The terminal device/network device Communication Unit 1240 can facilitate communication between the terminal device and the network device via instant messaging, voice over IP, or other methods. The Monitoring Unit 1242 monitors all communications in real-time between the terminal device and the network device and analyses each process (e.g., for terminal device performance data). The Monitoring Unit 1242 also receives network device feedback on terminal devices. The Calculation Unit 1244 obtains all object-assignment data, analysis of terminal device performance data, and other similar data. The Data store 1246 contains data on the interactions and could be separate from all of the aforementioned units or a portion of the data store could be found in each of the aforementioned units.

Figure 13:
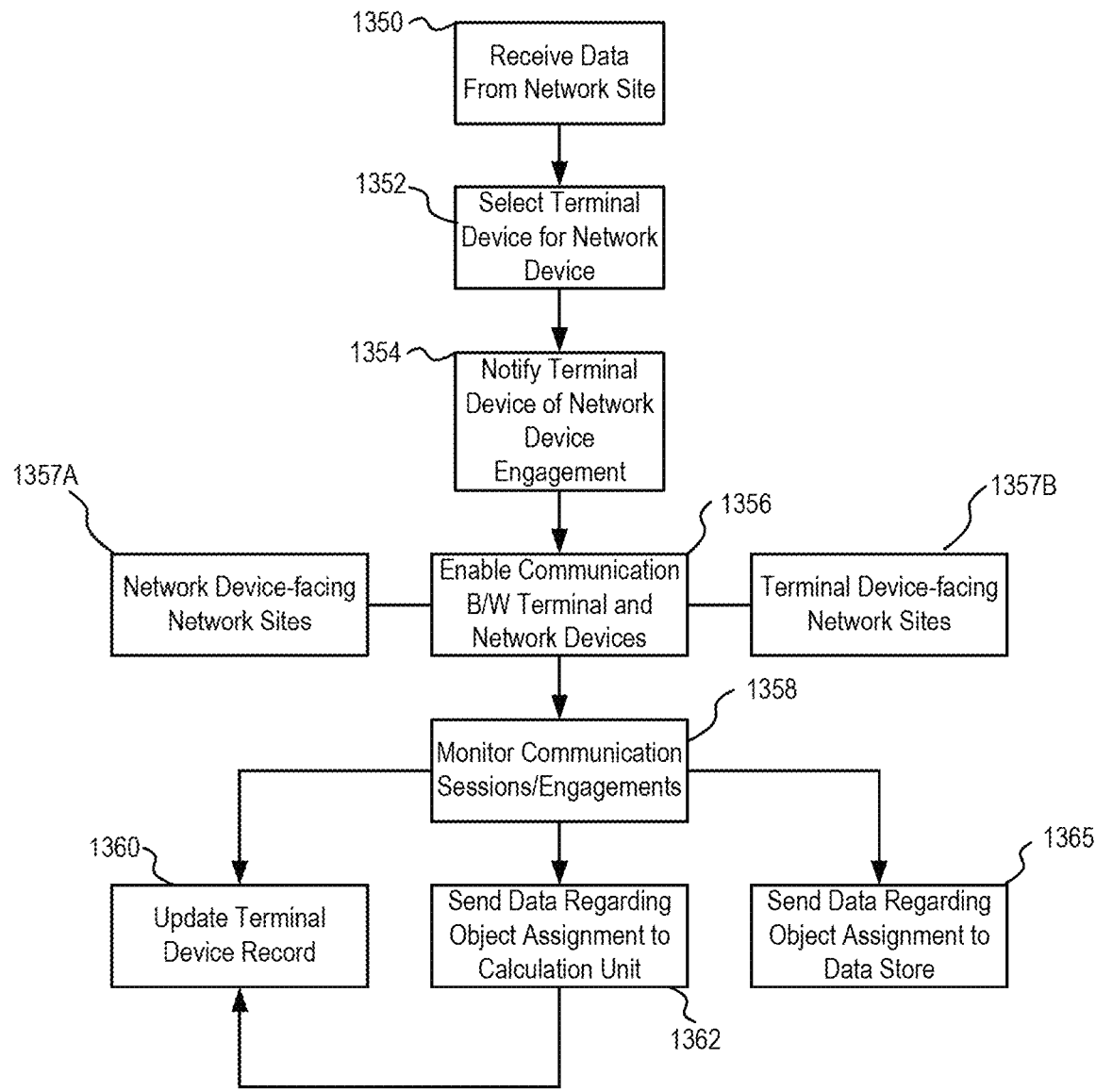
FIG. 13 is a flow diagram illustrating the operation of some of the functionality of the present invention.

FIG. 13 illustrates an overview of part of the functionality of platform 910. At 1350, data is received from a client server regarding a network device's interaction on a network site, such as what objects are displayed on a screen of the network device and whether or not a request is received from the network device for an engagement (e.g., a communication session, a chat session, etc.) with a terminal device. At 1352, based on the network device data and various terminal device data, the platform selects a terminal device to initiate an engagement (e.g., initiate a communication session) with the network device. The network device may also request a specific terminal device. Then at 1354, the platform notifies the selected terminal device of the network device requiring an engagement. In another embodiment, the terminal device identifies candidate network devices by using the platform to identify active sessions across the network relating to a particular resource set. In all embodiments, the platform provides object-assignment data. In any embodiment, the platform manages the engagement or communication session so that only a specified number of terminal devices is communicating with a single network device at any one time.

The platform then, at 1356, facilitates a communication session between the network device and the terminal device via instant messaging, voice over IP, or other communication technologies. For example, the same images and text being displayed on a screen of the network device are also displayed on the terminal device when the terminal device has initiated a communication session or engagement with the network device. Moreover, the platform enables the terminal device, with the network device's authorization, to control the network device's access of one or more servers (e.g., a client server) to access a network site.

At 1358, the platform monitors all communication sessions and/or engagements, including all of the communication between the terminal device and the network device. This monitoring allows the platform to provide such data for random analysis of the terminal devices. In addition, through open APIs between the platform and the client infrastructure, the platform can be integrated with other systems, whether administered by the client or not.

At 1360, some of this data is used to update the records of the terminal devices. At 1362, some of this data is sent to the Calculation Unit where it is used to generate performance data relating to terminal devices. At 1364, the data regarding object assignment processes is sent to the data store. Such data is important in determining protocols for assigning objects to users and network device actions (e.g., behavior) and can be used to generate and transmit reports to the client systems.

Figure 14:
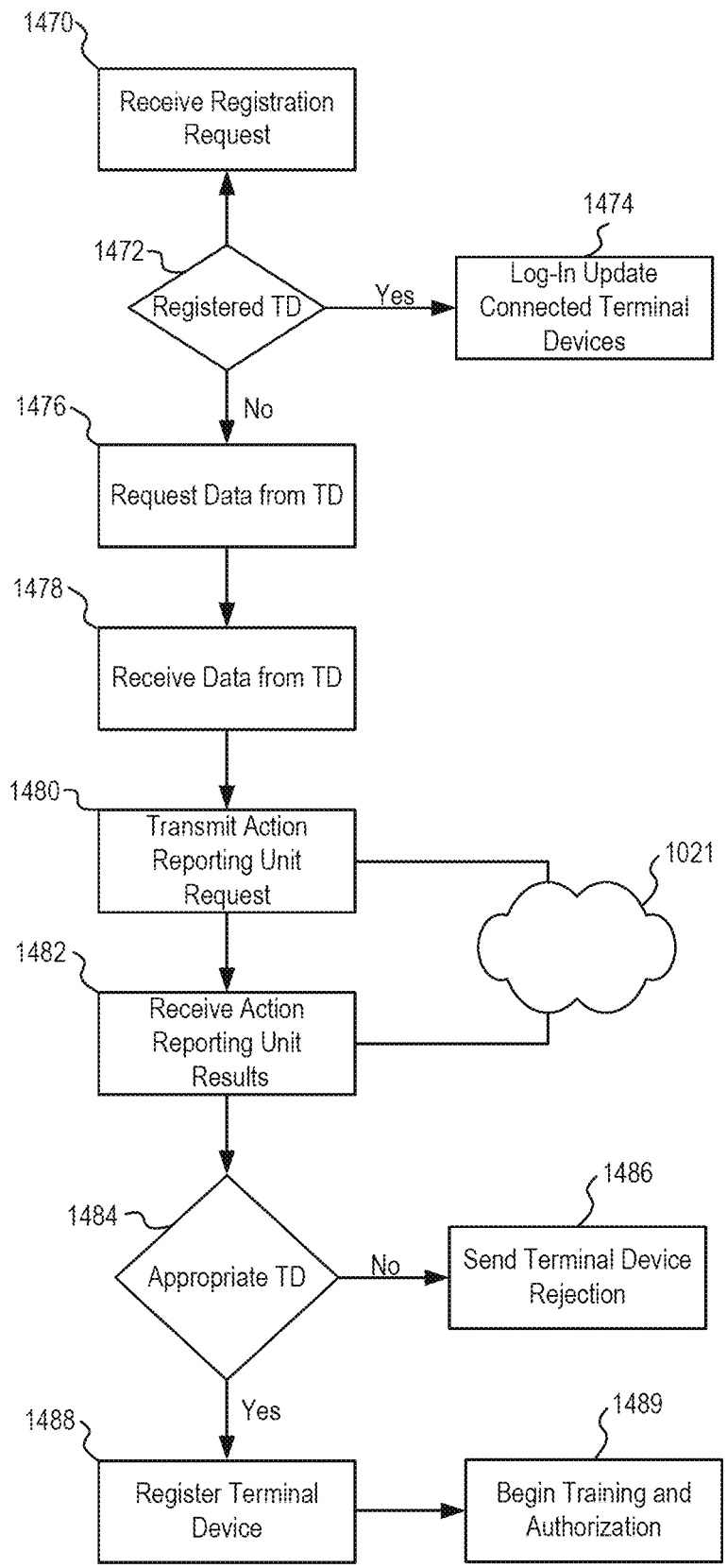
FIG. 14 is a flow diagram illustrating the registration and authentication process according to an embodiment of the present invention.

FIG. 14 shows a flow diagram of the registration and authentication process according to one embodiment of the present invention. At 1470, the central unit 1118 receives a registration request. At 1472, the central unit 1118 unit determines if the requester is a registered terminal device by transmitting a prompt to the terminal device for receiving a preselected username and password from the terminal device. If the terminal device is registered with the system, the central unit 1118 logs the terminal device in and updates its records of connected terminal devices, as shown at 1474. If the terminal device is not registered, the central unit 1118 requests terminal device data from the terminal device, as shown at 1476. The requested terminal device data may include user identification (including a picture), and other data, such as, the name, address, and phone number of the agent associated with the terminal device, etc. The intelligence unit may also request and receive some client terminal device data on the terminal device. This client terminal device data includes, for example, performance data on the terminal device, and the objects the terminal device is authorized to assign to users. Terminal device data and client terminal device data is combined with any other terminal device performance data to generate a terminal device protocol on each terminal device. If this is a CTD, the terminal device may be required to provide security data to establish that the device may initiate engagements on behalf of the particular client. Alternatively, a CTD for a particular client can register via an client-specific URL.

At 1478, terminal device data is received from the terminal device. For identity verification, the central unit 1118 may cause a request to be transmitted to an action reporting unit as shown at 1480. This request may be transmitted directly from the system network. As a result, the system can identify authorized terminal devices and prevent unauthorized access to client systems. At 1482, the central unit 1118 receives the action reporting data from the unit. The intelligence unit can also receive client terminal device data, such as, for example, object authorization data, schedule data, other relevant data, and performance data on the terminal device from the client. The central unit 1118 analyzes any action reporting data, any client terminal device data, and terminal device data at 1484 to determine if the terminal device is appropriate for an engagement. If not, at 1486, the terminal device is sent a rejection message. If the terminal device is appropriate, the terminal device receives a notification message indicating such, and provided further instructions about registering and about the system. The notification messages can be transmitted and received either over a network or not. The terminal device then may provide the system with the schedule and contact data, for example, (i) only when "available," (ii) as notification preferences, and (iii) as notification preferences based on a terminal device-established schedule. At 1489, the terminal device may be routed to initiate the training and authorization process prior to completing the registration process.

Figure 15:
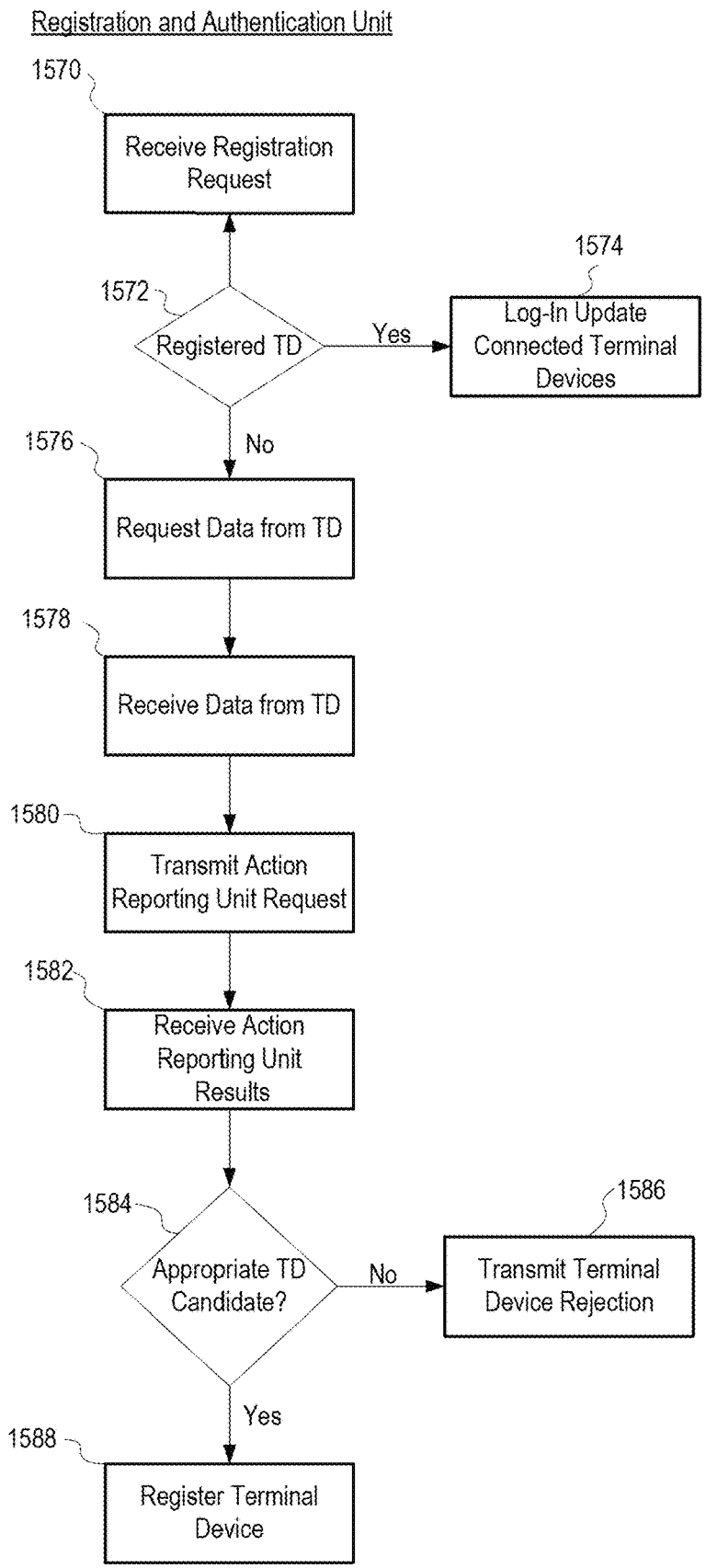
FIG. 15 is a flow diagram illustrating the registration and authentication process according to an embodiment of the present invention.

FIG. 15 provides a flow diagram of the registration and authentication process according to one embodiment of the present invention. At 1570, the Registration and Authentication Unit receives a communication that includes data representing a registration request from a requester device (e.g., a candidate terminal device). At 1572, the Registration and Authentication unit determines if the requester is a registered terminal device by transmitting a prompt to the terminal device for a username and password. If the terminal device is registered with the platform, the Registration and Authentication Unit logs the terminal device in and updates the record of connected terminal device, as shown at 1574. If the terminal device is not registered, the Registration and Authentication Unit requests additional data from the terminal device, as shown at 1576. The requested data can includes user identification and other identification data. At 1578, the data is received from the terminal device. The Registration and Authentication Unit causes a request to be transmitted to an action reporting as shown at 1580. This request may be transmitted directly from the connected platform. As a result, the platform can identify terminal devices and prevent unauthorized access to client or third-party servers. At 1582, the Registration and Authentication Unit receives the action reporting data. The Registration and Authentication Unit analyzes this data at 1584 to determine if the terminal device is an appropriate candidate. If not, at 1586, a communication including data representing a rejection is transmitted to the terminal device. If the terminal device is an appropriate candidate for an engagement, a notification message is transmitted to the terminal device indicating such determination. Further instructions about registering and about the platform can also be transmitted to the terminal device after the authorization and verification processes are complete. The notification message can be transmitted either over a network or not.

Figure 16:
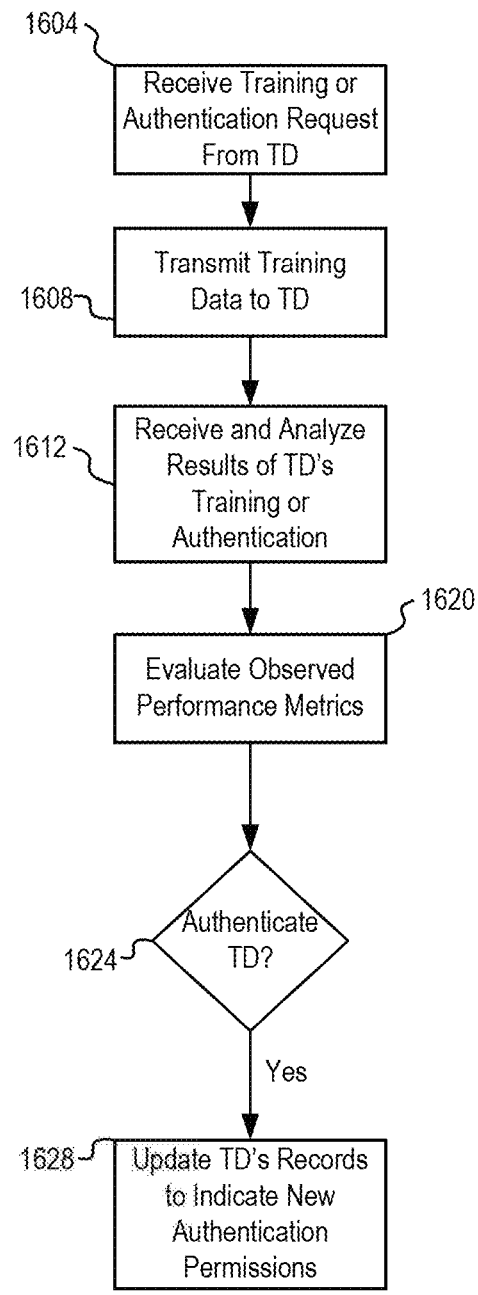
FIG. 16 is a flow diagram illustrating the training process according to an embodiment of the present invention.

FIG. 16 illustrates a flow diagram of the training process according to one embodiment of the invention. At 1604, the central unit 1118 receives a training or authentication request from a terminal device. Terminal devices may be request to be authorized to communicate with network devices regarding a particular object type or a specific object. At 1608, the central unit 1118 causes training data (e.g., testing material) to be transmitted to the terminal device. The training data can include the protocol data captured by the protocol unit 1130. At 1612, the central unit 1118 receives and analyzes the results of the training or authentication process and then at 1620 the central unit 1118 evaluates the performance metrics related to the training or authentication process. At 1624, the central unit 1118 determines whether to authorize the terminal device based on the performance metrics. Then at 1628, the intelligence unit updates the terminal device records to indicate any new authentication permissions. Upon authentication, the terminal device receives an authorization indication (e.g., a license) from the system or the client to assign a specific object or type of objects to a user associated with a network device. Authorization indications could also be granted based on other parameters as well, such as by location of the network device (determined from network device login data or location code data) or by any combination of the foregoing (e.g., by object and by spatial characteristics).

The testing and authentication process can be performed by a server. The testing and authentication process enables the system to train and authorize agents associated with terminal devices in order to generate authorization indications to assign specific types of objects. Each client can impose a particular training or authentication level before a terminal device is permitted to process requests to assign objects during engagements with network devices accessing the client server.

Figure 17:
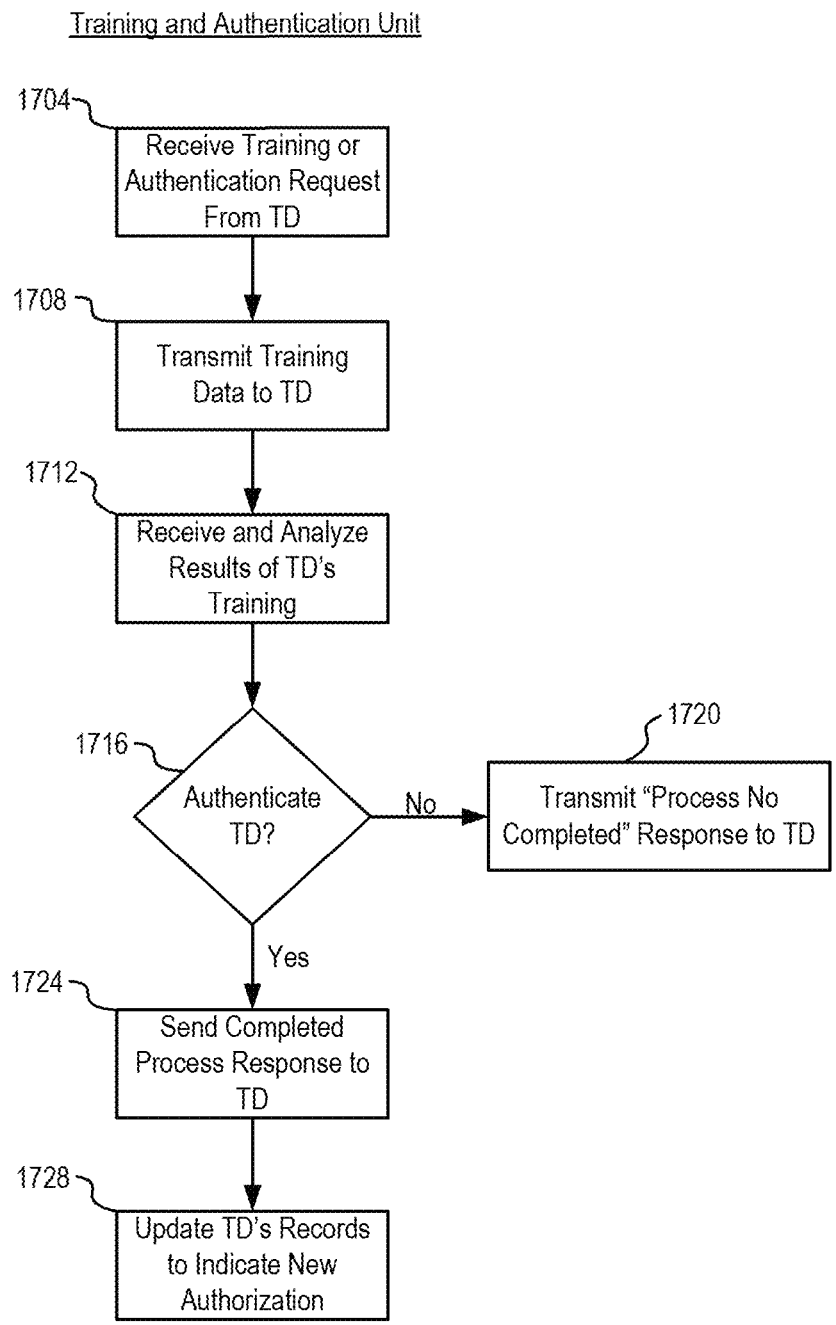
FIG. 17 is a flow diagram illustrating the training process according to an embodiment of the present invention.

FIG. 17 illustrates a flow diagram of the training and authorization process according to one embodiment of the invention. At 1704, the Training and Authorization Unit receives a communication including data indicating a request to train or obtain authorization from a terminal device. The request can be for an object type or a specific object. Training data to facilitate the training and authorization process can be generated by the client or a third-party entity. At 1708, the Training and Authorization Unit causes the training data to be transmitted to the terminal device. The training data can be transmitted to the terminal device while the terminal device is connected to and accessing the client server. At 1712, the Training and Authorization Unit receives and analyzes the results of the training or authorization process, and then at 1716, the Training and Authorization Unit determines whether to authorize the terminal device based on performance metrics of the process. If the terminal device does not complete the process, a communication including data indicating that the process has not been completed is transmitted to the terminal device as shown at 1720. If the terminal device has completed the process, a communication including data indicating such completion is transmitted to the terminal device, as shown at 1724. Further, at 1728, the terminal device records are updated to indicate the new authorization.

Figure 18:
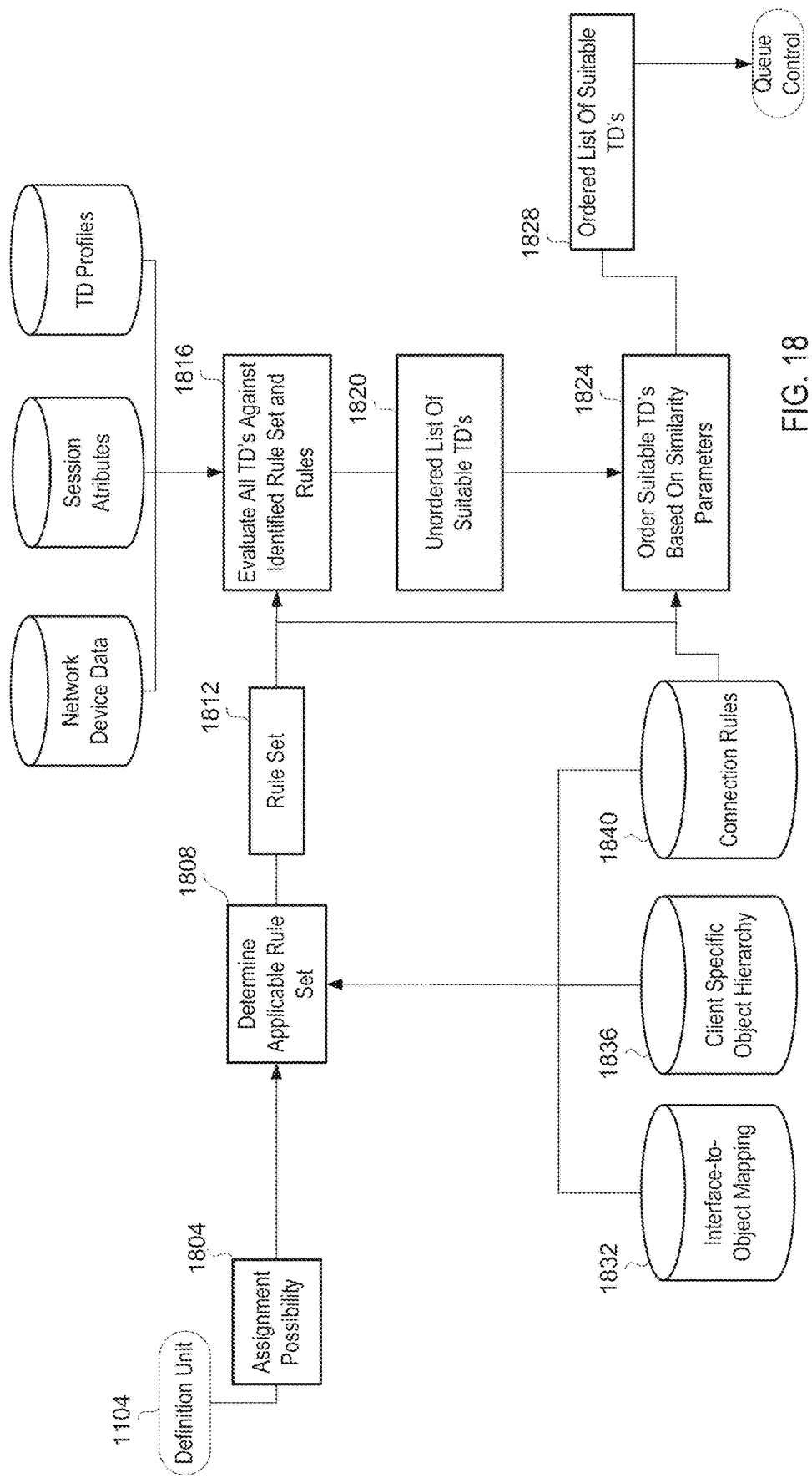
FIG. 18 is a functional diagram illustrating the connection unit according to an embodiment of the present invention.

Turning now to FIG. 18, the connection functionality of the connection unit 1112 facilitates routing of communications (e.g., messages) between the most appropriate terminal device or terminal devices to the most appropriate network devices. The following description of the connection functionality is provided in terms of a CTD and client or client specific connections, but can also be applied to an ITD communicating with network devices on behalf of different clients.

At 1804, the definition unit 1104 identifies a communication session that has characteristics that indicate that a network device may request assignment of an object (based on session data and, if available, network device data). The engagement context server 204 transmits to the connection unit a communication including a request for terminal device engagement based on one or more parameters (e.g., similarity parameters). At 1808, the connection unit determines a rule set to apply to the connection. The rule set is determined by the object for which the network device has requested or may request an assignment. The rule set is determined from interface-to-object mapping 1832, client specific object hierarchy 1836, and connection rules 1840. Interface-to-object mapping 1832 decodes the URL data from the session attributes to determine what object is currently or has been displayed on a screen of the network device. The Interface-to-object mapping 1832 could be part of the definition unit 1104 or could be separate. The client-specific object hierarchy is then used to determine if the currently or previously displayed object has a corresponding rule set. If the specific object does not have a rule set, then a predefined rule set is determined from the hierarchy. The appropriate rule set is then selected from the connection rules 1840.

When the appropriate rule set 1812 is determined, at 1816 the connection unit analyzes all terminal devices against the rules of the chosen rule set. First, at 1820, an unordered list of candidate terminal devices is generated. The connections are dynamically performed by weighing network device data, session data, and terminal device protocol data according to the rule set, and each terminal device is associated with a similarity parameter (e.g., a matching parameter). The terminal device protocols are continuously updated by the system to provide current data for the connection unit. A connection parameter is generated based on the order of each terminal device within the bounds of a particular rule times the importance of that rule among all the rules for a particular rule set. At 1824, the connection unit orders the terminal devices based on the resulting similarity parameters. A list is generated of available terminal devices in order at 1828. The list is then sent to the queue control at 1110 and the queue control 1110 ensures that a terminal device from the list is paired up with the network device.

Depending on embodiments, the similarity unit connects a network device with an available terminal device with the highest similarity parameter and alerts the terminal device that the terminal device must initiate an engagement with the network device, alerts terminal devices at the top of the generated list that a network device requires an engagement, or transmits to the terminal devices their similarity parameter and enables the terminal devices to permissively engage the network device. The terminal devices receive notification messages through the desktop communication user interface, instant messaging, e-mail, telephone, wireless device, and/or any other applicable means and may receive a communication including their similarity parameter. If the pool of available terminal devices is small, the connecting application can cause terminal devices to be contacted via instant messaging, e-mail, telephone, wireless device, and/or any other applicable means to get connected. The terminal devices can be contacted through different means than described above.

In one embodiment, the desktop 1120 provides a user interface, for example, to or through a client server, to the connection unit 1112 for the client to modify the connection rules, to introduce new connection rules, or to re-weigh existing connection rules for the connection unit. The connection unit also dynamically modifies the connection rules based on various factors, such as object assignment data. Through this dynamic feature, the connection unit can determine connection options based on the client and the data related to the terminal device.

FIG. 19 illustrates an example screen shot of the terminal device user interface. The network device window 1900 displays network devices that are currently accessing a client server. For example, the network device window can display all network devices that are currently connected to the server. Terminal devices authorized to facilitate the assignment of specific objects would see different views of the aggregate interaction activity with the server. The network device window 1900 specifically displays, inter alia, an identifier of the network device, if the identifier is available, the similarity parameter associated with the terminal device and/or the network device, the number of clicks received from the network device, content data that is currently displayed on the interface of the network device, and the amount of time the network device has been connected to the client server.

The Inbox window 1904 displays messages from network devices along with the network device's identification, type of message, and time received. The terminal device can create new messages or can reply to the network device's messages via the Inbox.

If available on the network device, the network device protocol window 1908 displays a list of these network devices obtained from the network device data server. Basic data about the network devices (such as location and telephone number) is displayed and a menu of additional data, such as, relationship, correspondence, etc. is also displayed. By selecting one of the menu items, additional data is displayed in a More Detail window (not shown).

The top left hand side of the screen displays the various functions as "buttons."

Figure 20:
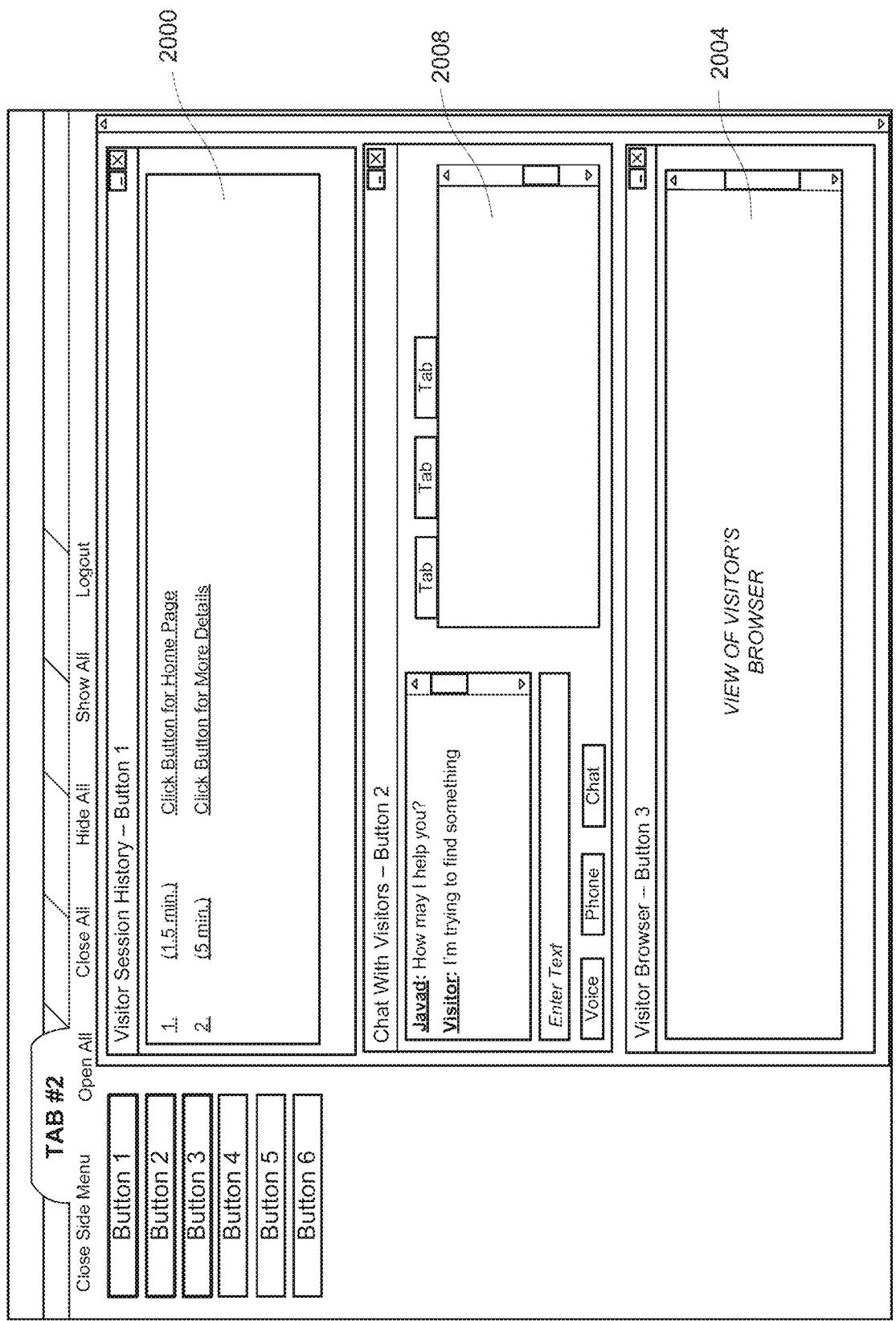
FIG. 20 is a screen shot of an example interface of the terminal device user interface.
Figure 21:
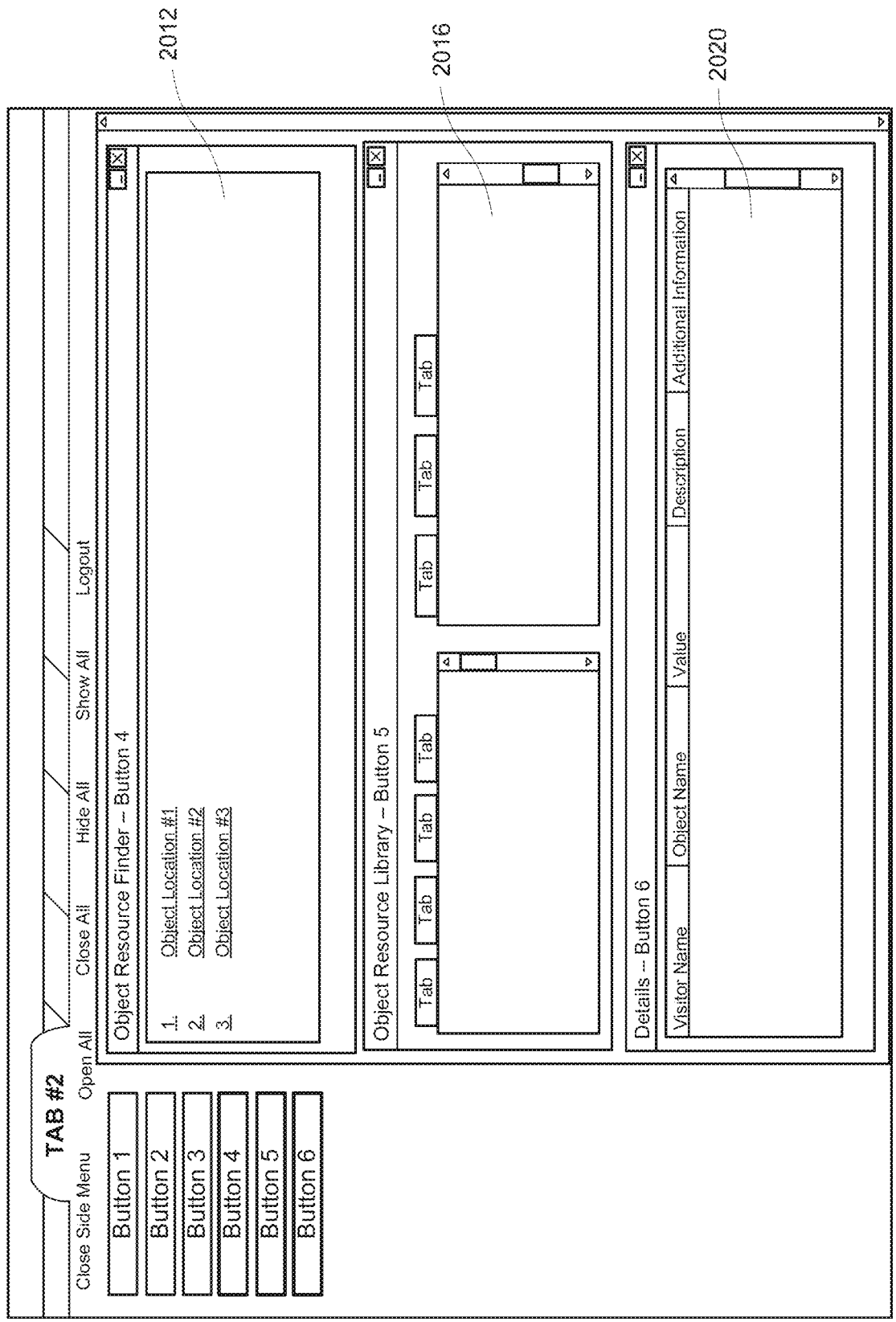
FIG. 21 is a further screen shot of the example interface of the terminal device user interface.

When a terminal device is currently in an engagement or communication session with a network device, a screen is displayed on the terminal devices user interface as shown in FIGS. 20 and 21. For example, the screen has a Session window 2000 that displays a series of previous messages between the terminal device and the network device and a current map of the network device accessing the client server. A connected network device window 2004 is displays the content data that is currently being displayed on the network device. If authorized by the client and/or the network device, a terminal device may control the network device interface. For example, see U.S. Ser. No. 09/922,753, filed Aug. 6, 2001, the disclosure of which is incorporated by reference herein in its entirety for all purposes.

The connect to network device window 2008 displays message of a communication session with one or more network device. For example, instant messenger can be the method of communication shown in the connect to network device window 2008. The terminal device and network device can communicate via voice over IP, telephone, e-mail, or on other applicable means. If the network device has the capability to receive a telephone call while connected to the network, the terminal device can connect to the network device via voice over IP or a telephone call over the PSTN through a bridge provided by the system. The network device can continue to access the server and navigate other interfaces while communicating with the terminal device.

The Object Resource Finder 2012 window enables an agent operating the terminal device to select a particular object. The terminal device can, after receiving the selection from the agent identifying a particular object, obtain additional object and object quantity data regarding the object. In some instances, the terminal device can query one or data stores for other objects. Data is provided to the Object Resource Finder window from the object data store 1124 via the content unit 1108.

The Object Resource Library window 2016 can be used to access or query for additional data about a particular object. The window 2016 can also display the protocol data from the protocol unit 1130. As explained above, the protocol data can include, for example, external data and object and object quantity data, and the like.

The Interaction Detail window 2020 displays the network devices object assignment request queue. The terminal device, subject to the client's and/or the network device's permission, can manipulate the network device's object assignment request queue.

Figure 22:
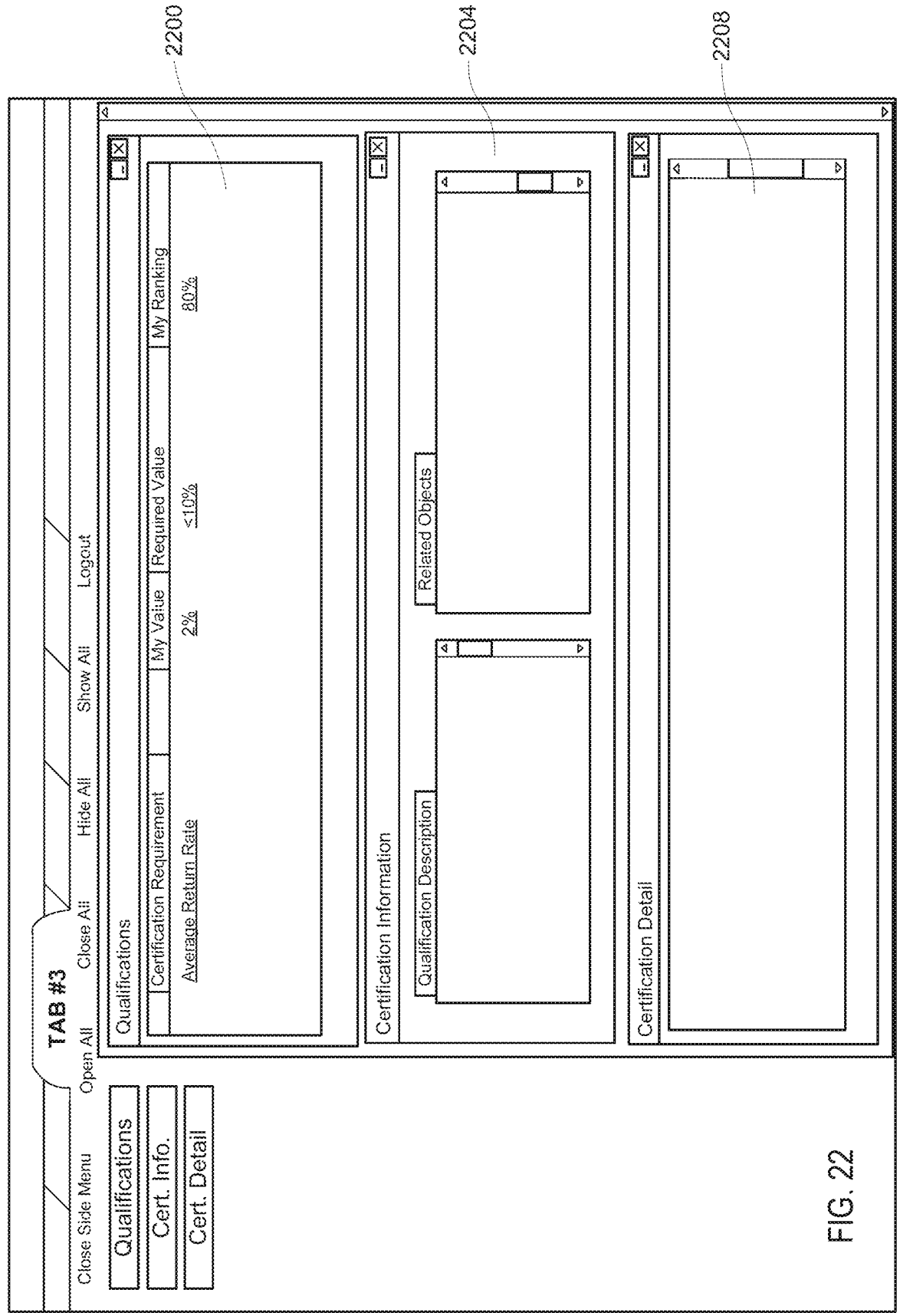
FIG. 22 is a screen shot of another example interface of the terminal device user interface.

FIG. 22 illustrates an example screen shot of the terminal device user interface. The frame 2200 shows the terminal device the objects that the terminal device is authorized to assign to users. The frame 2204 provides the terminal device with data regarding the particular training available. The detail frame 2208 provides the terminal device with an network connected evaluation for authorization.

Figure 23:
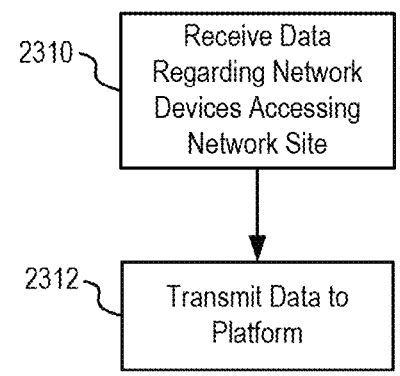
FIGS. 23 and 24 are flow diagrams illustrating the operation of functionalities of the network device monitoring unit according to an embodiment of the present invention.
Figure 24:
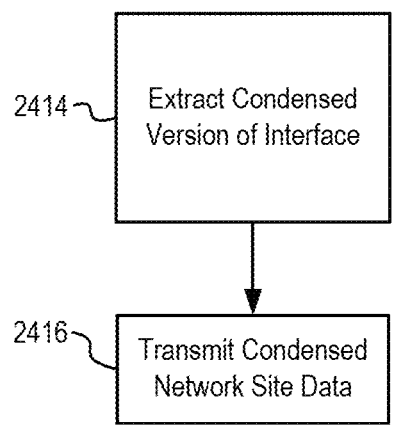

FIGS. 23 and 24 show functionalities of the network device and client Monitoring Unit. The network device and Monitoring Unit is at the client's server (e.g., server 704) in some embodiments, but can be located separate from the client's server in other embodiments. In FIG. 23, at 2310 the network device and Monitoring Unit monitors and analyzes interactions between the connected network devices and the client server, and at 2312, this data is transmitted to or retrieved by other units in the platform.

FIG. 24, at 2414 the network device and client Monitoring Unit extracts a condensed version of the interface (e.g., a WAP version) for use by the terminal device to facilitate the object assignment process. At 2416, this data is transmitted to or retrieved by other units in the platform.

Additionally, the network device and client Monitoring Unit can obtain current details regarding object assignments. The network device and client Monitoring Unit enables the client to define constraints (e.g., preferences) regarding how and when any terminal device can interact with network devices. For example, the client may define the constraint, such that when the network device connects to the client server, the network device may be contacted by a terminal device that has a resource set regarding a specific topic or object.

In some instances, data causing a window or a button to be displayed on the network device can be transmitted to the network device. When the data is received at the network device, the window or button can be displayed. For example, the window can include text or a prompt indicating that the user associated with the network device can request that a communication session be initiated by a terminal device. As another example, or a button can be displayed, such that when the button is selected a communication session can be initiated with a terminal device. In some instances, a communication session or engagement with a terminal device can be triggered based on an interaction received from a network device (e.g., a click). These "connecting" or "connection" parameters can be defined by the client, as are the types of communication channels between the network device and the terminal device (e.g., chat or telephone). In some instances, network devices can be anonymous to terminal devices.

If the network device indicates an interest in requesting assignment of an object (by, for example, adding an object to the network device object assignment request queue), the terminal device may rejoin or initiate a communication session with the network device.

Figure 25:
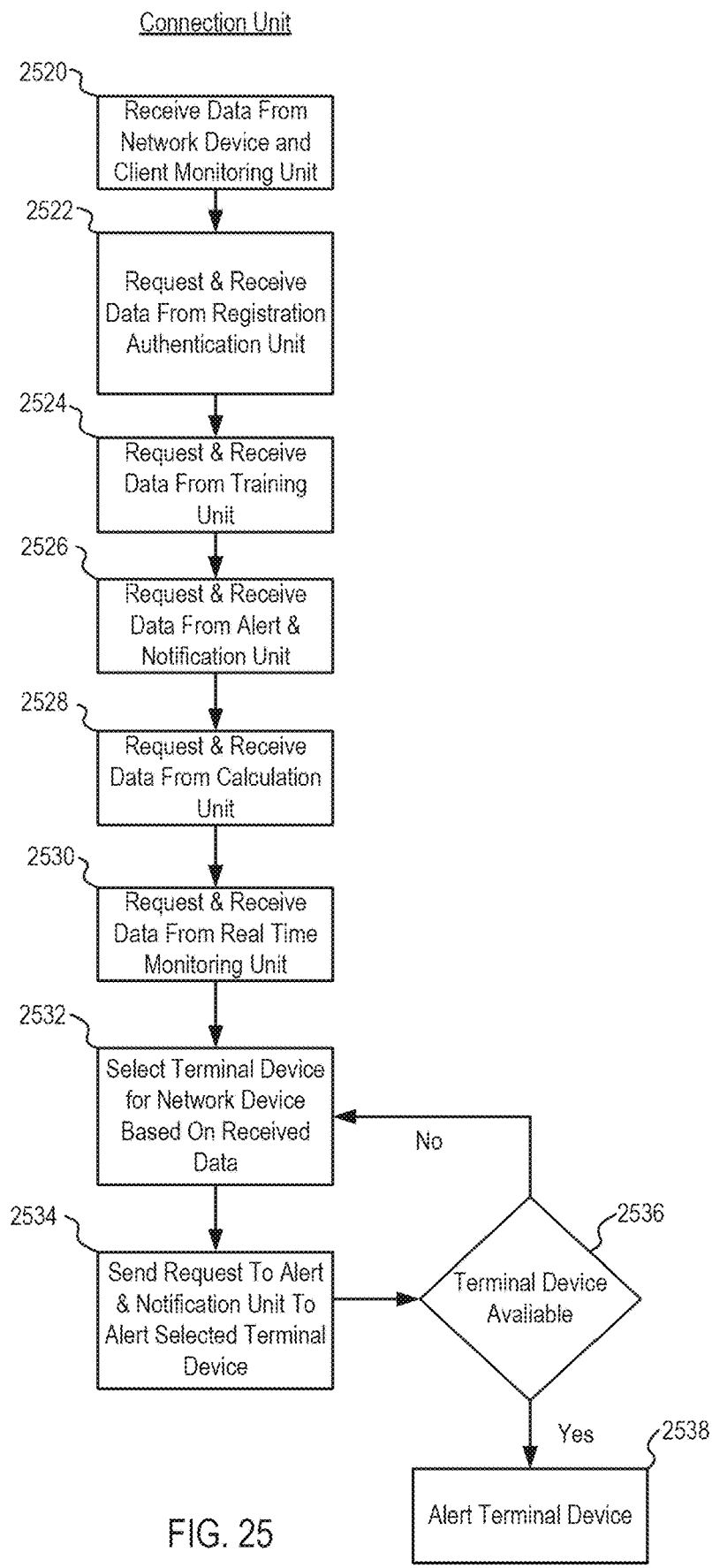
FIG. 25 is a flow diagram illustrating the connection process according to one embodiment of the present invention.

FIG. 25 illustrates a flow diagram of the connecting process according to an embodiment. At 2520, the Connecting Unit receives data from the network device and client Monitoring Unit, such as an identifier of an object that is currently being or has been displayed on the network devices, an indication that the network device requests an engagement from a terminal device, and other suitable data. The Connecting Unit then queries data from the Registration and Authentication Unit (e.g., location of a terminal device, etc.) at 2522, the Training Unit (e.g., objects the terminal device is authorized to assign to users) 2524, the Alert and Notification Unit (e.g., identifiers of terminal devices connected to the client server or network) at 2526, the Calculation Unit (the most appropriate terminal device to connect with the network device based on various factors) 2528, and the Monitoring Unit 2530. In another embodiment, all of the terminal device data is contained in a single data store and the Connecting Unit queries for the data from the single data store. Moreover, the Connecting Unit does not have to queries for all of the terminal device data. The received data is then used by the Connecting Unit to select the most appropriate terminal device for the network device at 2532. At 2534, the Connecting Unit transmits a communication requesting the Alert and Notification Unit to alert the selected terminal device. As is shown at 136, if the Alert and Notification determines that the terminal device is available, it alerts the terminal device 2538, but if the Alert and Notification Unit determines that the terminal device is unavailable (e.g., communicating with another network device, etc.), it causes the Connecting Unit to select another terminal device at 2532. The Connecting Unit automatically selects the next most appropriate connected terminal device and enables only that terminal device to interact with the connected network device.

Figure 26:
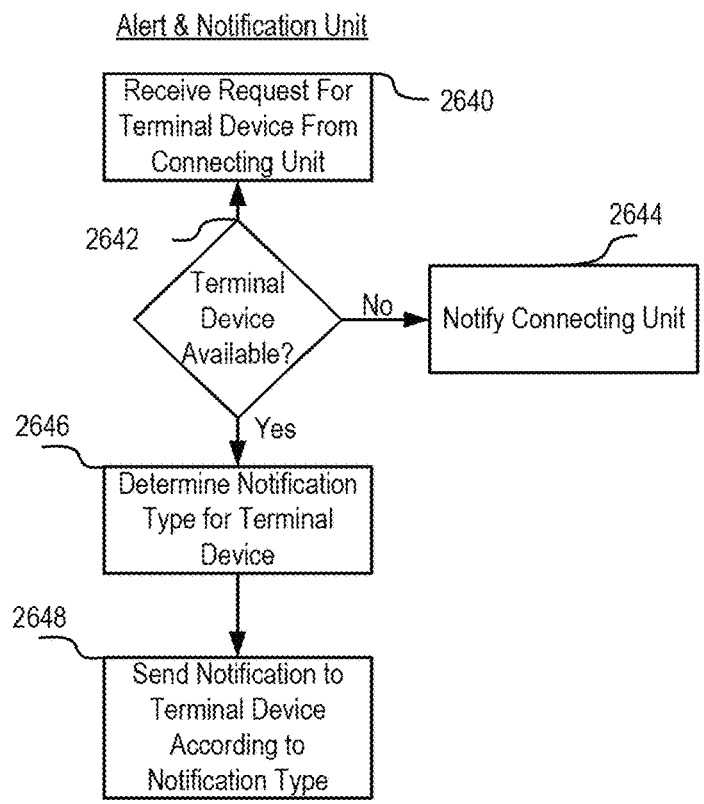
FIGS. 26 and 27 are flow diagrams of the alert and notification unit according to an embodiment of the present invention.
Figure 27:
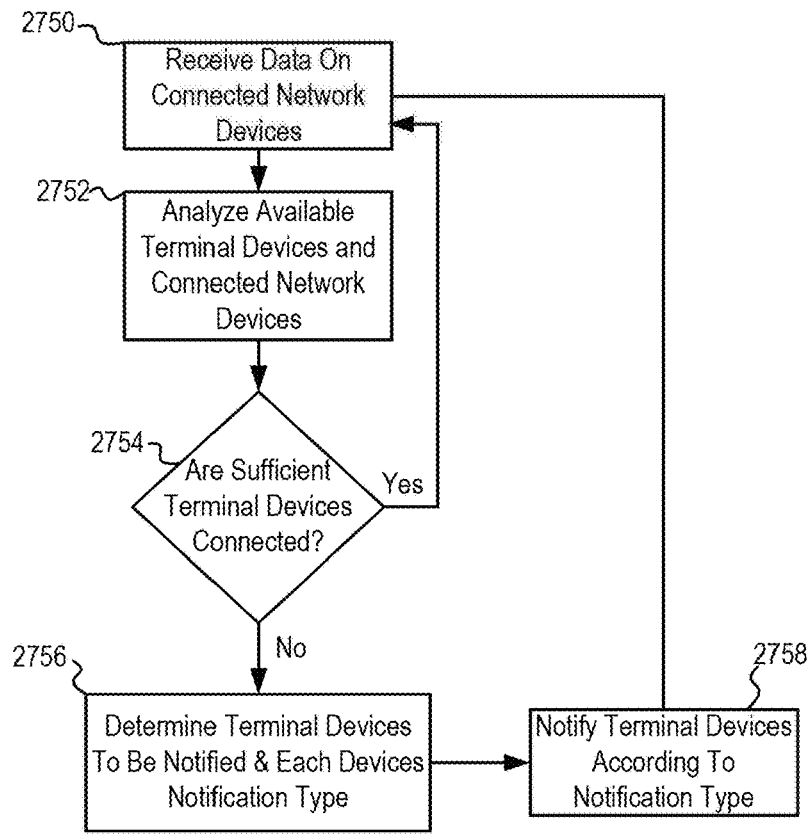

FIGS. 26 and 27 illustrate flow diagrams of a process of one embodiment of the Alert and Notification Unit. In FIG. 26, at 2640, the Alert and Notification Unit receives a request to transmit a notification message to a particular terminal device from the Connecting Unit. At 2642, the Alert and Notification Unit determines if that particular terminal device is available to initiate a communication session and/or engagement with the network device. If the terminal device is not available, at 2644 the Alert and Notification Unit transmits a notification message to the Connecting Unit. If the terminal device is available, at 2646 the Alert and Notification unit determines the communication channel for transmitting the notification message to the terminal device. Then at 2648, the Alert and Notification Unit transmits a notification message to the terminal device using the determined communication channel.

FIG. 27 illustrates a flow diagram of one embodiment of the Alert and Notification Unit detecting whether there are a sufficient number of terminal devices to communication with network device requests for engagement. At 2750, the Alert and Notification Unit receives data on the network devices that are connected and/or accessing a particular server. The Alert and Notification Unit may periodically query for this data or may be periodically transmitted this data. At 2752, the Alert and Notification Unit analyzes the available terminal devices and network device requirements. At 2754, the Alert and Notification Unit determines whether there are a sufficient number of terminal devices connected to the server (e.g., to a central server managing the terminal device connections) to meet the network device's requirements. If there are enough terminal devices, the Alert and Notification Unit begins the process over again the next time network device data is received. If there are not enough terminal devices available, the Alert and Notification Unit determines identifiers of terminal devices to be notified and each terminal device's communication channel for the notification, as shown in 2756. Then, at 2758, the Alert and Notification Unit notifies the terminal devices using the determined communication channel.

Figure 28:
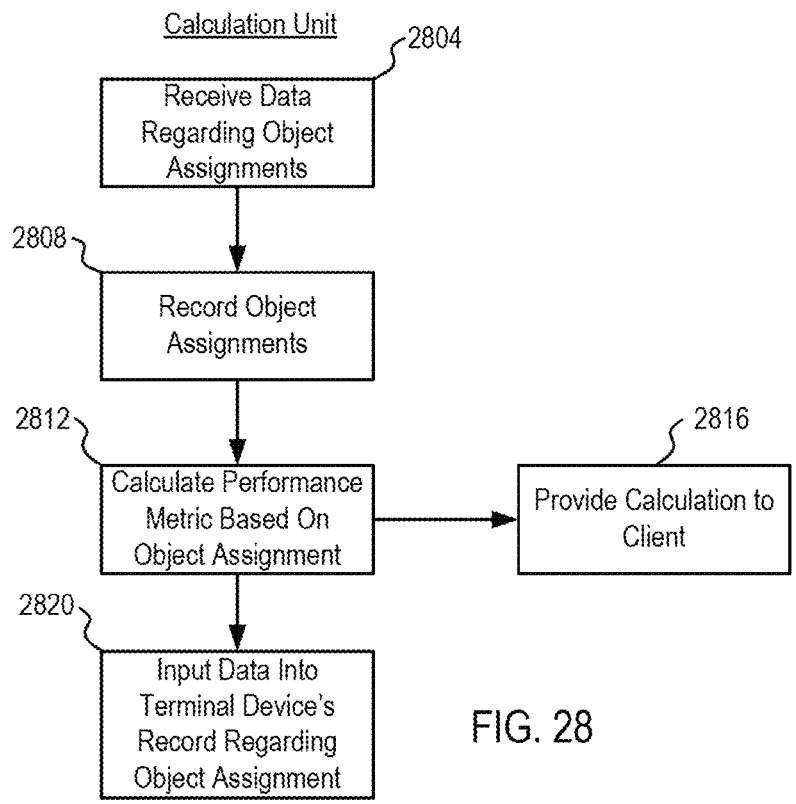
FIG. 28 is a flow diagram illustrating the operation of functionalities of the Calculation (e.g., accounting) Unit according to an embodiment of the present invention.

FIG. 28 is a flow diagram illustrating a processes executed at an object assignment management unit. As depicted at 2804, data is received regarding object assignments during engagements or communication sessions between terminal devices and network devices. At 2808, completed object assignments are recorded. At 2812, terminal device's performance metrics are calculated based on the object assignments. At 2820, the data is input into terminal device's record. At 2816, a client is provided with the calculations at 2812.

Figure 29:
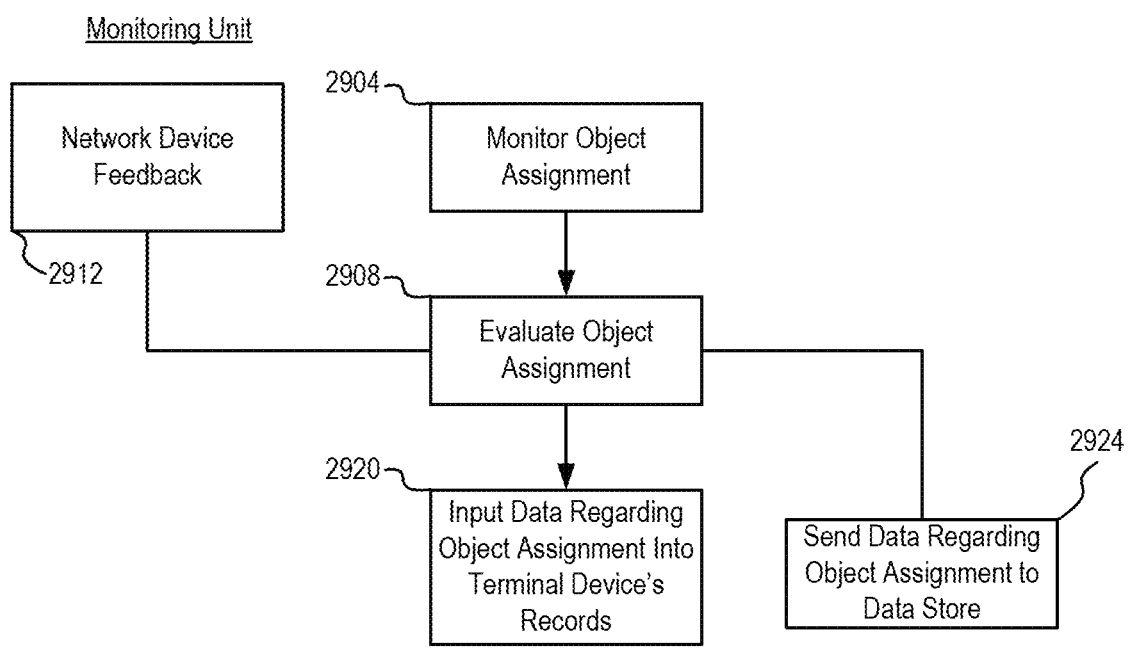
FIG. 29 is a flow diagram illustrating the operation of functionalities of the Real Time Monitoring Unit according to an embodiment of the present invention.

FIG. 29 is a flow diagram illustrating a process executed at a monitoring unit. Object assignment activity is monitored at 2904. Network device feedback is obtained, as shown at 2912. Object assignment activity is evaluated at 2908. At 2920, data regarding object assignment activity is inputted into terminal device's records. At 2924, data regarding object assignment activity is transmitted to a data store.

Figure 30:
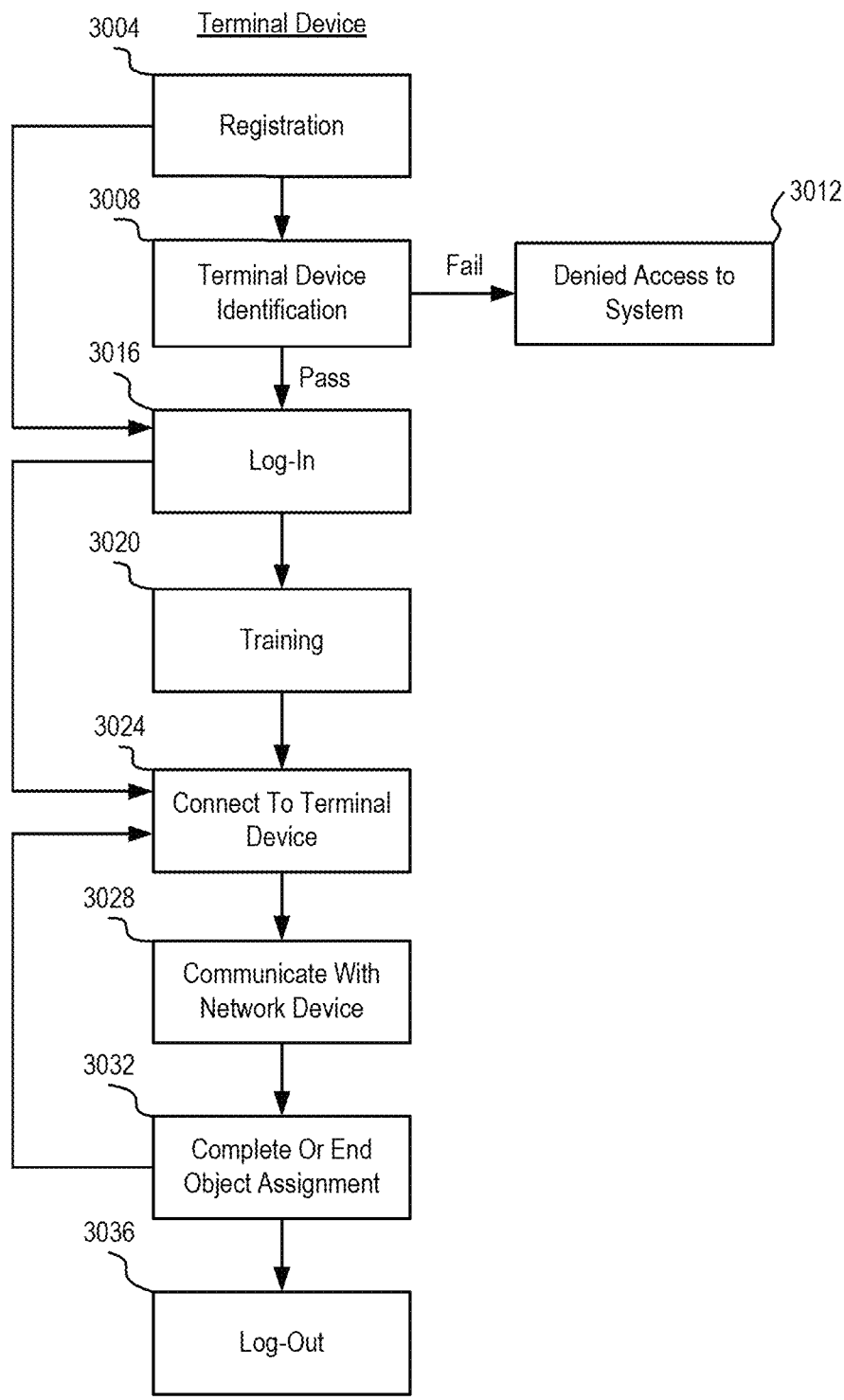
FIG. 30 is a flow diagram illustrating the interaction of a terminal device with one embodiment of the present invention.

FIG. 30 indicates example processes executed at a terminal device in accordance with the present disclosure. At 3004, registration occurs. At 3008, an identification or authorization of the agent associated with the terminal device is performed. If the terminal device fails the identification or authorization, the terminal device can be denied access to the system, as shown at 3012. If the terminal device completes the identification or authorization, at 3004 a log-in is performed at 3016. At 3020, training can be provided to the agent. A communication link between the terminal device and a network device is formed at 3024. At 3028, communication with a network device occurs during a communication session. At 3032, an object assignment process is either completed or terminated during the communication session. At 3036, the terminal device performs a log-out.

FIG. 31 illustrates a flow diagram of an object assignment process using the system of the invention. At 3100, a network device accesses a client server, which is part of the system. If the network device is a returning network device, the client server can facilitate an engagement with the network device at 3104. The connection unit 1112 then establishes a communication link between the network device and a particular terminal device or several terminal devices. In step 3108, the terminal device can transmit an initial message to the network device over the communication link during the communication session. The terminal device determines whether the network device requests an engagement at 3116. If the network device does not request an engagement, the terminal device disengages at 3120.

If the network device does request an engagement, the terminal device then evaluates the network device's requirements further through communication with the network device and accessing data on the network device at 3124. At this point, the terminal device determines the objects, features, volume range, user, and the network device's understanding of the object based on communication messages received, for example. The terminal device directs the network device to specific objects at 3132 and provides additional data as necessary to complete the object assignment. The terminal device can access external resources or third-party servers as part of the process, for example, the terminal device can route or navigate the network device to another server associated with a different object provider.

The terminal device evaluates whether the network device selected an object at 3136 and if so provides related objects at 3140. The terminal device can then perform research at step 3128 on the related objects and then the process continues as before. If the network device did not make a selection, the terminal device further determines if the network device has completed accessing the client server to evaluate whether or not to request an assignment of objects at 3144. If the network device is not completed accessing the client server, the terminal device evaluates the requirements of the network device further at 3124 and the process continues as before. If the network device is completed accessing the client server, the terminal device provides additional object data at 3148 and facilitates a completion of the engagement or communication session at 3152. At 3160, a satisfied network device disconnects from the client server. The terminal device can follow up with the network device through the methods shown at the bottom of FIG. 31. For example, see U.S. Ser. No. 14/288,258, filed May 27, 2014, the disclosure of which is incorporated by reference herein in its entirety for all purposes.

Specific details are provided in the above description to provide a thorough understanding of the embodiments. However, it is understood that the embodiments can be practiced without these specific details. For example, circuits can be shown as block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that portions of the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a type, or any combination of instructions, data structures, and/or program statements. A code segment can be coupled to another code segment or a hardware circuit by passing and/or receiving data, data, arguments, parameters, and/or memory contents. Data, arguments, parameters, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing data. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method, comprising:
    receiving a session message, wherein the session message includes session data representing an interaction between a website and a network device;
    accessing a rule for analyzing the session data, wherein the rule is associated with a weight;
    applying the session data to the rule;
    determining that the interaction corresponds to an interaction candidate, wherein determining includes generating a similarity parameter using the rule and multiplying the similarity parameter by the weight of the rule, and wherein a similarity parameter represents a similarity between the network device and an agent device;
    selecting an agent device using the session data, wherein selecting the agent device includes evaluating the similarity parameter;

dynamically facilitating communication between the network device and the agent device, wherein the communication is dynamically facilitated in real-time;
retrieving current protocol data using the session data and the selected agent device, wherein the protocol data represents a protocol for communicating with network devices, and wherein the protocol data is continuously updated; and
transmitting the protocol data and the session data, wherein receiving the protocol data and the session data by the selected agent device further facilitates communication between the network device and the agent device.

2. The method of claim 1, wherein the session data includes information about an item available using the website, and wherein retrieving the protocol data includes accessing additional data associated with the item.

3. The method of claim 1, further comprising:
transmitting a notification message when the interaction corresponds to the interaction candidate, wherein the notification message, when received, generates a prompt for initiating an interaction, and wherein facilitating communication is performed based on initiating the interaction.

4. The method of claim 1, wherein accessing the rule includes determining which rule to apply using the session data.

5. The method of claim 1, wherein accessing the rule includes determining which rule to apply using item data contained within the session data.

6. The method of claim 1, further comprising:
extracting identification information from the session data, wherein extracting includes accessing a database using the identification information to retrieve historical data associated with the network device.

7. The method of claim 1, wherein determining that the interaction constitutes the interaction candidate includes analyzing availability of the agent device.

8. A system, comprising:
one or more data processors; and
a non-transitory computer readable storage medium containing instructions which when executed on the one or more data processors, cause the one or more data processors to perform operations includes:
receiving a session message, wherein the session message includes session data representing an interaction between a website and a network device;
accessing a rule for analyzing the session data, wherein the rule is associated with a weight;
applying the session data to the rule;
determining that the interaction corresponds to an interaction candidate, wherein determining includes generating a similarity parameter using the rule and multiplying the similarity parameter by the weight of the rule, and wherein a similarity parameter represents a similarity between the network device and an agent device;
selecting an agent device using the session data, wherein selecting the agent device includes evaluating the similarity parameter;
dynamically facilitating communication between the network device and the agent device wherein the communication is dynamically facilitated in real-time;
retrieving current protocol data using the session data and the selected agent device, wherein the protocol data represents a protocol for communicating with network devices, and wherein the protocol data is continuously updated; and
transmitting the protocol data and the session data, wherein receiving the protocol data and the session data by the selected agent device further facilitates communication between the network device and the agent device.

9. The system of claim 8, wherein the session data includes information about an item available using the website, and wherein retrieving the protocol data includes accessing additional data associated with the item.

10. The system of claim 8, wherein the operations further comprise:
transmitting a notification message when the interaction corresponds to the interaction candidate, wherein the notification message, when received, generates a prompt for initiating an interaction, and wherein facilitating communication is performed based on initiating the interaction.

11. The system of claim 8, wherein accessing the rule includes determining which rule to apply using the session data.

12. The system of claim 8, wherein accessing the rule includes determining which rule to apply using item data containing within the session data.

13. The system of claim 8, wherein the operations further comprise:
extracting identification information from the session data, wherein extracting includes accessing a database using the identification information to retrieve historical data associated with the network device.

14. The system of claim 8, wherein determining that the interaction constitutes the interaction candidate includes analyzing availability of the agent device.

15. A computer-program product tangibly embodied in a non-transitory machine-readable storage medium, including instructions configured to cause a data processing apparatus to perform operations including:
receiving a session message, wherein the session message includes session data representing an interaction between a website and a network device;
accessing a rule for analyzing the session data, wherein the rule is associated with a weight;
applying the session data to the rule;
determining that the interaction corresponds to an interaction candidate, wherein determining includes generating a similarity parameter using the rule and multiplying the similarity parameter by the weight of the rule, and wherein a similarity parameter represents a similarity between the network device and an agent device;
selecting an agent device using the session data, wherein selecting the agent device includes evaluating the similarity parameter;
dynamically facilitating communication between the network device and the agent device, wherein the communication is dynamically facilitated in real-time;
retrieving current protocol data using the session data and the selected agent device, wherein the protocol data represents a protocol for communicating with network devices, and wherein the protocol data is continuously updated; and
transmitting the protocol data and the session data, wherein receiving the protocol data and the session data by the selected agent device further facilitates communication between the network device and the agent device.

16. The computer-program product of claim 15, wherein the wherein the session data includes information about an item available using the website, and wherein retrieving the protocol data includes accessing additional data associated with the item.

17. The computer-program product of claim 15, wherein the operations further comprise:
   transmitting a notification message when the interaction corresponds to the interaction candidate, wherein the notification message, when received, generates a prompt for initiating an interaction, and wherein facilitating communication is performed based on initiating the interaction.

18. The computer-program product of claim 15, wherein accessing the rule includes determining which rule to apply using the session data.

19. The computer-program product of claim 15, wherein accessing the rule includes determining which rule to apply using item data contained within the session data.

20. The computer-program product of claim 15, wherein the operations further comprise:
   extracting identification information from the session data, wherein extracting includes accessing a database using the identification information to retrieve historical data associated with the network device.

21. The computer-program product of claim 15, wherein determining that the interaction constitutes the interaction candidate includes analyzing availability of the agent device.

* * * * *